US011479177B2

(12) United States Patent
Oba

(10) Patent No.: US 11,479,177 B2
(45) Date of Patent: Oct. 25, 2022

(54) VEHICLE DISPLAY DEVICE, DISPLAY CONTROL METHOD, AND REARVIEW MONITORING SYSTEM

(71) Applicant: Sony Corporation, Tokyo (JP)

(72) Inventor: Eiji Oba, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/817,611

(22) Filed: Mar. 13, 2020

(65) Prior Publication Data
US 2020/0207274 A1 Jul. 2, 2020

Related U.S. Application Data

(63) Continuation of application No. 15/318,120, filed as application No. PCT/JP2015/004023 on Aug. 11, 2015, now Pat. No. 10,682,958.

(30) Foreign Application Priority Data

Aug. 12, 2014 (JP) .............................. JP2014-164179

(51) Int. Cl.
*B60R 1/08* (2006.01)
*B60R 1/00* (2022.01)
*B60R 1/12* (2006.01)
*H04N 7/18* (2006.01)

(52) U.S. Cl.
CPC ................. *B60R 1/08* (2013.01); *B60R 1/00* (2013.01); *B60R 1/12* (2013.01); *H04N 7/181* (2013.01); *B60R 2001/1215* (2013.01); *B60R 2001/1253* (2013.01); *B60R 2300/105* (2013.01); *B60R 2300/306* (2013.01); *B60R 2300/70* (2013.01); *B60R 2300/8046* (2013.01)

(58) Field of Classification Search
CPC .... B60R 1/08; B60R 1/00; B60R 1/12; B60R 2001/1215; B60R 2001/1253; B60R 2300/105; B60R 2300/306; B60R 2300/70; B60R 2300/8046; H04N 7/181
See application file for complete search history.

(56) References Cited

U.S. PATENT DOCUMENTS

| 5,027,182 A | 6/1991 | Kim et al. |
| 2002/0018182 A1 | 2/2002 | Aoki |
| 2005/0190260 A1 | 9/2005 | Xie |

(Continued)

FOREIGN PATENT DOCUMENTS

| JP | 2006-121587 A | 5/2006 |
| JP | 2006338566 A | 12/2006 |

(Continued)

*Primary Examiner* — Sunghyoun Park
(74) *Attorney, Agent, or Firm* — Xsensus LLP

(57) ABSTRACT

Vehicle display device (10) including a display unit (50), installed in a cabin of a vehicle and having a display face oriented in a different direction from a direction of a driver (DR), configured to display an image depicting a surrounding area of the vehicle, and a mirror unit (55) installed in the cabin of the vehicle and configured to reflect some or all of an image area displayed on the display unit (50). A visible range of the surrounding area visible to the driver through an image of the display unit (50) reflected in the mirror unit (55) changes according to movement of a viewing position of the driver (DR) with respect to the mirror unit (55).

24 Claims, 39 Drawing Sheets

(56) References Cited

U.S. PATENT DOCUMENTS

| | | |
|---|---|---|
| 2007/0165108 A1 | 7/2007 | Yuasa |
| 2008/0309764 A1* | 12/2008 | Kubota .................... B60R 1/00 |
| | | 348/148 |
| 2009/0135493 A1 | 5/2009 | Takayanagi et al. |
| 2010/0002321 A1 | 1/2010 | Seki |
| 2010/0013930 A1* | 1/2010 | Matsuo .................... B60R 1/00 |
| | | 348/148 |
| 2010/0253597 A1 | 10/2010 | Seder et al. |
| 2012/0154591 A1 | 6/2012 | Baur et al. |
| 2013/0038732 A1* | 2/2013 | Waite ....................... B60R 1/00 |
| | | 348/148 |
| 2013/0163877 A1* | 6/2013 | Morishita ............... B60R 1/062 |
| | | 382/190 |
| 2014/0285666 A1 | 9/2014 | O'Connell et al. |
| 2014/0327775 A1* | 11/2014 | Cho ........................ G06F 3/016 |
| | | 348/148 |
| 2015/0015479 A1 | 1/2015 | Cho |
| 2015/0084755 A1 | 3/2015 | Chen et al. |
| 2015/0227196 A1* | 8/2015 | Fujii ....................... G06T 11/60 |
| | | 345/156 |
| 2016/0134815 A1 | 5/2016 | Ishiguro et al. |
| 2016/0137126 A1* | 5/2016 | Fürsich ................ H04N 13/239 |
| | | 348/148 |

FOREIGN PATENT DOCUMENTS

| | | | |
|---|---|---|---|
| WO | 2008/044589 A1 | 4/2008 | |
| WO | WO-2014027681 A * | 2/2014 | ............. G06F 3/011 |
| WO | WO-2014156788 A1 * | 10/2014 | ............. B60K 35/00 |

* cited by examiner

Fig. 5
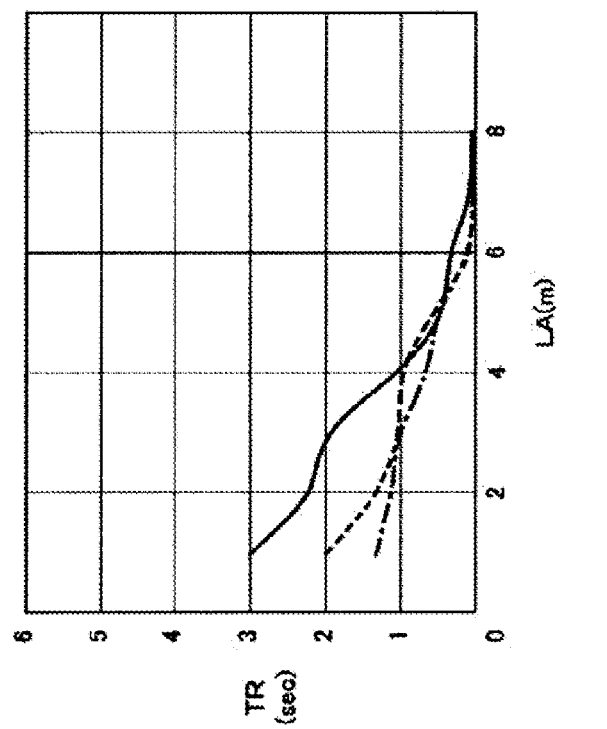
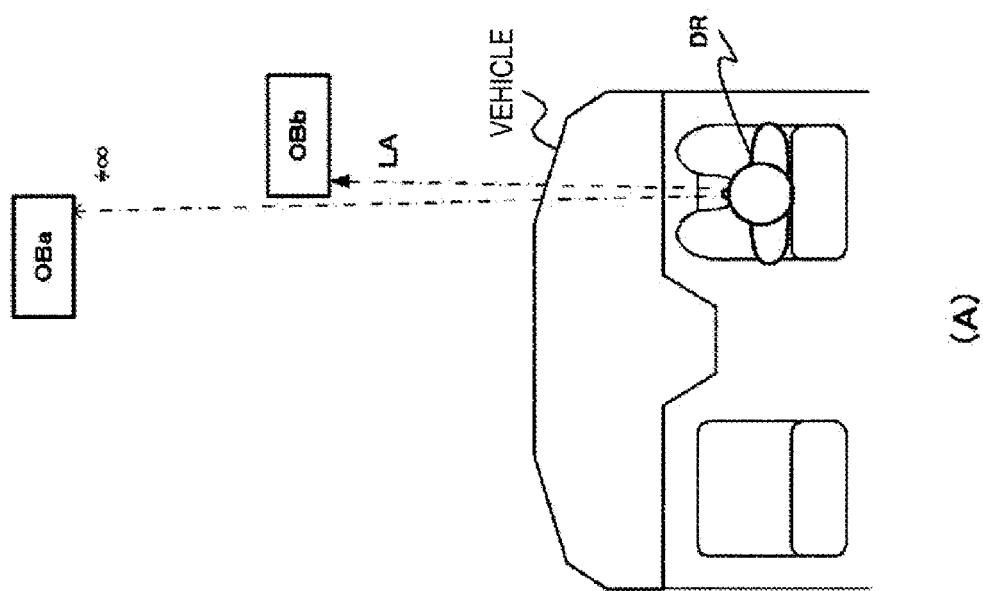

Fig. 21

|  | MODE 1 | MODE 2 | MODE 3 |
|---|---|---|---|
| STRAIGHT AHEAD (HIGH SPEED) | ○ | □ | |
| ROUNDABOUT | ○ | □ | |
| GENTLE L/R TURN | ○ | □ | ☆ |
| SHARP L/R TURN |  | ○ | □ |
| BACK UP STRAIGHT | ○ | □ | |
| BACK UP AT SHARP ANGLE |  | ○ | □ |

Fig. 33
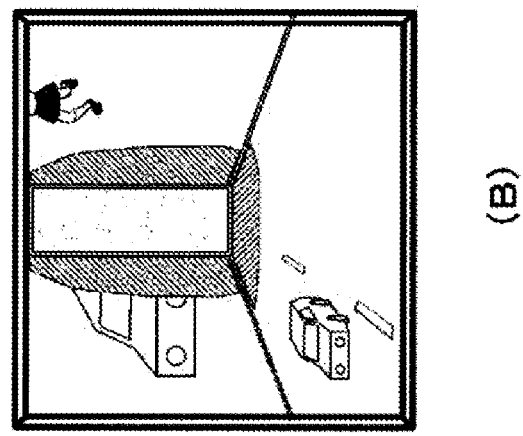
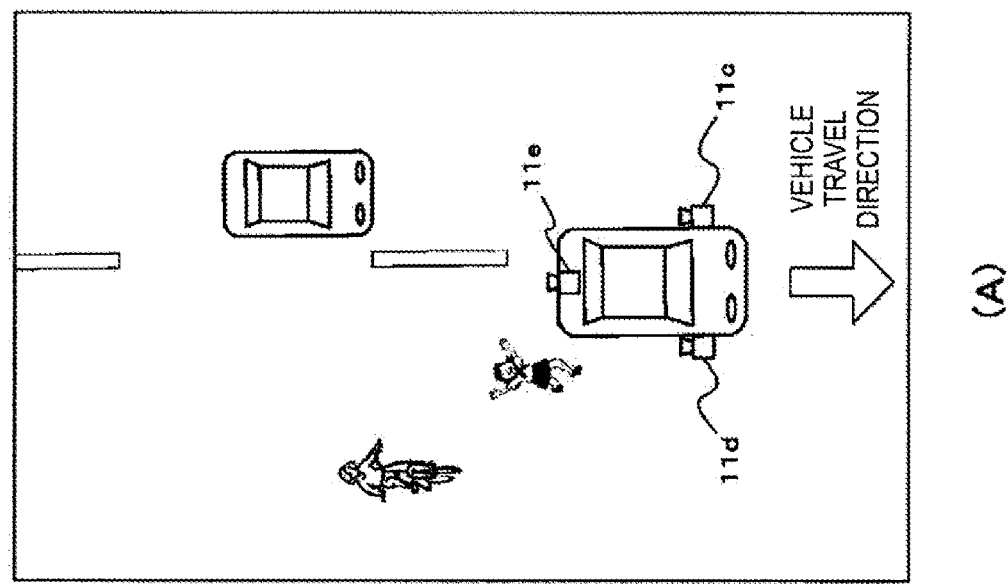

Fig. 35
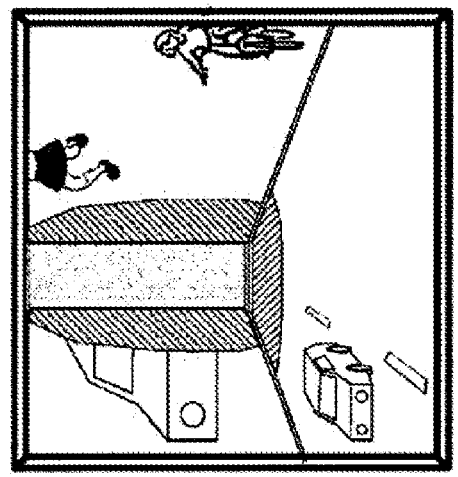
(B)
SWITCH
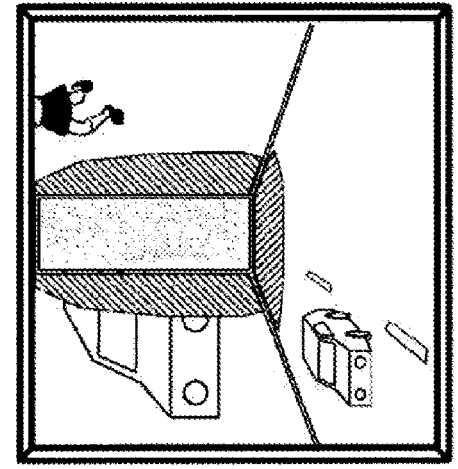
(A)

Fig. 39
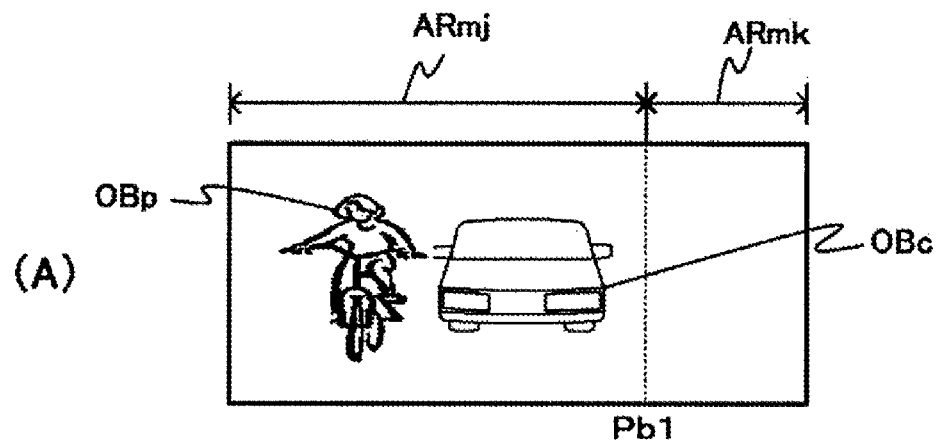
(A)
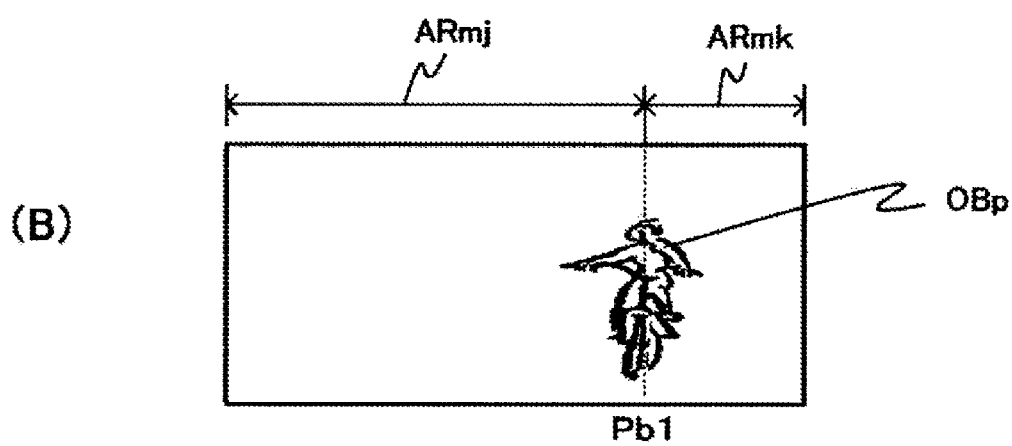
(B)
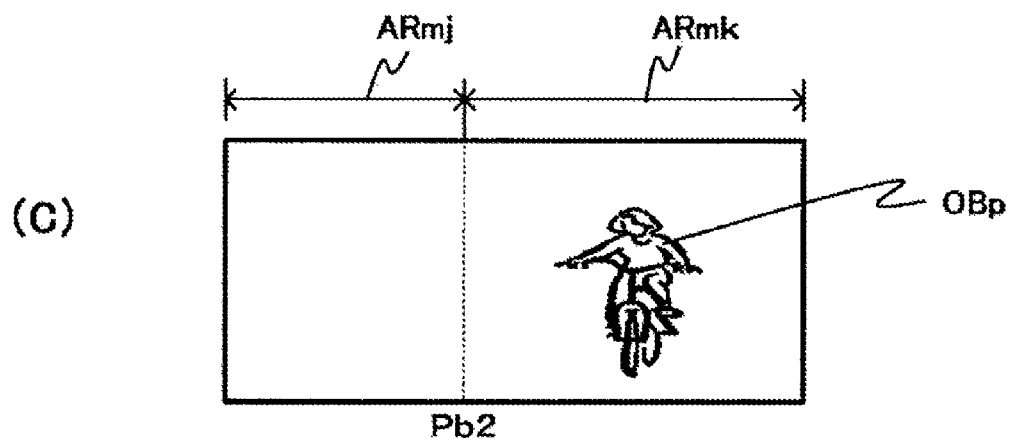
(C)

VEHICLE DISPLAY DEVICE, DISPLAY CONTROL METHOD, AND REARVIEW MONITORING SYSTEM

CROSS REFERENCE TO RELATED APPLICATIONS

This application is a continuation of U.S. application Ser. No. 15/318,120, filed Dec. 12, 2016, which is based on PCT filing PCT/JP2015/004023, filed Aug. 11, 2015, which claims the benefit of Japanese Priority Patent Application JP 2014-164179, filed Aug. 12, 2014, the entire contents of each are incorporated herein by reference.

TECHNICAL FIELD

The present technology relates to a vehicle display device, a display control method, and a rearview monitoring system, and enables easy viewing of the area around a vehicle.

BACKGROUND ART

Recently, functions corresponding to the rearview mirror of a vehicle are being realized by a monitoring system made up of an image capture device and a display device. With a viewing method using a rearview mirror, a driver is able to move the range that may be viewed (hereinafter designated the "visible range") by moving his or her head, eye position, or the like (hereinafter simply designated the "head position"). However, with a monitoring system that simply displays an image acquired with an image capture device on a display device, the visible range is fixed, and the driver is unable to move the range that may be viewed, even if the driver moves his or her head position. For this reason, Patent Literature 1 discloses the moving of the visible range according to a change in head position by detecting a change in the head position of the driver, trimming an image from a captured image of the surrounding area according to the change in the head position, and displaying the trimmed image on a display device.

CITATION LIST

Patent Literature

[PTL 1]
JP 2010-179850A

SUMMARY

Technical Problem

Meanwhile, when trimming an image from an image of the surrounding area according to a change in the head position, to alter the visible range according to the change in head position similarly to a rearview mirror, the image should be trimmed appropriately according to the change in the head position. For example, if there is little movement of the image trimming position with respect to a change in the head position, the desired range may not be displayed even after moving one's head similarly to the case of using a rearview mirror to view the desired range.

Accordingly, it is desirable to provide a vehicle display device, display control method, and rearview monitoring system that enables easy viewing of the area around a vehicle.

Solution to Problem

An embodiment of the present technology is a vehicle display device including a display unit, installed in a cabin of a vehicle and having a display face oriented in a different direction from a direction of a driver, configured to display an image depicting a surrounding area of the vehicle, and a mirror unit installed in the cabin of the vehicle and configured to reflect some or all of an image area displayed on the display unit. A visible range of the surrounding area visible to the driver through an image of the display unit reflected in the mirror unit changes according to movement of a viewing position of the driver with respect to the mirror unit.

In the present technology, a display unit and a mirror unit are provided in the cabin of a vehicle. The display face of the display unit is oriented in a different direction from the direction of the driver, and some or all of the image area of the display face is visible to the driver via the mirror unit. On the display unit, an image depicting the area around the vehicle is displayed. Also, of the surrounding area, the visible range that may be viewed by the image of the display unit reflected by the mirror unit changes according to movement of the viewing position of the driver. For example, the brightness is lowered for other display areas except for a display area corresponding to the visible range. Also, movement of the driver is determined, and on the basis of the movement determination result, the display area to be lowered in brightness is controlled to move or extend the visible range according to the movement of the driver. Also, image compression is conducted in the movement direction of the visible range with respect to an edge area in the movement direction of the visible range in an image depicting the area around a vehicle, and on the basis of a movement determination result, the compression ratio or the compression range is controlled to move or extend the visible range. Also, the display of an image depicting a surrounding area is conducting in response to the driver glancing at the mirror unit on the basis of a movement determination result, for example, and the area of the visible range is moved or extended in the case of determining that the driver performed a predefined movement after the detection of the glance. Furthermore, the visible range is extended according to the driver's movement, and the area size of the visible range to extend is controlled on the basis of the driving conditions of the vehicle. A predefined movement by the driver refers to gesture control that detects instructions while also accounting for the driver's gesture features, and an exemplary embodiment will be discussed in detail later.

Another embodiment of the present technology is a display control method including displaying an image depicting a surrounding area of a vehicle on a display unit installed in a cabin of the vehicle and having a display face oriented in a different direction from a direction of a driver, and with a display controller, determining motion of the driver and controlling a display of an image to display on the display unit on the basis of a motion determination result, in a manner that a visible range visible to the driver though an image on the display unit reflected in a mirror unit provided in the cabin of the vehicle changes according to the motion of the driver.

Another embodiment of the present technology is a rearview monitoring system including at least two or more image capture devices attached to a vehicle exterior and facing rearward with respect to a vehicle travel direction, and a display unit provided with at least two or more adjacently arranged screen display areas in a dashboard center in a cabin of the vehicle. In displayed content of captured images to display in the screen display areas, an image from a first image capture device installed on a front side in the vehicle travel direction is arranged above an image from an image capture device installed farther rearward in the vehicle travel direction than the first image capture device.

Another embodiment of the present technology is a rearview monitoring system including at least two or more image capture devices attached to a vehicle exterior and facing rearward with respect to a vehicle travel direction, and a display unit provided with at least two or more adjacently arranged screen display areas in a cabin of the vehicle. In displayed content of captured images to display in the screen display areas, a vanishing point at infinity included in an image from a first image capture device installed on a front side in the vehicle travel direction is arranged above a vanishing point at infinity included in an image from an image capture device installed farther rearward in the vehicle travel direction than the first image capture device.

Advantageous Effects of Invention

According to one or more embodiments of the present technology, an image depicting the area around a vehicle is displayed on a display unit that is installed in the cabin of the vehicle and whose display face is oriented in a different direction from the direction of the driver. A mirror unit is installed in the cabin of the vehicle and reflects some or all of the image area displayed on the display unit. The visible range of the surrounding area that is visible to the driver through the image of the display unit reflected in the mirror unit changes according to movement of the viewing position of the driver with respect to the mirror unit. For this reason, when an image of the area around a vehicle is captured and displayed on the display unit so that the surrounding area may be checked, a desired range of the surrounding area, such as a view of the rear and surroundings, for example, may be checked easily in a similar sense as a optical rearview mirror of the past. Note that the advantageous effects described in this specification are merely for the sake of example and non-limiting, and there may be additional advantageous effects.

BRIEF DESCRIPTION OF DRAWINGS

FIG. 5 is a diagram typifying the relationship between change of focus and reaction time.

FIG. 21 is a diagram illustrating an example of a relationship between driving conditions determination results and visible range modes.

FIG. 33 is a diagram illustrating an example of the placement of a surrounding area image capture unit and a surrounding image displayed on a display unit.

FIG. 35 is a diagram for explaining the changing of a surrounding area image when the head moves in a leftward direction.

FIG. 39 is a diagram for explaining the changing of an image joining position.

DESCRIPTION OF EMBODIMENTS

Figure 1:
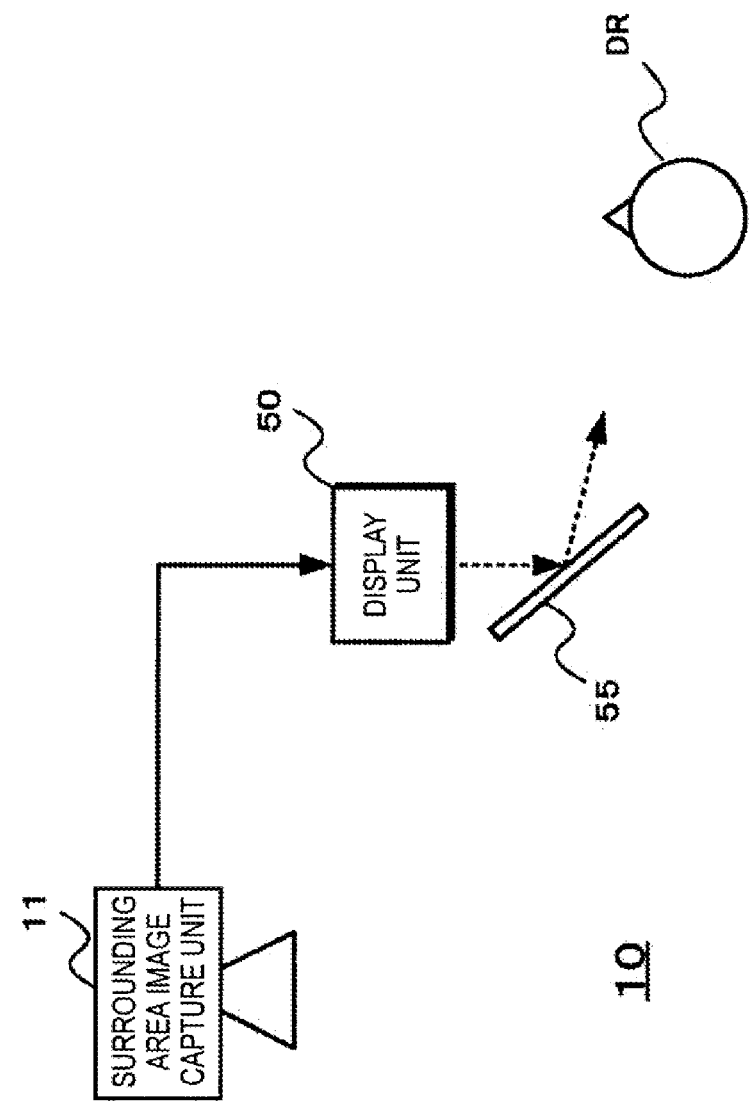
FIG. 1 is a diagram illustrating an example of a configuration of a first embodiment.

Hereinafter, embodiments of the present technology will be described. Note that the description will proceed in the following order.

1. First Embodiment
1-1. Configuration of first embodiment
1-2. Operation of first embodiment
1-3. Other configurations and operation of first embodiment
2. Second Embodiment
2-1. Configuration of second embodiment
2-2. Operation of second embodiment
3. Third Embodiment
3-1. Configuration of third embodiment
3-2. Operation of third embodiment
4. Fourth Embodiment
4-1. Configuration of fourth embodiment
4-2. Operation of fourth embodiment
5. Other embodiments

1. First Embodiment (1-1. Configuration of First Embodiment)

Figure 2:
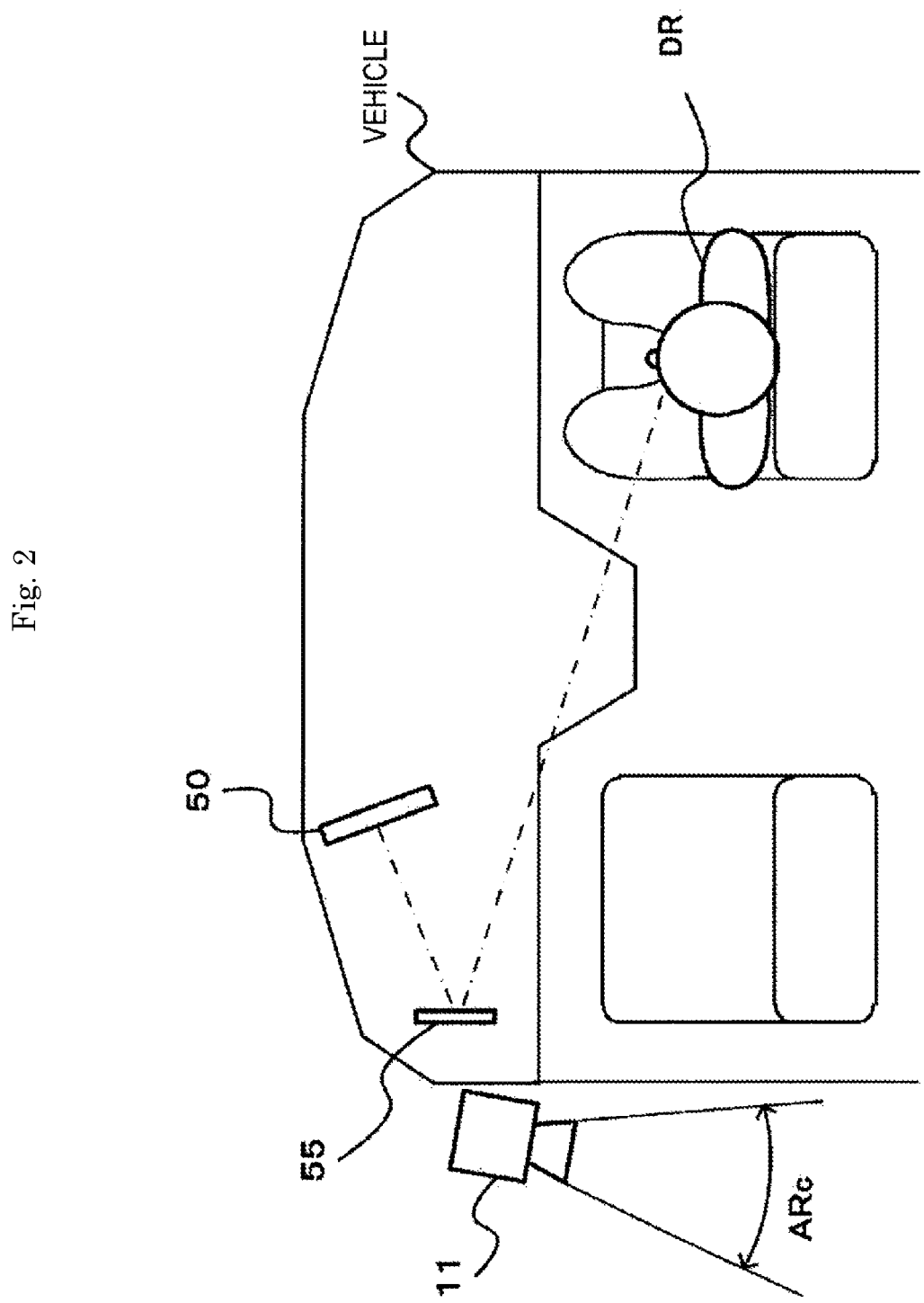
FIG. 2 is a diagram illustrating an example of a positional relationship between a driver, a display unit, and a mirror unit.

FIG. 1 illustrates an example of a configuration of the first embodiment. A display device 10 is equipped with a surrounding area image capture unit 11, a display unit 50, and a mirror unit 55. Also, FIG. 2 is a diagram illustrating an example of a positional relationship between a driver, a display unit, and a mirror unit.

Figure 3:
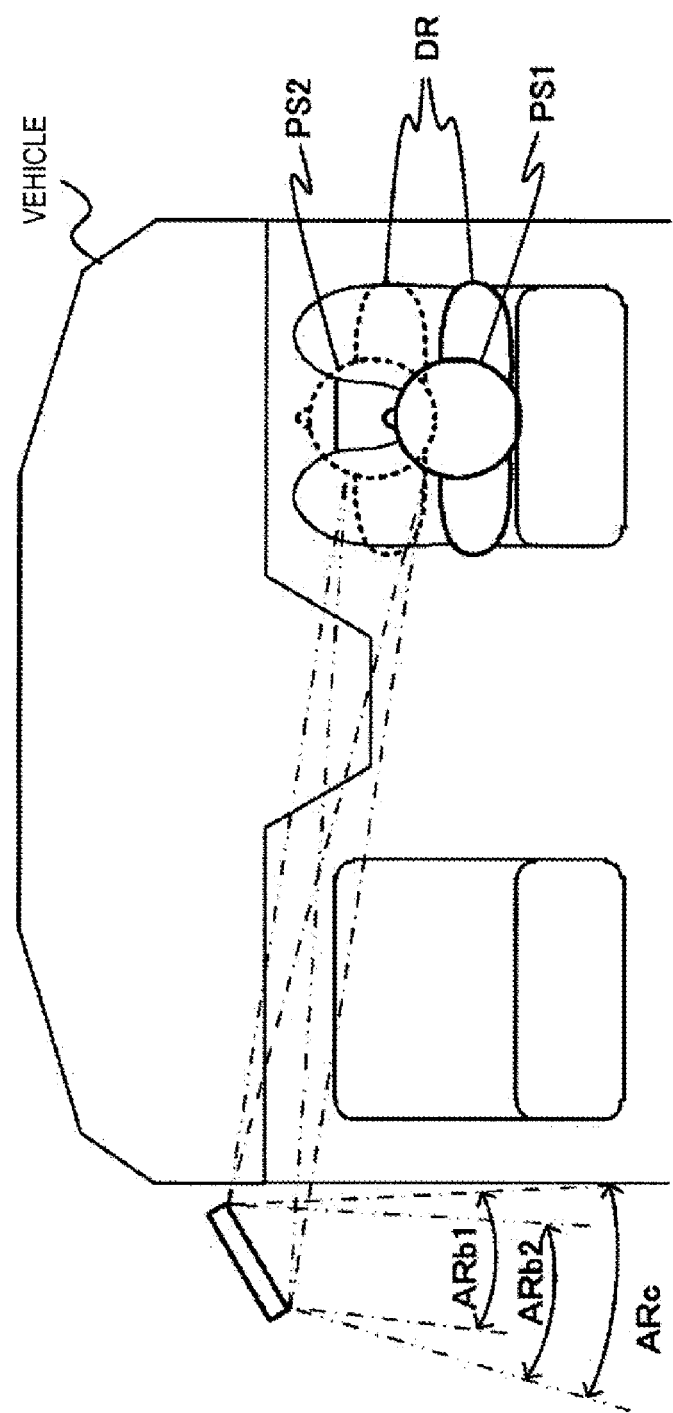
FIG. 3 is a diagram for explaining an image capture range of a surrounding area image capture unit.

The surrounding area image capture unit 11 captures an image of the surrounding area around a vehicle, and outputs an image signal to the display unit 50. FIG. 3 is a diagram for explaining an image capture range of a surrounding area image capture unit. For example, suppose that the range of the area ARb1 among the surrounding area may be viewed by the driver DR at the head position (the position of the eyes) PS1 when using a rearview mirror 91. Note that in the following description, the torso position and the position of the eyes will be simply referred to as the head position.

Suppose that the range of the area ARb2 among the surrounding area may be viewed when the driver DR moves the head position to a position PS2. The surrounding area image capture unit 11 captures an image of the range of an area ARc that includes the area ARb1 and the area ARb2, for example, and generates an image signal. In this way, by configuring the image capture range, the surrounding area image capture unit 11 is able to generate an image signal depicting the surrounding area that is visible when using the rearview mirror 91. Note that the image capture range of the surrounding area image capture unit 11 is not limited to the range of the area ARc that includes the area ARb1 and the area ARb2, and may be taken to be the range with a wider angle of view than the area ARc, for example. Hereinafter, the area captured by the surrounding area image capture unit 11 will be designated the captured surrounding area.

The display unit 50 is installed so that the display face is indirectly visible to the driver DR via the mirror unit 55, and displays on the display face an image captured by the surrounding area image capture unit 11 (hereinafter designated the "captured image of the surrounding area"). Note that in a display image of the display unit 50, the image area that corresponds to the range of the surrounding area that is visible to the driver via the mirror unit 55 (hereinafter designated the "visible range") will be referred to as the monitor image area.

The mirror unit 55 is provided so that the display face of the display unit 50 is indirectly visible to the driver DR. The mirror unit 55 is placed inside the vehicle, at a position near a pillar, for example, so that an image reflected in the mirror unit 55 is visible when the driver DR performs an operation similar to the operation of looking at a rearview mirror of the past, for example.

In addition, the display unit 50 with respect to the mirror unit 55 is provided with a display size and a spacing with the mirror unit 55 so that a captured image of the surrounding area on the display unit 50 reflected in the mirror unit 55 is similar to the surrounding area reflected in a rearview mirror of the past. Furthermore, the display unit 50 and the mirror unit 55 are arranged so that the visible range of the surrounding area that is visible to the driver from the image of the display unit 50 reflected in the mirror unit 55 is changed according to movement of the viewing position of the driver with respect to the mirror unit 55.

Figure 4:
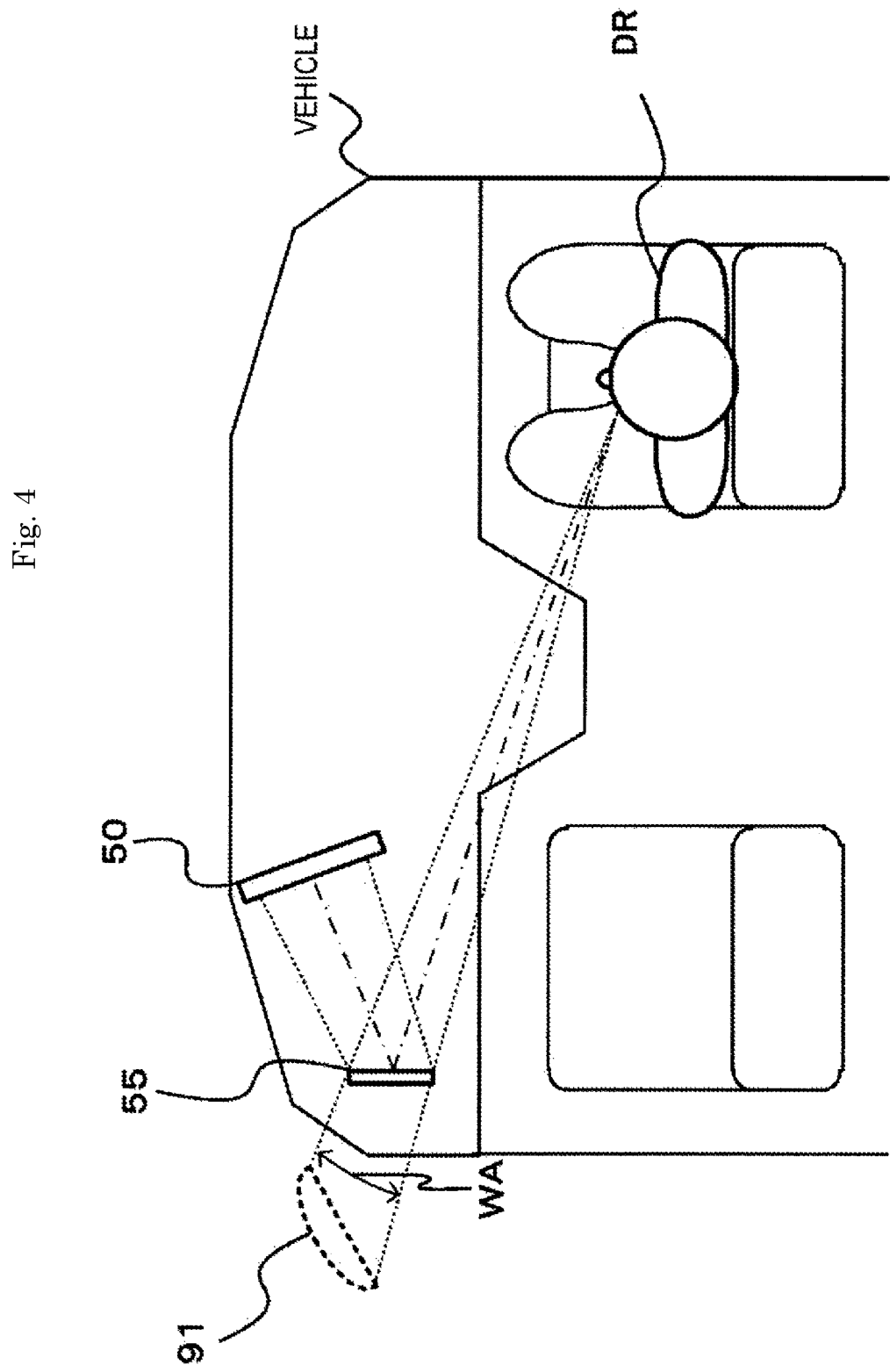
FIG. 4 is a diagram illustrating a relationship between a mirror unit and display unit, and a rearview mirror of the past.

FIG. 4 illustrates a relationship between a mirror unit and display unit, and a rearview mirror of the past. The mirror plane size and position of the mirror unit 55 are provided to approximately match the mirror plane range (the range of the arrow WA) of a rearview mirror 91 when the driver DR looks at the rearview mirror 91. In addition, in the image area of the display unit 50 visible via the mirror unit 55, a captured image of the surrounding area reflected in the mirror plane of the rearview mirror 91 is displayed. According to such a configuration, the display unit 50 and the mirror unit 55 may be used to obtain operational effects that are similar to a rearview mirror 91 of the past. Although the practical example herein cites an example of a side (rearview) mirror positioned near the A-pillar of the past and the positional relationship of the mirror unit 55 to be arranged to achieve a similar visibility direction, an arrangement in which the visibility direction comes to the dashboard center, similarly to the visibility direction of a fender mirror, is also acceptable, and as an arrangement that realizes fewer neck-turning operations by the driver, the advantage of an effective burden reduction is also anticipated.

For the display device 10, in order for a captured image of the surrounding area to be indirectly visible to the driver DR via the mirror unit 55, the distance from the driver DR to the display face of the display unit 50 is increased compared to the case of the driver DR directly viewing the display face on the display unit 50.

FIG. 5 is a diagram typifying the relationship between a change of focus in the eyes of the driver, and reaction time. As illustrated in FIG. 5(A), when switching the focus of the eyes between the two points of a visible object OBa at infinity and a visible object OBb at close range, the reaction time to adjust focus from one object to the other varies depending on the distance LA to the visible object OBb at close range. FIG. 5(B) illustrates the relationship between the distance LA to the visible object OBb at close range and the reaction time TR. After the distance to the visible object OBb at close range becomes shorter than a certain distance, there is a tendency for the reaction time TR to become longer as the distance to the visible object OBb becomes shorter. Herein, the solid line is for the case of the elderly, while the dashed line is for the middle-aged, and the one-dot chain line is for the young. For this reason, in the present technology, by increasing the distance from the driver DR to the display face of the display unit 50 in order for a captured image of the surrounding area to be indirectly visible to the driver DR via the mirror unit 55, fast perception work becomes possible. Specifically, the display unit 50 and the mirror unit 55 are arranged or optically designed so that the optical viewing distance from the driver DR to the display face of the display unit 50 via the mirror unit 55 becomes at least 1.1 m or greater. By arranging the display unit 50 and the mirror unit 55 in this way, with the display device 10, the time over which the driver adjusts focus to a captured image of the surrounding area displayed on the display unit 50 is brought closer to the time over which the driver adjusts focus to an object seen via a rearview mirror.

In addition, in the display device 10, since a captured image of the surrounding area is indirectly visible to the driver DR via the mirror unit 55, the display unit 50 is arranged so that the display face and illuminating light from the display face are not directly visible to the driver DR. In addition, a configuration provided with a shield that blocks the display face of the display unit 50 and illuminating light from the driver DR may also be used.

(1-2. Operation of First Embodiment)

Figure 6:
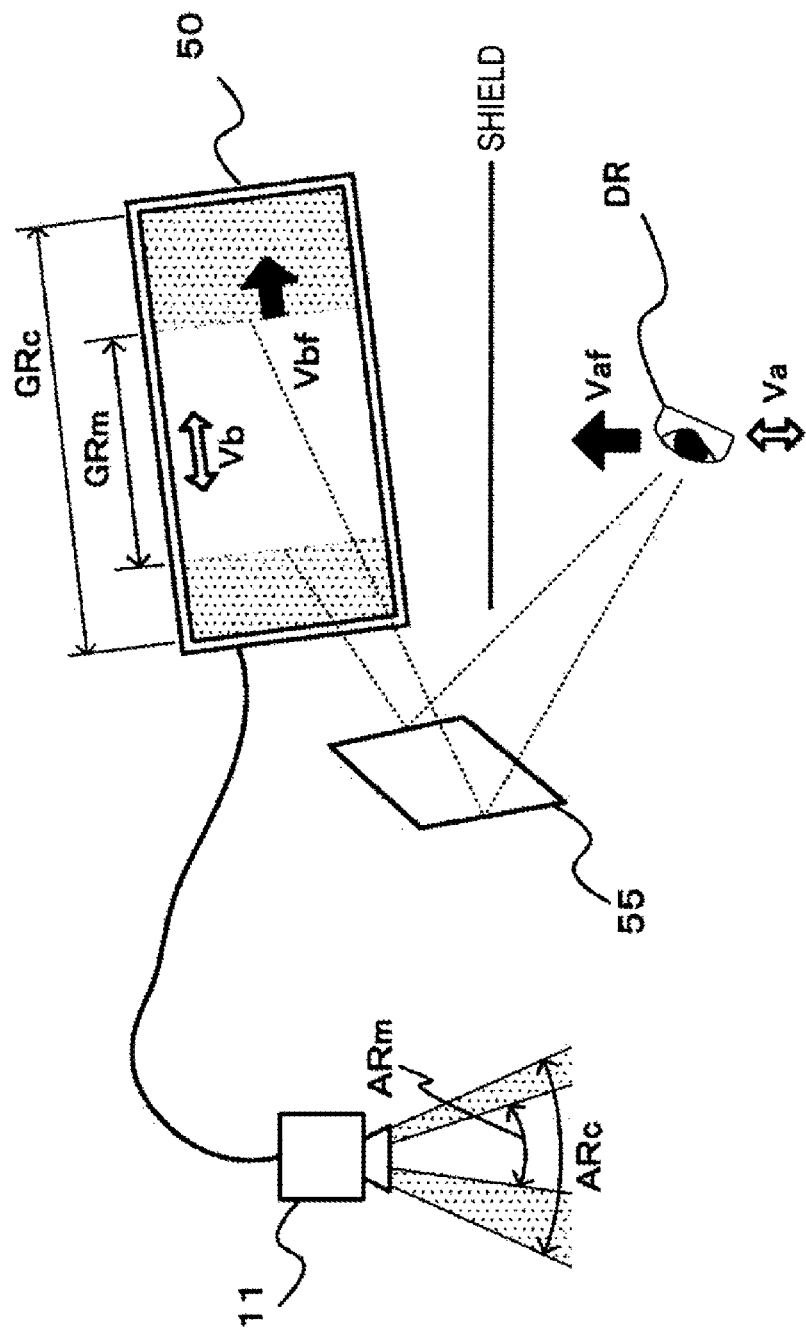
FIG. 6 is a diagram for explaining operation of a first embodiment.

FIG. 6 is a diagram for explaining operation of a first embodiment. The display unit 50 displays a captured image that has been captured by the surrounding area image capture unit 11. The mirror unit 55 is configured as a planar mirror, for example, and sized so that a partial area GRm of the display area GRc of the display unit 50 is visible when the driver DR indirectly views a captured image of the surrounding area via the mirror unit 55. Note that the area GRm is designated the monitor image area. Also, the display unit 50 displays an image of the area ARc captured by the surrounding area image capture unit 11 in the display area GRc.

The display unit 50 and the mirror unit 55 are arranged so that when the driver DR of the vehicle moves his or her head position to change the visible range, such as by moving in the direction of the arrow Va, for example, the monitor image area GRm that is visible via the mirror unit 55 moves in the direction of the arrow Vb, similarly to the case of a rearview mirror of the past. Specifically, the display unit 50 and the mirror unit 55 are arranged so that when the head position is moved, the movement direction of the monitor image area GRm becomes the lengthwise direction of the display area on the display unit 50.

At this point, when the head position of the driver DR facing in the direction of the mirror unit 55 is at the position illustrated in the drawing, the driver DR is able to check the conditions of the visible range ARm of the surrounding area by viewing the image of the monitor image area GRm via the mirror unit 55.

Next, if the driver DR moves his or her head position in the direction of the arrow Vaf pointing towards the front of the vehicle in order to check an area farther outward than the visible range ARm, the monitor image area GRm visible to the driver DR via the mirror unit 55 moves in the direction of the arrow Vbf. In other words, the driver DR, by moving his or her head position towards the front of the vehicle and viewing the image in the monitor image area via the mirror unit 55, is able to check the conditions of an area farther outward in the surrounding area than before moving the head position.

Additionally, if the driver DR moves his or her head position towards the rear of the vehicle (the opposite direction of the arrow Vaf), the monitor image area GRm visible to the driver DR via the mirror unit 55 moves in the opposite direction of the arrow Vbf. In other words, the driver DR, by moving his or her head position towards the rear of the vehicle and viewing the image in the monitor image area via the mirror unit 55, is able to check the conditions of an area farther inward in the surrounding area than before moving the head position.

Consequently, by causing the driver to view an image of the display unit 50 via the mirror unit 55, a desired area of the surrounding area may be checked similarly to the case of using a rearview mirror. In addition, since the display unit 50 and the mirror unit 55 are provided in the cabin of the vehicle, the surrounding area may be checked well, without being adversely affected by the side windows as in the case of using a rearview mirror. For example, it is possible to avoid difficulty in checking the surrounding area due to fogging or the adherence of raindrops or the like on the side windows, for example.

(1-3. Other Configurations and Operation of the First Embodiment)

Meanwhile, although the mirror unit 55 according to the first embodiment discussed above is described as being configured as a planar mirror, the mirror unit 55 is not limited to being a planar mirror, and may also be configured to include a curved part. By partially curving the mirror unit 55, an advantageous effect corresponding to a convex rearview mirror may be obtained.

Figure 7:
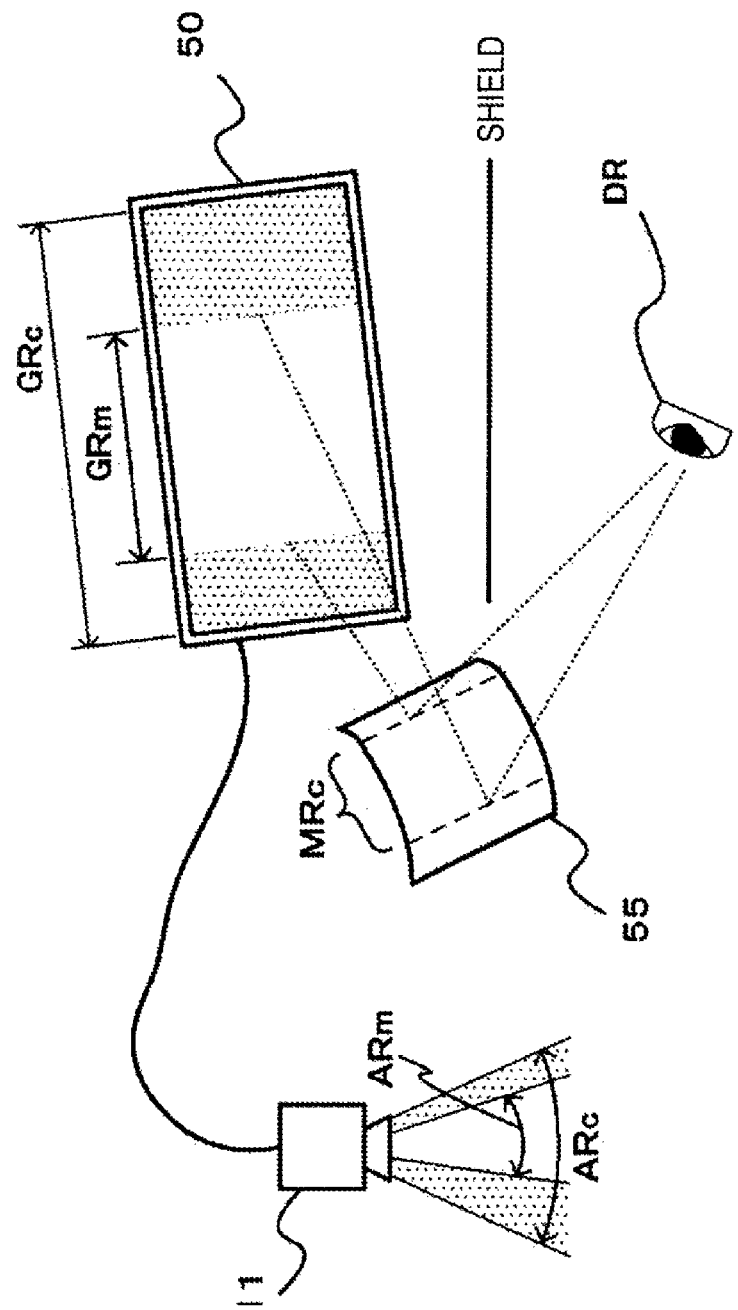
FIG. 7 is a diagram illustrating an example of a case in which the mirror unit includes a curved part.

FIG. 7 illustrates an example of a case in which the mirror unit includes a curved part. The shape of the mirror unit 55 in the movement direction of the visible range, or in other words, in the movement direction of the monitor image area GRm according to movement of the head position of the driver DR, is made to be a curved shape projecting out in the direction of the driver DR, for example. In addition, in the mirror unit 55, the curvature of a central part MRc is less than at the ends of the movement direction of the visible range, and made to be an approximately planar shape.

By curving the ends in this way, the image becomes compressed in the movement direction of the visible range at the curved part. Consequently, if the central part MRc of the mirror unit 55 is taken to be the area corresponding to the monitor image area GRm, the part of the surrounding area that is farther outward or inward from the visible range ARm corresponding to the monitor image area GRm may be checked with the compressed image at the ends of the mirror unit 55. Consequently, it is possible to ensure a wider area of the surrounding area that may be checked by the driver, compared to the case of using a planar mirror.

2. Second Embodiment (2-1. Configuration of Second Embodiment)

Figure 8:
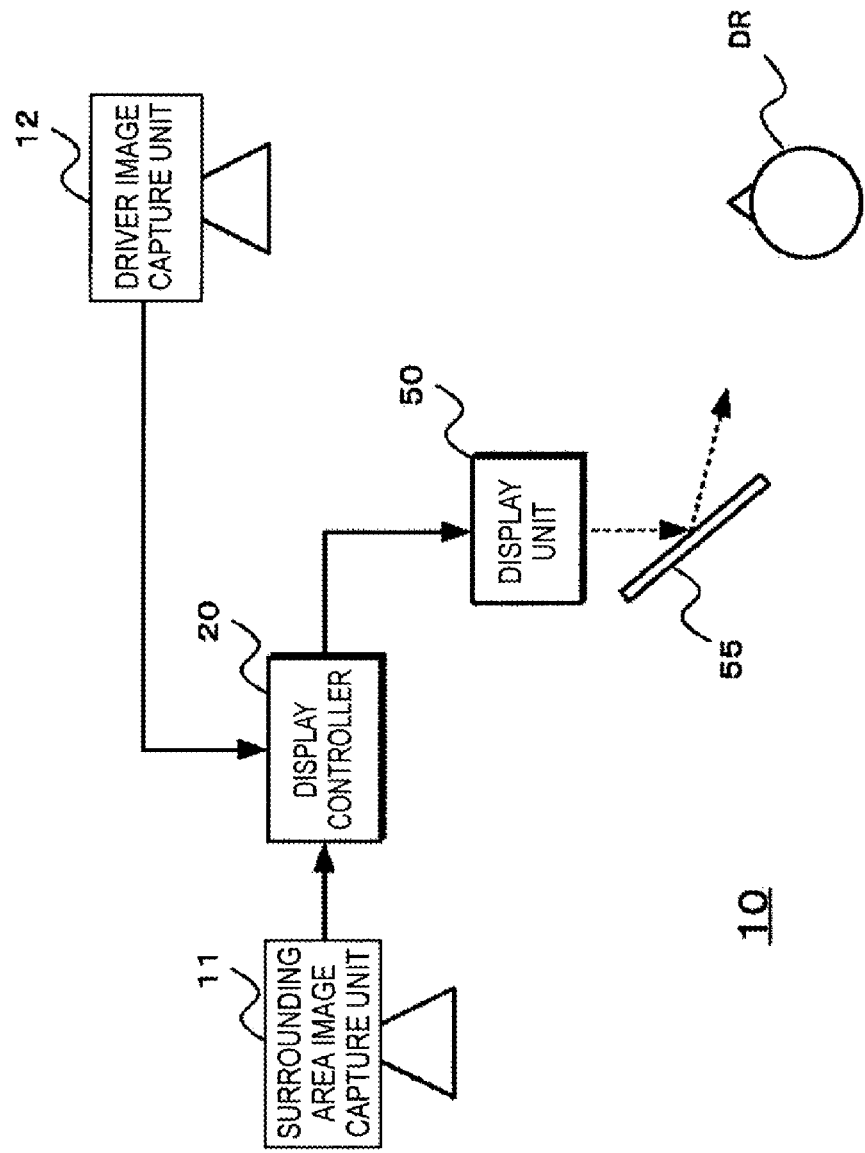
FIG. 8 is a diagram illustrating an example of a configuration of a second embodiment.
Figure 9:
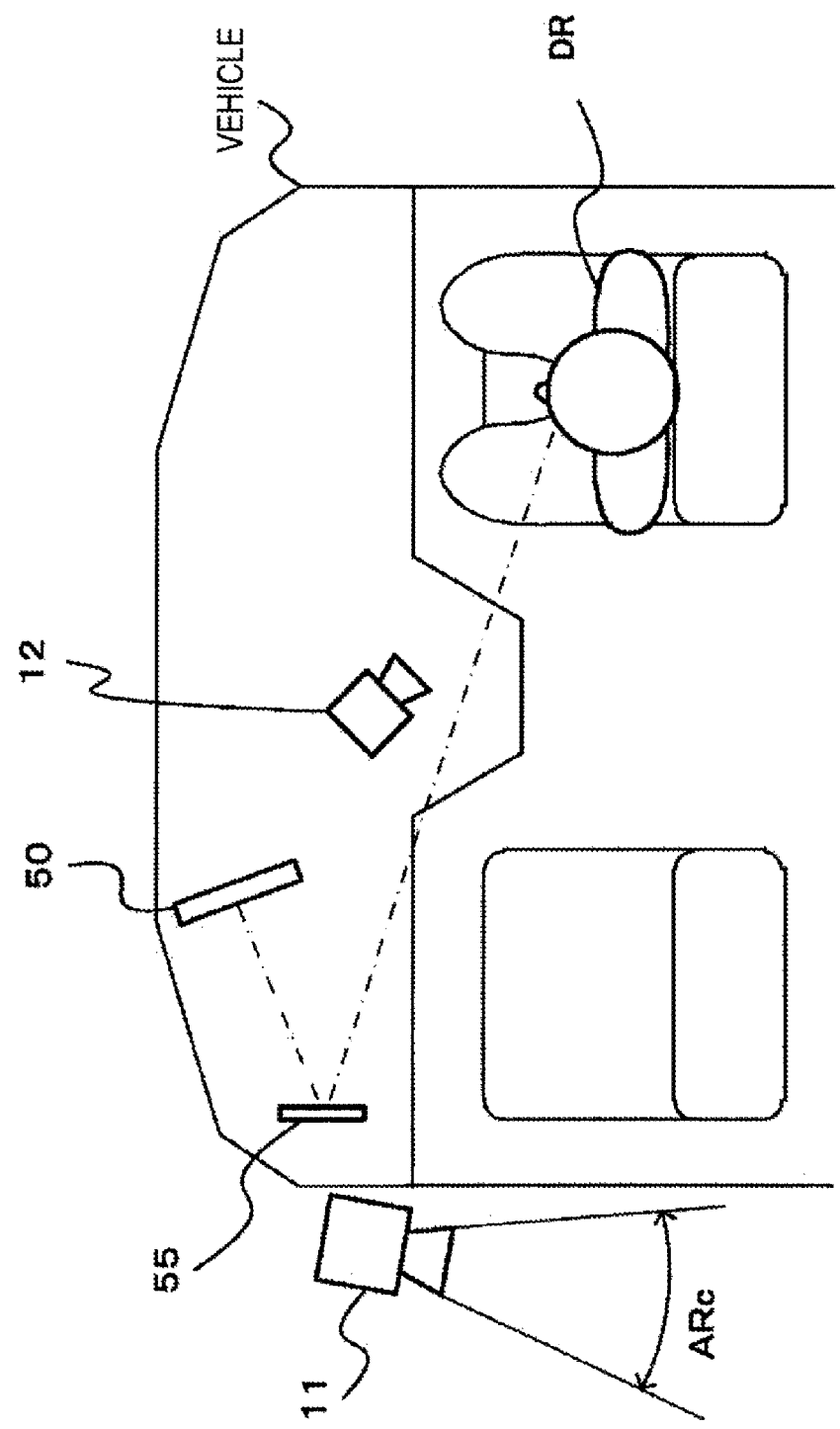
FIG. 9 is a diagram illustrating an example of a positional relationship between a driver, a display unit, and a mirror unit.

FIG. 8 illustrates an example of a configuration of a second embodiment. A display device 10 is equipped with a surrounding area image capture unit 11, a driver image capture unit 12, a display controller 20, a display unit 50, and a mirror unit 55. Meanwhile, FIG. 9 is a diagram illustrating an example of a positional relationship between a driver, a display unit, a mirror unit, and a driver image capture unit.

The surrounding area image capture unit 11 captures an image of the surrounding area around a vehicle, and outputs an image signal to the display controller 20. Note that the area captured by the surrounding area image capture unit 11 will be designated the captured surrounding area.

The driver image capture unit 12 is provided in front of the driver DR or in the direction in which the mirror unit 55 is installed, for example, to enable determination of properties such as the head position, head orientation (corresponding to the orientation of the face), and line of sight orientation of the driver DR. The driver image capture unit 12 captures an image of the driver DR, and outputs an image signal to the display controller 20.

The display controller 20 causes the display unit 50 to display a captured image of the surrounding area that has been captured by the surrounding area image capture unit 11. In addition, the display controller 20 controls the display of an image displayed on the display unit 50 according to predetermined display change communication operations, on the basis of properties such as the head position, head orientation, and line of sight orientation of the driver, as well as movement of the position and orientation.

The display unit 50 is arranged so that the display face of the display unit 50 is indirectly visible to the driver via the mirror unit 55. Also, the display face of the display unit 50 is configured to a size so that a display image of the display unit 50 is visible via the mirror unit 55, even if the driver DR moves his or her head position to check an area over a wide range with a rearview mirror while driving, for example. Note that in a display image of the display unit 50, the area that corresponds to the visible range of the surrounding area that the driver checks via the mirror unit 55 will be referred to as the monitor image area.

The mirror unit 55 is provided so that the display face of the display unit 50 is indirectly visible to the driver DR. The mirror unit 55 is placed inside the vehicle, at a position near a pillar, for example, so that an image reflected in the mirror unit 55 is visible when the driver DR performs an operation of looking at a rearview mirror of the past, for example. In addition, the positional relationship of the mirror unit 55 with the display unit 50 and the size of the mirror unit 55 are configured so that when the driver DR indirectly views a captured image of the surrounding area via the mirror unit 55, the entire display area of the display unit 50 is reflected in the mirror unit 55. Furthermore, in the display unit 50 and the mirror unit 55, the visible range of the surrounding area that is visible to the driver from the image of the display unit 50 reflected in the mirror unit 55 is changed by display control of the display controller 20, according to movement of the viewing position of the driver with respect to the mirror unit 55. As illustrated in FIG. 4, the mirror plane size and position of the mirror unit 55 are provided to approximately match the mirror plane range (the range of the arrow WA) of a rearview mirror 91 when the driver DR looks at the rearview mirror 91. According to such a configuration, the display unit 50 and the mirror unit 55 may be used to obtain operational effects that are similar to a rearview mirror 91 of the past.

For the display device 10, in order for a captured image of the surrounding area to be indirectly visible to the driver DR via the mirror unit 55, the distance from the driver DR to the display face of the display unit 50 is increased compared to the case of the driver DR directly viewing the display face on the display unit 50.

In addition, in the display device 10, since a captured image of the surrounding area is indirectly visible to the driver DR via the mirror unit 55, the display unit 50 is arranged so that the display face and illuminating light from the display face are not visible to the driver DR. In addition, a configuration provided with a shield that blocks direct view of the display face of the display unit 50 and illuminating light from the driver DR may also be used. Although the practical example herein describes the positional relationship of the mirror unit 55 to be arranged to achieve a visibility direction similar to a rearview mirror positioned near the A-pillar of the past, an arrangement in which the line of sight comes to the dashboard center with a visibility direction corresponding to a fender mirror is also acceptable.

Figure 10:
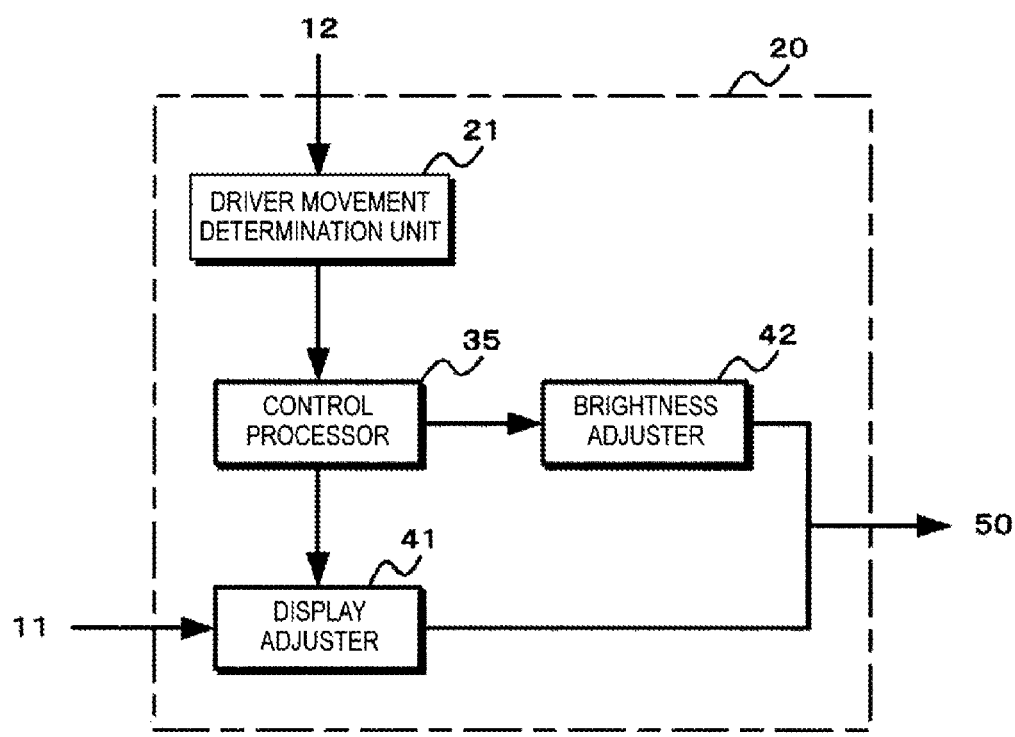
FIG. 10 is a diagram illustrating a configuration of a display controller.

FIG. 10 is a diagram illustrating a configuration of a display controller. The display controller 20 is equipped with a driver movement determination unit 21, a control processor 35, a display adjuster 41, and a brightness adjuster 42.

The driver movement determination unit 21, on the basis of an image signal supplied from the driver image capture unit 12, detects the head position of the driver, and determines the movement direction and movement magnitude of the head position of the driver. For example, the driver movement determination unit 21 conducts facial recognition of the driver on the basis of an image signal supplied from the driver image capture unit 12, for example, and determines the position of the recognized face, the orientation of the face (corresponding to the orientation of the head), and the orientation of the line of sight. Furthermore, the driver movement determination unit 21 tracks the recognized face, and determines the movement direction and movement magnitude of the head position. The driver movement determination unit 21 outputs a determination result to the control processor 35.

The control processor 35, on the basis of a determination result from the driver movement determination unit 21, generates a control signal to control the display differently for the monitor image area and the other area (hereinafter called the "non-monitor image area") of the display unit 50, and outputs to the display adjuster 41 and the brightness adjuster 42.

The display adjuster 41, on the basis of a control signal from the control processor 35, conducts a scale adjustment of the captured image of the surrounding area on an image signal supplied from the surrounding area image capture unit 11, such as by applying image compression to the non-monitor image area, for example.

The brightness adjuster 42, on the basis of a control signal from the control processor 35, lowers the brightness of the non-monitor image area on the display unit 50 to less than the monitor image area. If the display unit 50 is configured using display elements that may require illumination, such as liquid crystal elements, for example, the brightness adjuster 42 controls a partial area of the illumination, such as the backlight of a liquid crystal panel, for example, to lower the brightness of the non-monitor image area to less than the monitor image area. Meanwhile, if the display unit 50 is configured using display elements that do not require illumination or using light-emitting elements, such as organic EL display elements, for example, a process may be conducted to lower the signal level of a luma signal corresponding to the non-monitor image area.

(2-2. Operation of Second Embodiment)

Figure 11:
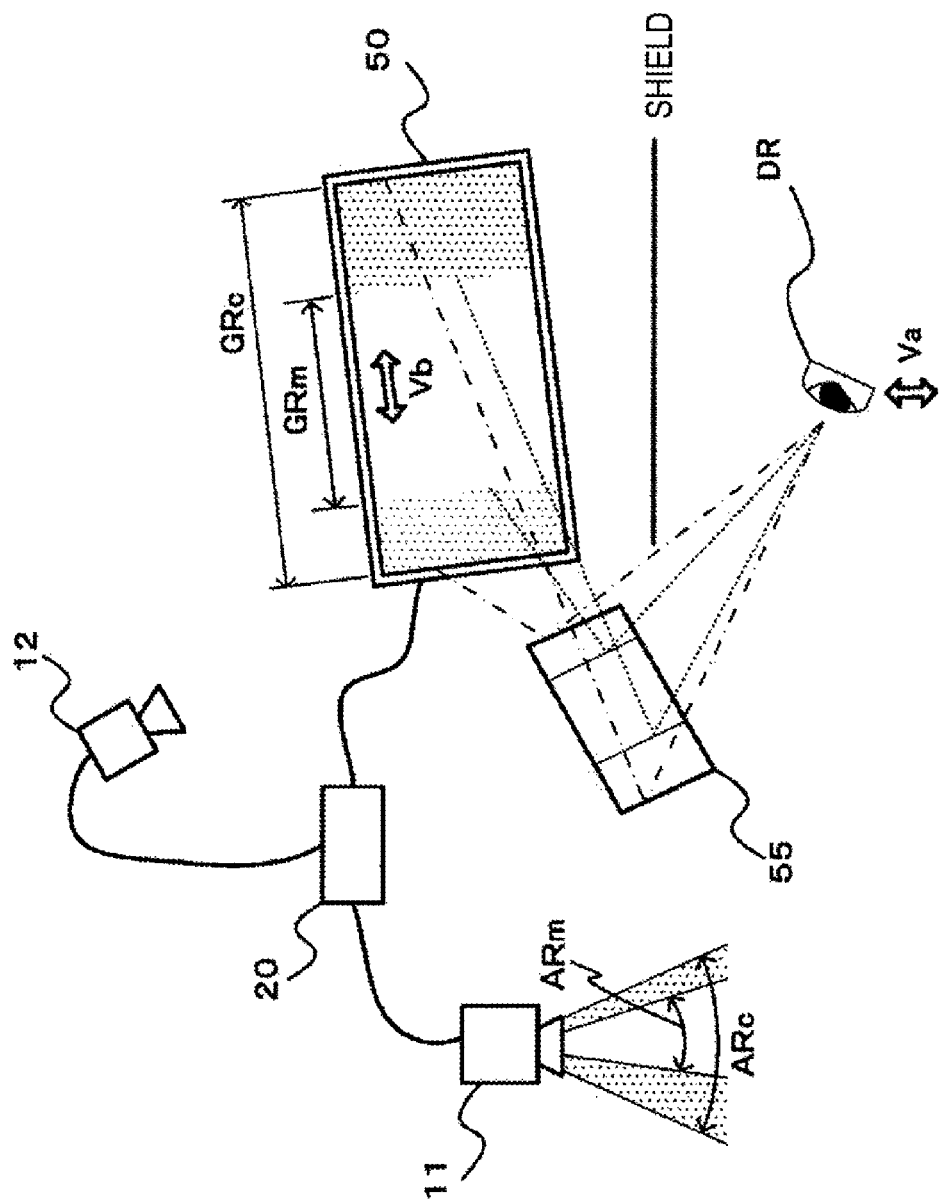
FIG. 11 is a diagram for explaining operation of a second embodiment.

FIG. 11 is a diagram for explaining operation of a second embodiment. The display controller 20 displays an image of the area ARc captured by the surrounding area image capture unit 11 in the display area GRc of the display unit 50. The mirror unit 55 is configured as a planar mirror, for example, and sized so that the display area GRc of the display unit 50 is visible when the driver DR indirectly views a captured image of the surrounding area via the mirror unit 55.

In addition, the display controller 20 conducts a brightness control, compression process, and the like on the display image in the display area GRc, and presents a display in the display area GRc that distinguishably displays an image of the visible range, which is the range of the surrounding area visible to the driver via the mirror unit 55. Herein, the display area corresponding to the visible range is designated the monitor image area GRm.

Furthermore, the display controller 20 moves the monitor image area GRm in the direction of the arrow Vb, on the basis of the movement of the driver DR captured by the driver image capture unit 12, such as movement in the front-back direction of the vehicle (the direction of the arrow Va), for example. Alternatively, instead of moving the monitor image area GRm, the display controller 20 moves the visible range ARm corresponding to the monitor image area GRm, extends the monitor image area GRm in the direction of the arrow Vb, or the like.

Regarding the movement speed of an image, if a sudden change occurs in the displayed content of the image while the driver is momentarily looking at something other than the monitor image, for example, there is a risk of losing one's grasp of the situation. Accordingly, sudden screen movement is avoided, and the average movement of a display image is kept within a maximum of 0.2 s per total movement magnitude (the magnitude of a shift in the entire angle of view). Herein, by staying within a screen change reaction delay time of 200 ms associated with the position detection of the head and line of sight discussed later, it is possible to avoid or moderate a reduced sense of user control compared to the case of using a rearview mirror of the related art, while at the same time, it is possible to satisfactorily avoid the overlooking of dangers due to a delay in grasping the surrounding conditions.

It is also anticipated that the driver will perform an operation to obtained direct visual information through a window that differs from the information about the rear surroundings during the slight interval after giving an instruction to change the screen display area. In this case, the driver looks in the window direction past the mirror unit 55, and after momentarily taking one's attention off the screen, once again returns to the step of checking the display screen via the mirror unit 55. Consequently, if the entire screen content has changed during this interval, there is a risk of losing one's grasp of the situation. Accordingly, the display range due to such screen changes keeps at least ¼ of the originally display content after a change, and keeps to movement in which part of the screen from before the change is included on the screen after the change. For example, when the driver transfers attention to other visual information (for example, the direct visual field seen past the mirror unit 55 and the window) while the screen is changing and moving, and then returns his or her line of sight to the display unit 50, the continuity of the remembered screen may reduce the loss of one's grasp on the display unit that may occur momentarily.

Figure 12:
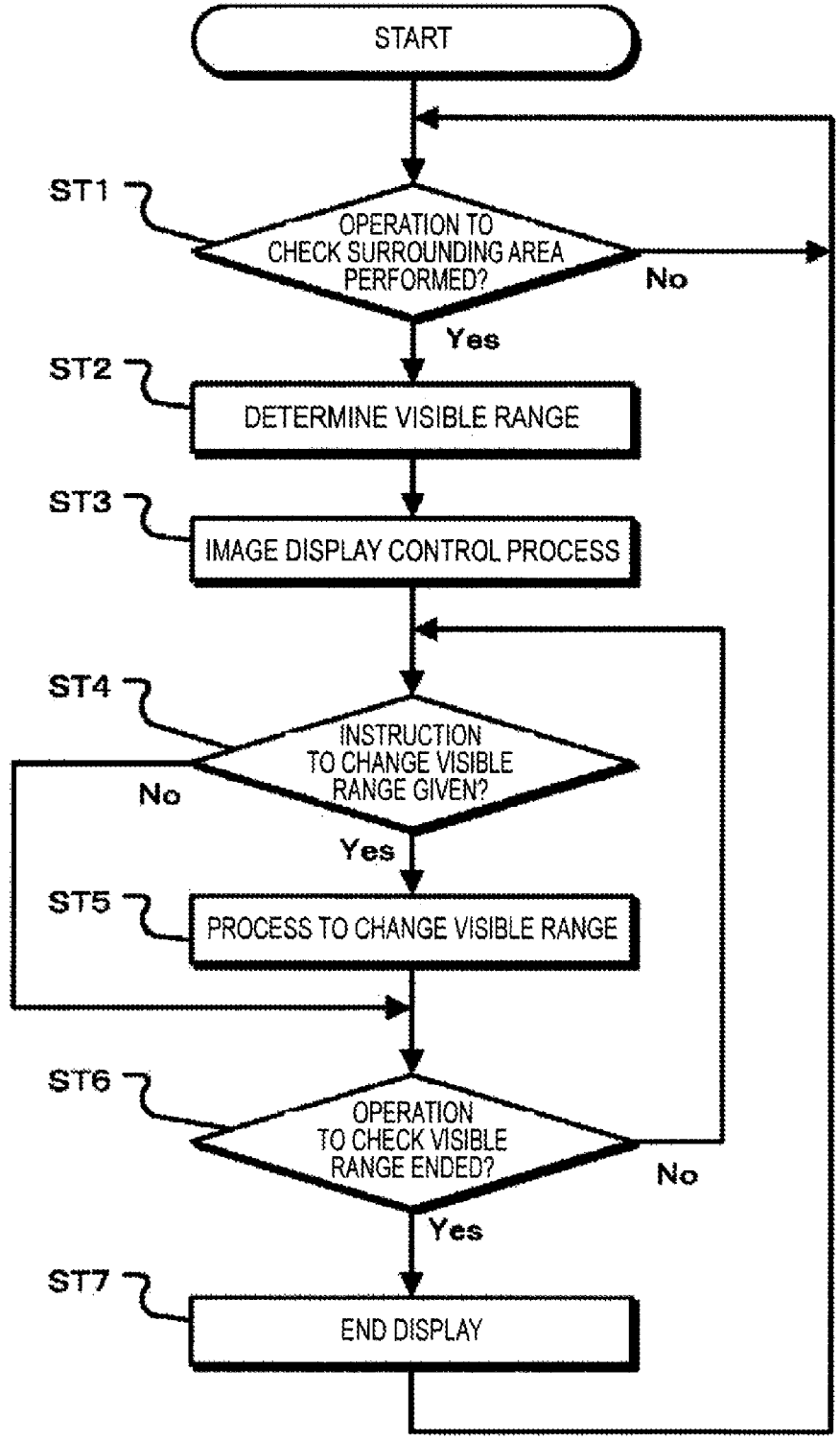
FIG. 12 is a flowchart illustrating operation of a display controller.

FIG. 12 is a flowchart illustrating operation of a display controller. In step ST1, the display controller 20 determines whether or not an operation of checking the surrounding area has been performed. Herein, an operation of checking the surrounding area refers to the overall operation of the driver viewing a screen on a display device via a monitoring system made up of an image capture device and a display device. The display controller 20, on the basis of an image signal supplied from the driver image capture unit 12, determines whether or not the driver's head orientation and line of sight direction are in the direction of the mirror unit 55, for example. If the driver's head orientation and line of sight direction are in the direction of the mirror unit 55, such as when the driver glances in the direction of the mirror unit 55, for example, the display controller 20 determines that an operation of checking the surrounding area has been performed, and proceeds to step ST2. Meanwhile, if the driver's head orientation and line of sight direction are not in the direction of the mirror unit 55, the display controller 20 determines that an operation of checking the surrounding area has not been performed, and returns to step ST1.

In step ST2, the display controller 20 determines the visible range. The display controller 20, on the basis of an image signal supplied from the driver image capture unit 12, detects the driver's head position, for example, determines the visible range that is visible from the detected head position via the mirror unit 55, and proceeds to step ST3.

In step ST3, the display controller 20 conducts an image display control process. The display controller 20 displays an image of the visible range on the display unit 50 as an image in the monitor image area. In addition, if a high-brightness subject is depicted in the non-monitor image area, the display controller 20 controls the partial backlight or the brightness level, for example, so that the driver's vision is not impaired by the display content of the high level of brightness emitted from the image. In addition, when treating a predetermined area of the display unit 50 as a monitor image area, the display controller 20 conducts a process such as compressing the image of the surrounding area corresponding to the non-monitor image area, so that the desired visible range may be checked from the image in the monitor image area. The display controller 20 conducts an image display control process, and proceeds to step ST4.

In step ST4, the display controller 20 determines whether or not an instruction to change the visible range has been given. The display controller 20, on the basis of an image signal supplied from the driver image capture unit 12, determines the driver's head position, for example, and determines whether or not an instruction operation has been performed to change the visible range of the surrounding area. If the driver's head position produced a predetermined motion, the display controller 20 determines that an instruction to change the visible range has been given, and proceeds to step ST5. Meanwhile, if the driver's head position does produce a predetermined motion, the display controller 20 determines that an instruction to change the visible range has not been given, and proceeds to step ST6.

In step ST5, the display controller 20 conducts a process to change the visible range. The display controller 20 moves the visible range that is visible to the driver, according to the motion of the driver's head position. The display controller 20 controls the backlight or brightness level to move a darkly-displayed area according to the motion of the driver's head position, for example, thereby changing the brightly-displayed monitor image area. Also, the display controller 20 additionally compresses the image in the non-monitor image area provided on the opposite side of the movement direction of the monitor image area, for example, thereby moving the visible range displayed by the image in the monitor image area according to the motion of the driver's head position. Additionally, since the range of the surrounding area displayed on the non-monitor image area provided in the movement direction of the monitor image area becomes smaller in range, there is less compression of the non-monitor image area. The display controller 20 conducts a process to change the visible range, and proceeds to step ST6.

In step ST6, the display controller 20 determines whether or not an operation of checking the surrounding area has ended. The display controller 20, on the basis of an image signal supplied from the driver image capture unit 12, determines whether or not the driver's head orientation and line of sight direction are no longer in the direction of the mirror unit 55, for example. If the driver's head orientation and line of sight direction continue to be in the direction of the mirror unit 55, the display controller 20 determines that an operation of checking the surrounding area has not ended, and returns to step ST4. Meanwhile, if the driver's head orientation and line of sight direction are no longer in the direction of the mirror unit 55, the display controller 20 determines that an operation of checking the surrounding area has ended, and proceeds to step ST7.

In step ST7, the display controller 20 ends the display. The display controller 20 ends the image display of the surrounding area on the display unit 50 to allow the driver to concentrate on driving, and returns to step ST1.

Figure 13:
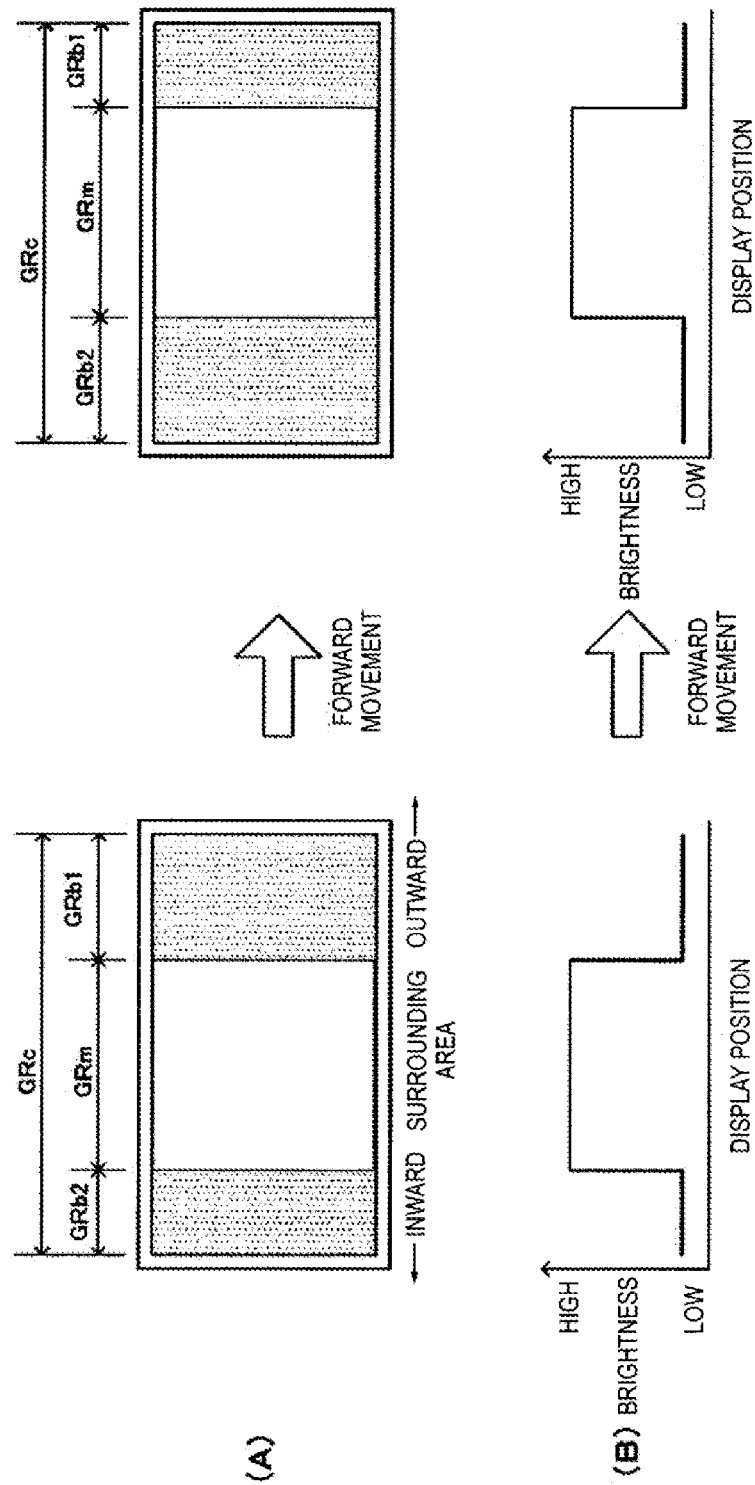
FIG. 13 is a diagram for explaining a first display control operation of a display controller.

FIG. 13 is a diagram for explaining a first display control operation of a display controller. In the first display control operation, while displaying a captured image of the surrounding area, the display controller lowers the brightness of some or all of the image in the other range excluding the visible range, making the other range less visible to the driver. In so doing, by viewing an image via the mirror unit 55, the driver becomes able to check the desired visible range of the surrounding area similarly to the case of using a rearview mirror. In addition, there are merits such as moderating unwanted brightness in the non-monitor image area that produces glare, particularly at night.

FIG. 13(A) illustrates the display on the display unit 50, while FIG. 13(B) illustrates the relationship between the display position and the brightness of the display unit 50. The display controller 20 lowers the brightness of the non-monitor image areas GRb1 and GRb2, which are the image areas corresponding to the other range excluding the visible range, to lower than the brightness of the monitor image area GRm corresponding to the visible range, making the images in the non-monitor image areas GRb1 and GRb2 less visible. For example, if the display unit 50 is configured using liquid crystal display elements, backlight emission control is conducted to darken the non-monitor image areas GRb1 and GRb2. Meanwhile, if the display unit 50 is configured using organic EL display elements, signal level control of the luma signal is conducted to darken the non-monitor image areas GRb1 and GRb2. In this way, in the display image of the display unit 50, since the non-monitor image areas GRb1 and GRb2 are put into a dark state, the driver DR becomes able to view only the image in the monitor image area GRm. Consequently, the driver DR is able to check the conditions of the visible range ARm of the surrounding area by viewing the display image of the display unit 50 via the mirror unit 55.

Also, when the display controller 20 determines that the head position of the driver DR has moved towards the front of the vehicle, for example, the display controller 20 moves the monitor image area GRm according to the movement of the head position, and moves the visible range of the surrounding area that is visible via the mirror unit 55 outward. Specifically, the display controller 20 controls the brightness of the image according to the movement of the head position towards the front of the vehicle so that the area width of the non-monitor image area GRb1 becomes narrower, while the area width of the non-monitor image area GRb2 becomes wider. By conducting such a display control, the image in the monitor image area GRm becomes an image of a more outward range of the surrounding area compared to before the movement. When the display controller 20 determines that the head position of the driver DR has moved towards the rear of the vehicle, for example, although not illustrated, the display controller 20 controls the brightness of the image according to the movement of the head position so that the area width of the non-monitor image area GRb1 becomes wider, while the area width of the non-monitor image area GRb2 becomes narrower. By conducting such a display control, the image in the monitor image area GRm becomes an image of a more inward range of the surrounding area compared to before the movement. As a result, by moving his or her head position, the driver is able to check the desired visible range of the surrounding area similarly to the case of using a rearview mirror. In addition, since the display unit 50 and the mirror unit 55 are provided in the cabin of the vehicle, the surrounding area may be checked well, without being adversely affected by the side windows as in the case of using a rearview mirror.

Figure 14:
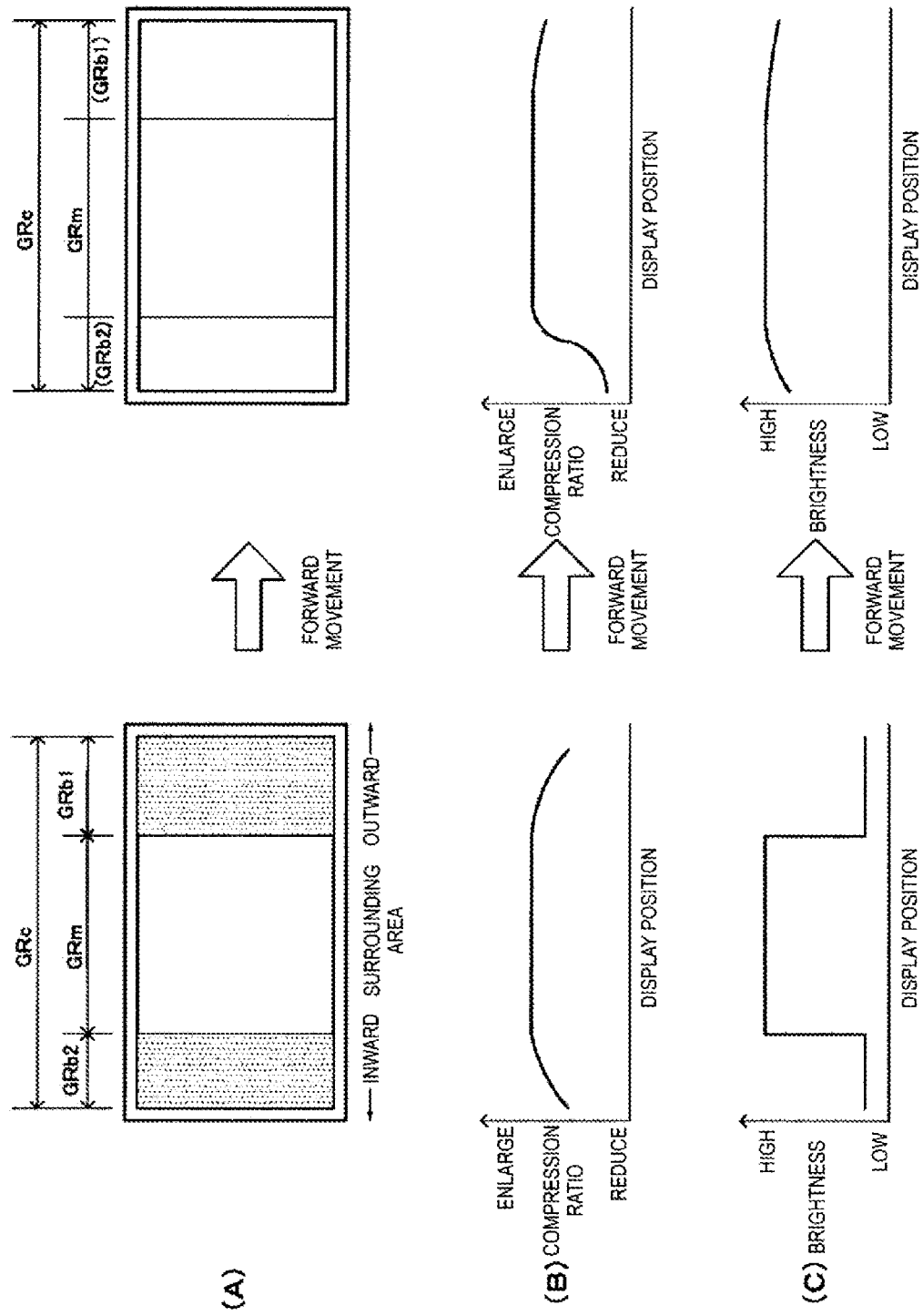
FIG. 14 is a diagram for explaining a second display control operation of a display controller.

FIG. 14 is a diagram for explaining a second display control operation of a display controller. In the second display control operation, while displaying a captured image of the surrounding area, instead of moving the monitor image area GRm, the display controller compresses the image of the other range excluding the visible range in the movement direction of the monitor image area GRm. By compressing the image in this way, the display controller moves the visible range ARm corresponding to the monitor image area GRm, enabling the driver to check the desired visible range of the surrounding area.

FIG. 14(A) illustrates the display on the display unit 50, while FIG. 14(B) illustrates the relationship between the display position and the compression of the display unit 50, and FIG. 14(C) illustrates the relationship between the display position and the brightness of the display unit 50. The display controller 20 conducts a display control so that, for the non-monitor image areas GRb1 and GRb2 which are the image areas corresponding to the other range excluding the visible range, the image is reduced more towards the edges. By compressing the non-monitor image areas GRb1 and GRb2 and adjusting the compression ratios of the non-monitor image areas GRb1 and GRb2 in this way, the visible range ARm corresponding to the monitor image area GRm becomes moveable.

When the display controller 20 determines from the motion of the head position of the driver DR that an instruction to move the visible range of the surrounding area outward has been given, such as when the display controller 20 determines that the driver has turned his or her neck in the forward direction, for example, the display controller 20 moves the visible range corresponding to the monitor image area GRm outward. Specifically, the display controller 20 controls the compression ratio of the image so that the range of the surrounding area for the non-monitor image area GRb2 becomes wider. In addition, by reducing the degree of compression and lowered brightness of the non-monitor image area GRb1 corresponding to the outward direction, the driver becomes able to check a more outward range than the visible range with the image in the non-monitor image area GRb1. In other words, the visible range may be extended. Note that even if only the degree of lowered brightness of the non-monitor image area GRb1 is reduced, the driver becomes able to check a more outward range than the visible range, and the visible range may be extended.

Figure 15:
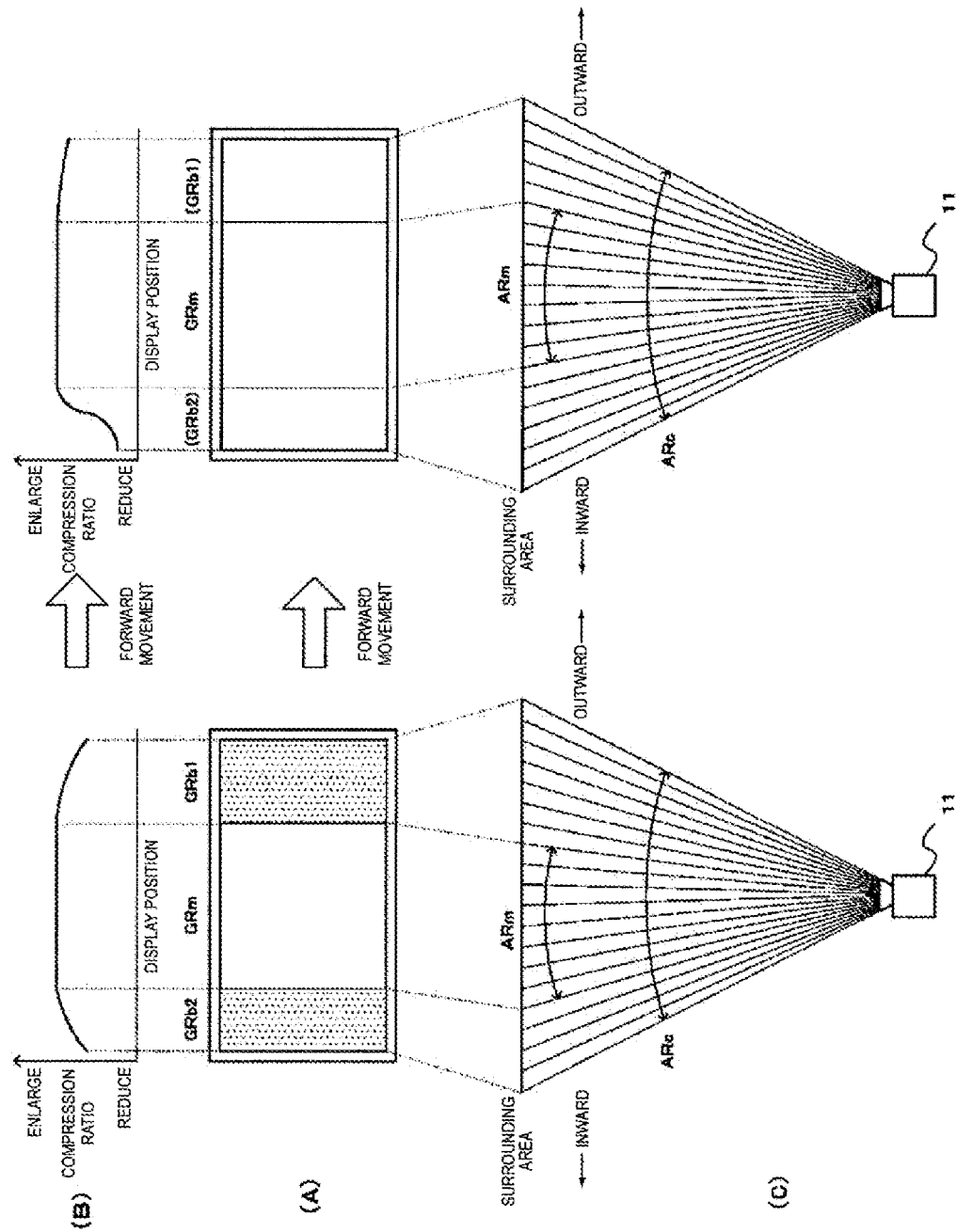
FIG. 15 illustrates a relationship between the display and compression ratio of a display unit, and the surrounding area.

FIG. 15 illustrates a relationship between the display and compression ratio of a display unit, and the surrounding area. Note that FIG. 15(A) illustrates the display on the display unit 50, while FIG. 15(B) illustrates the relationship between the display position and the compression of the display unit 50, and FIG. 15(C) illustrates the image capture range of the surrounding area image capture unit 11. In the monitor image area GRm, a captured image of the visible range ARm is displayed. In the non-monitor image area GRb1, a captured image more outward than the visible range ARm is compressed and displayed, while in the non-monitor image area GRb2, a captured image more inward than the visible range ARm is compressed and displayed. Herein, when the display controller 20 determines that an instruction to move the visible range outward has been given, the display controller 20 controls the compression ratio of the image so that the range of the surrounding area for the non-monitor image area GRb2 becomes wider. Consequently, the visible range ARm corresponding to the monitor image area GRm moves outward in the surrounding area.

Meanwhile, when the display controller 20 determines that an instruction to move the visible range inward has been given, such as when the display controller 20 determines that the driver has turned his or her neck in the rear direction, for example, the display controller 20 controls the compression ratio of the image so that the range of the surrounding area for the non-monitor image area GRb1 becomes wider. Consequently, the visible range ARm corresponding to the monitor image area GRm moves inward in the surrounding area.

Furthermore, as discussed earlier, before an instruction to change the visible range is given, the display controller 20 lowers the brightness of the non-monitor image areas GRb1 and GRb2 to lower than the brightness of the monitor image area GRm corresponding to the visible range, making the images in the non-monitor image areas GRb1 and GRb2 less visible. For example, if the display unit 50 is configured using liquid crystal display elements, backlight emission control is conducted to darken the non-monitor image areas GRb1 and GRb2. Meanwhile, if the display unit 50 is configured using organic EL display elements, signal level control of the luma signal is conducted to darken the non-monitor image areas GRb1 and GRb2. In this way, in the display image of the display unit 50, since the non-monitor image areas GRb1 and GRb2 are put into a dark state, the driver DR becomes able to view only the image in the monitor image area GRm. Consequently, the driver DR is able to check the conditions of the visible range ARm of the surrounding area by viewing the display image of the display unit 50 via the mirror unit 55. After that, if an instruction to change the visible range is given, the display controller 20 causes the brightness level of a non-monitor image area to approach the brightness level of the monitor image area GRm.

By conducting such display control, when the driver gives an instruction to change the visible range, the visible range ARm corresponding to the monitor image area GRm is moved according to the driver's instruction, thereby enabling the driver to easily check a desired range of the surrounding area. Furthermore, since the brightness level of a non-monitor image area is made similar to the brightness level of the monitor image area GRm, the division from the monitor image area is removed. Consequently, the visible range may be extended automatically. Furthermore, since the driver is able to change the visible range by simply giving a change instruction, the driver becomes able to easily check a desired surrounding range, without moving his or her head position in the forward direction or the like until the desired surrounding range is reflected in the rearview mirror, as in the case of using a rearview mirror of the past. In addition, since the display unit 50 and the mirror unit 55 are provided in the cabin of the vehicle, the surrounding area may be checked well, without being adversely affected by the side windows as in the case of using a rearview mirror.

Note that when the driver gives an instruction to change the visible range, the brightness level of the non-monitor image area may also be kept in a lowered state. In this case, extension of the monitor image area GRm is not conducted, an image of the visible range that has been moved on the basis of the change instruction is displayed at a predetermined brightness. Also, the compression characteristics and brightness characteristics of the non-monitor image areas are not limited to the characteristics in FIG. 14. For example, the compression ratio may also be varied suddenly, whereas the brightness level may also be varied gradually. In addition, by making the compression characteristics and the brightness characteristics selectable by the driver, an image of the surrounding area may be displayed according to the driver's preferences. Furthermore, properties such as enlargement/reduction of the visible range or the enlargement ratio of the displayed image may also be varied according to an instruction to change the visible range. For example, an operation in which the driver DR moves or has moved closer to the mirror unit 55 may be treated as an instruction to change the visible range, and an image with a wide visible range or an image with a low enlargement ratio (these images may be designated a first image, for example) is displayed. Meanwhile, an operation in which the driver DR moves or has moved away from the mirror unit 55 may be treated as an instruction to change the visible range, and an image with a narrow visible range or an image with a high enlargement ratio compared to the first image is displayed.

3. Third Embodiment

The third embodiment describes a case in which the surrounding area that the driver wants to check changes depending on the driving conditions of the vehicle. As an example, a case will be described in which the cabin and a trailer part are separable, like with a trailer, an articulated bus, or a camping car, for example, and in which the orientation of the cabin and the orientation of the trailer part change depending on the driving conditions.

(3-1. Configuration of Third Embodiment)

Figure 16:
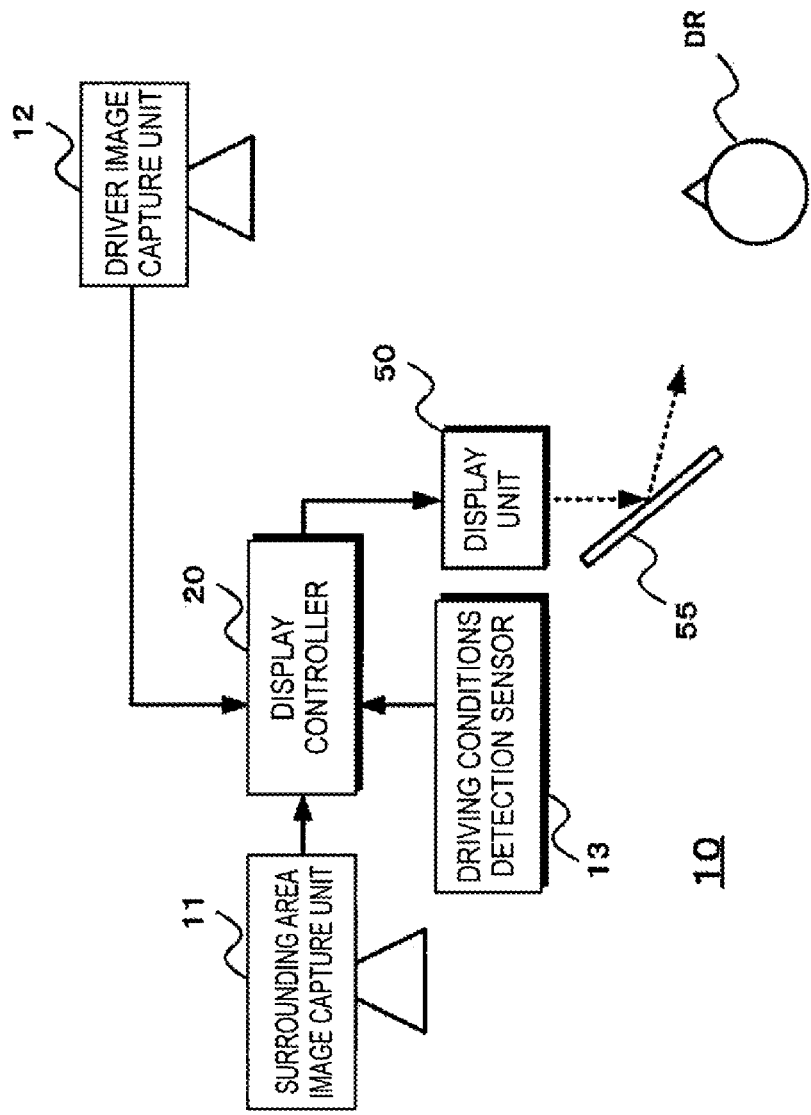
FIG. 16 is a diagram illustrating an example of a configuration of a third embodiment.

FIG. 16 illustrates an example of a configuration of the third embodiment. A display device 10 is equipped with surrounding area image capture units 11a and 11b, a driver image capture unit 12, a driving conditions detection sensor 13, a display controller 20, a display unit 50, and a mirror unit 55. Note that the driver image capture unit 12, the driving conditions detection sensor 13, the display unit 50, the mirror unit 55, and the driver DR exist in the positional relationship illustrated in FIG. 9.

The surrounding area image capture units 11a and 11b capture an image of the surrounding area around a vehicle, and output an image signal to the display controller 20. The surrounding area image capture unit 11a is provided on the cabin, while the surrounding area image capture unit 11b is provided on the trailer part. Herein, the area captured by the surrounding area image capture unit 11a will be designated the first captured surrounding area, while the area captured by the surrounding area image capture unit 11b will be designated the second captured surrounding area.

The driver image capture unit 12 is provided in front of the driver DR or in the direction in which the mirror unit 55 is installed, for example, to enable determination of properties such as the head position, head orientation, and line of sight orientation of the driver DR. The driver image capture unit 12 captures an image of the driver DR, and outputs an image signal to the display controller 20.

The driving conditions detection sensor 13 acquires information related to the driving conditions, such as information indicating the steering state, information indicating the coupling state of the trailer part, information about the turning of the trailer part with respect to the cabin, gear position information and vehicle speed information, direction indicator configuration information, and current position information (for example, a positioning signal of a satellite positioning system), for example. The driving conditions detection sensor 13 outputs the acquired driving information to the display controller 20 as sensor information.

The display controller 20, on the basis of image signals generated by the surrounding area image capture units 11*a* and 11*b*, displays a captured image of the surrounding area on the display unit 50. In addition, the display controller 20 controls the display of a captured image of the surrounding area displayed on the display unit 50, on the basis of properties such as the head position, head orientation, and line of sight orientation of the driver, movement of the position and orientation, and sensor information from the driving conditions detection sensor 13.

The display unit 50 is arranged so that the display face of the display unit 50 is indirectly visible to the driver via the mirror unit 55. Also, the display face of the display unit 50 is configured to a size larger than the ray of light in which the mirror face of the mirror unit 55 converges, as illustrated in FIG. 4, so that a display image of the display unit 50 is visible via the mirror unit 55, even if the driver DR moves his or her head position to check an area over a wide range with a rearview mirror while driving, for example. Note that in a display image of the display unit 50, the area that corresponds to the visible range of the image area that the driver checks via the mirror unit 55 will be referred to as the monitor image area.

The mirror unit 55 is provided so that the display face of the display unit 50 is indirectly visible to the driver DR. The mirror unit 55 is placed inside the vehicle, at a position of a pillar, for example, so that an image reflected in the mirror unit 55 is visible when the driver DR performs an operation of looking at a rearview mirror of the past, for example. In addition, the positional relationship of the mirror unit 55 with the display unit 50 and the size of the mirror unit 55 are configured so that when the driver DR indirectly views a captured image of the surrounding area via the mirror unit 55, the entire display area of the display unit 50 is reflected in the mirror unit 55. Furthermore, in the display unit 50 and the mirror unit 55, the visible range of the surrounding area that is visible to the driver from the image of the display unit 50 reflected in the mirror unit 55 is changed by display control of the display controller 20, according to movement of the viewing position of the driver with respect to the mirror unit 55. Note that the size of the mirror unit 55 is preferably configured as in the first embodiment and the second embodiment, so that operational advantages similar to a rearview mirror of the past are obtained.

For the display device 10, in order for a captured image of the surrounding area to be indirectly visible to the driver DR via the mirror unit 55, the distance from the driver DR to the display face of the display unit 50 is increased compared to the case of the driver DR directly viewing the display face on the display unit 50.

In addition, in the display device 10, since a captured image of the surrounding area is indirectly visible to the driver DR via the mirror unit 55, the display unit 50 is arranged so that the display face and illuminating light from the display face are not visible to the driver DR. In addition, a configuration provided with a shield that blocks view of the display face of the display unit 50 and display light from the driver DR may also be used.

Figure 17:
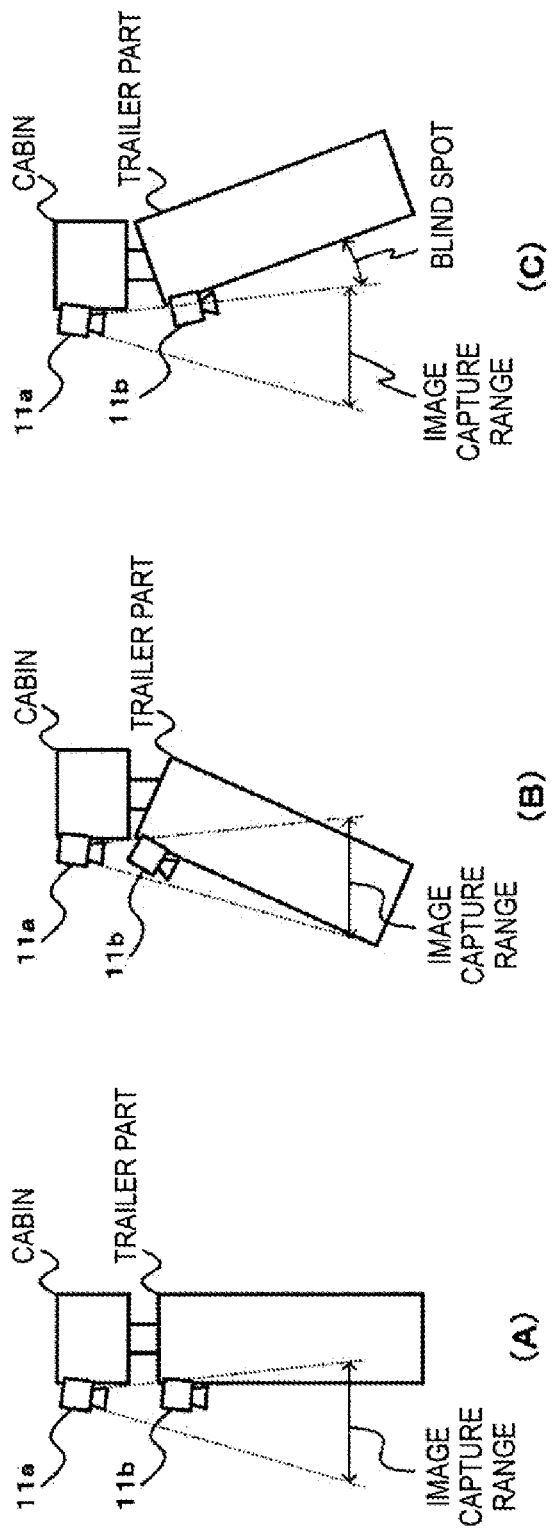
FIG. 17 is a diagram illustrating an example of the arrangement of surrounding area image capture units.

FIG. 17 illustrates an example of the arrangement of surrounding area image capture units. Note that the drawing illustrates an example of the case of arranging surrounding area image capture units on the left-side face of the trailer, for example, while the surrounding area image capture units on the right-side face are omitted.

As discussed earlier, the surrounding area image capture unit 11*a* is provided on the cabin, while the surrounding area image capture unit 11*b* is provided on the trailer part. Herein, the area captured by the surrounding area image capture unit 11*a* will be designated the first captured surrounding area, while the area captured by the surrounding area image capture unit 11*b* will be designated the second captured surrounding area.

FIG. 17(A) illustrates a case in which the cabin and the trailer part are positioned in a straight line. FIG. 17(B) illustrates a state in which the trailer part is veering to the side where the surrounding area image capture unit 11*a* is installed with respect to the cabin, and FIG. 17(C) illustrates a state in which the trailer part is veering in the opposite direction from the side where the surrounding area image capture unit 11*a* is installed with respect to the cabin. If the trailer part goes from the state illustrated in FIG. 17(A) to the state illustrated in FIG. 17(B), an image portion depicting the trailer part is added to the captured image acquired by the surrounding area image capture unit 11*a*, and the driver may no longer be able to check the surrounding area. Also, if the trailer part goes from the state illustrated in FIG. 17(A) to the state illustrated in FIG. 17(C), the trailer part departs from the image capture range of the surrounding area image capture unit 11*a*, and the vicinity of the trailer part becomes a blind spot that the driver is unable to check. On the other hand, since the surrounding area image capture unit 11*b* is provided on the trailer part, the captured image acquired by the surrounding area image capture unit 11*b* becomes an image illustrating the surrounding area irrespectively of the positional relationship between the cabin and the trailer part.

Accordingly, the display controller 20 uses the captured image acquired by the surrounding area image capture unit 11*a* and the captured image acquired by the surrounding area image capture unit 11*b* depending on the driving conditions and the driver's intentions, and thereby controls the display so that the surrounding area may be checked via the mirror unit 55.

Figure 18:
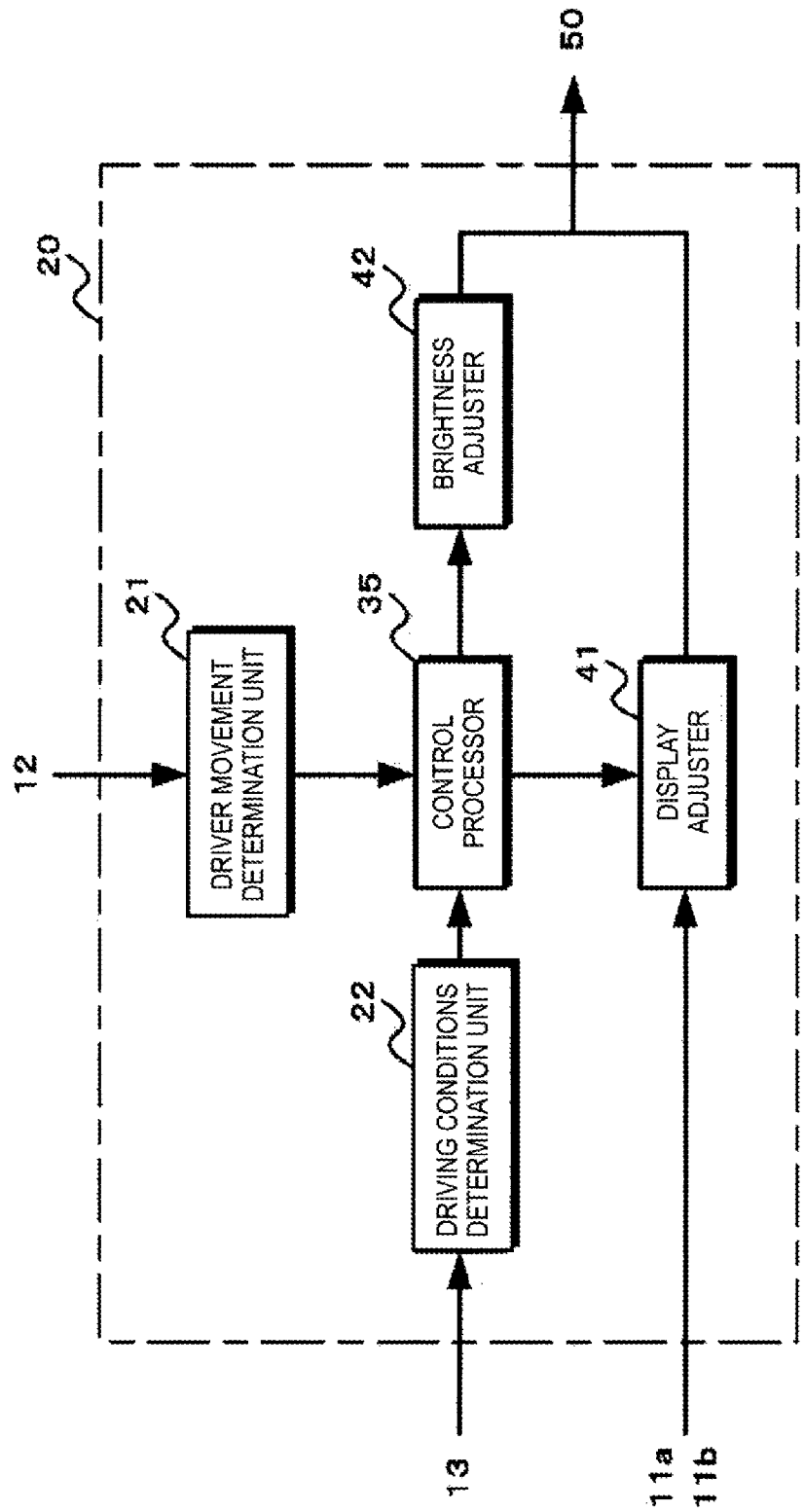
FIG. 18 is a diagram illustrating a configuration of a display controller.

FIG. 18 is a diagram illustrating a configuration of a display controller. The display controller 20 is equipped with a driver movement determination unit 21, a driving conditions determination unit 22, a control processor 35, a display adjuster 41, and a brightness adjuster 42.

The driver movement determination unit 21, on the basis of an image signal supplied from the driver image capture unit 12, detects the head position of the driver, and determines the movement direction and movement magnitude of the head position of the driver. For example, the driver movement determination unit 21 conducts facial recognition of the driver on the basis of an image signal supplied from the driver image capture unit 12, for example, and determines the position of the recognized face, the orientation of the face or the orientation of the head. Furthermore, the driver movement determination unit 21 tracks the recognized face, and determines the movement direction and movement magnitude of the head position. The driver movement determination unit 21 outputs a determination result to the control processor 35.

The driving conditions determination unit 22 determines the driving conditions on the basis of the sensor information supplied from the driving conditions detection sensor 13. The driving conditions determination unit 22 determines whether the vehicle is moving forward or backward on the basis of the gear position and the like, and whether the vehicle is moving straight, turning right, or turning left, on the basis of the vehicle speed, direction indicator configuration information, the steering state, and the like, for example. In addition, the driving conditions determination unit 22 determines factors such as whether there is a gentle left/right turn or a sharp left/right turn, and whether or not the travel position is at the position of a roundabout, on the basis of information about the coupling state of the trailer part, the turning of the trailer part, and the like, for example. The driving conditions determination unit 22 outputs a determination result to the control processor 35.

The control processor 35, on the basis of a determination result from the driver movement determination unit 21 and the driving conditions determination unit 22, generates a control signal to control the display differently for the monitor image area and the non-monitor image area of the display unit 50, and outputs to the display adjuster 41 and the brightness adjuster 42.

The display adjuster 41, on the basis of a control signal from the control processor 35, conducts a scale adjustment of the captured image of the surrounding area on an image signal supplied from the surrounding area image capture unit 11, such as by applying image compression to the non-monitor image area, for example. In addition, the display adjuster 41, on the basis of a control signal from the control processor 35, may also switch or combine images of the surrounding area acquired by a plurality of surrounding area image capture units, adjust the display width of the surrounding area to display, and the like.

The brightness adjuster 42, on the basis of a control signal from the control processor 35, lowers the brightness of the non-monitor image area on the display unit 50 to less than the monitor image area. If the display unit 50 is configured using display elements that may require illumination, such as liquid crystal elements, for example, the brightness adjuster 42 controls the illumination, such as the backlight, for example, to lower the brightness of the non-monitor image area to less than the monitor image area. Meanwhile, if the display unit 50 is configured using display elements that do not require illumination or using light-emitting elements, such as organic EL display elements, for example, a process may be conducted to lower the signal level of a luma signal corresponding to the non-monitor image area.

(3-2. Operation of Third Embodiment)

Figure 19:
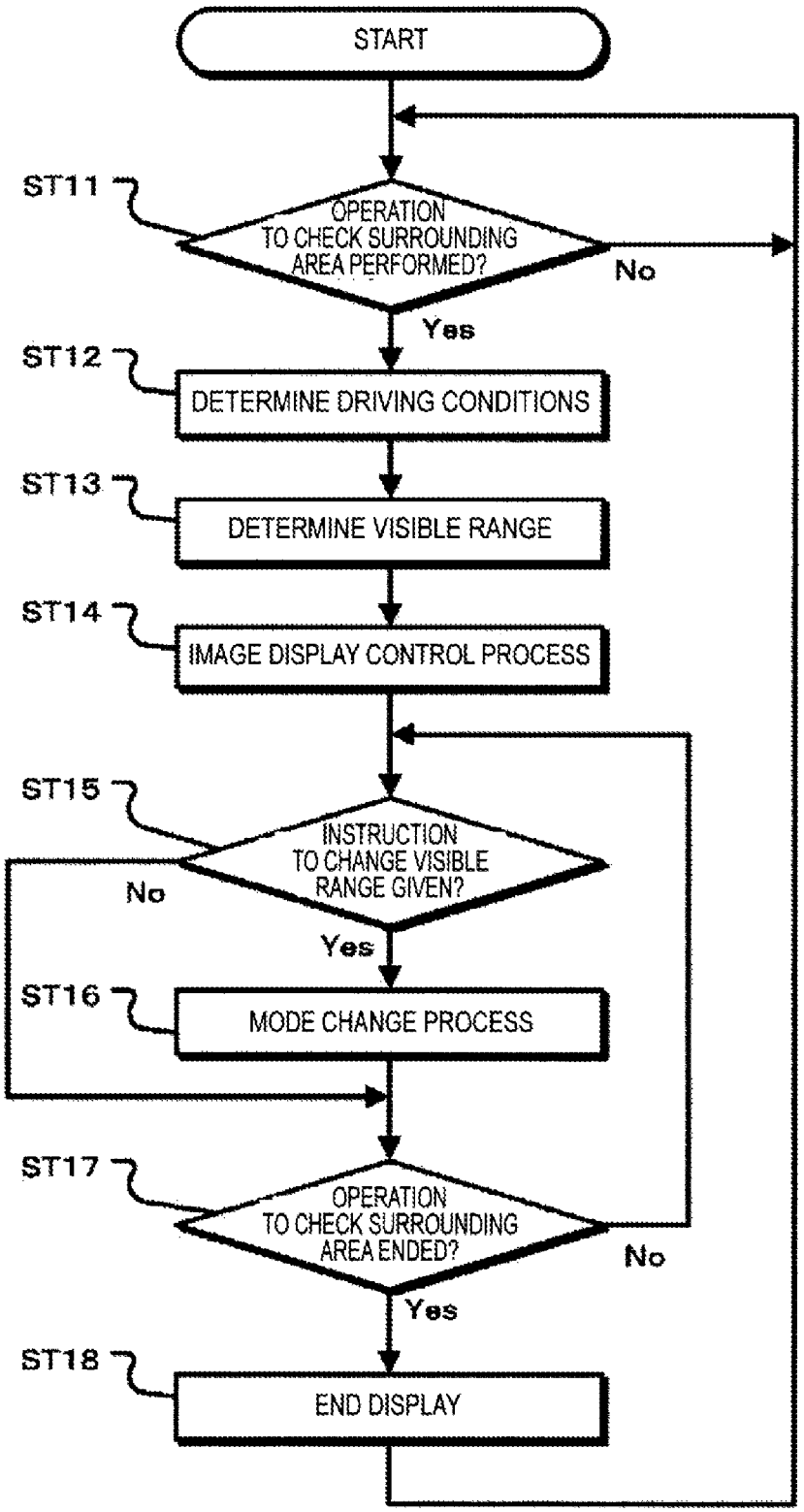
FIG. 19 is a flowchart illustrating operation of a display controller.

FIG. 19 is a flowchart illustrating operation of a display controller in the third embodiment. In step ST11, the display controller 20 determines whether or not an operation of checking the surrounding area has been performed. The display controller 20, on the basis of an image signal supplied from the driver image capture unit 12, determines whether or not the driver's head orientation and line of sight direction are in the direction of the mirror unit 55, for example. If the driver's head orientation and line of sight direction are in the direction of the mirror unit 55, such as when the driver glances in the direction of the mirror unit 55, for example, the display controller 20 determines that an operation of checking the surrounding area has been performed, and proceeds to step ST12. Meanwhile, if the driver's head orientation and line of sight direction are not in the direction of the mirror unit 55, the display controller 20 determines that an operation of checking the surrounding area has not been performed, and returns to step ST11.

In step ST12, the display controller 20 determines the driving conditions. The display controller 20 determines the driving conditions on the basis of the sensor information supplied from the driving conditions detection sensor 13. The display controller 20 determines factors such as whether the vehicle is moving forward or backward, whether the vehicle is moving straight, turning right, or turning left, whether or not there is a gentle left/right turn or a sharp left/right turn, and whether the travel position is at the position of a roundabout, for example, and proceeds to step ST13.

In step ST13, the display controller 20 determines the visible range. The display controller 20 determines the visible range that is visible via the mirror unit 55 on the basis of the driving conditions determination result, and proceeds to step ST14. Note that in the determination of the visible range, the visible range may be determined by additionally accounting for the head position of the driver.

Figure 20:
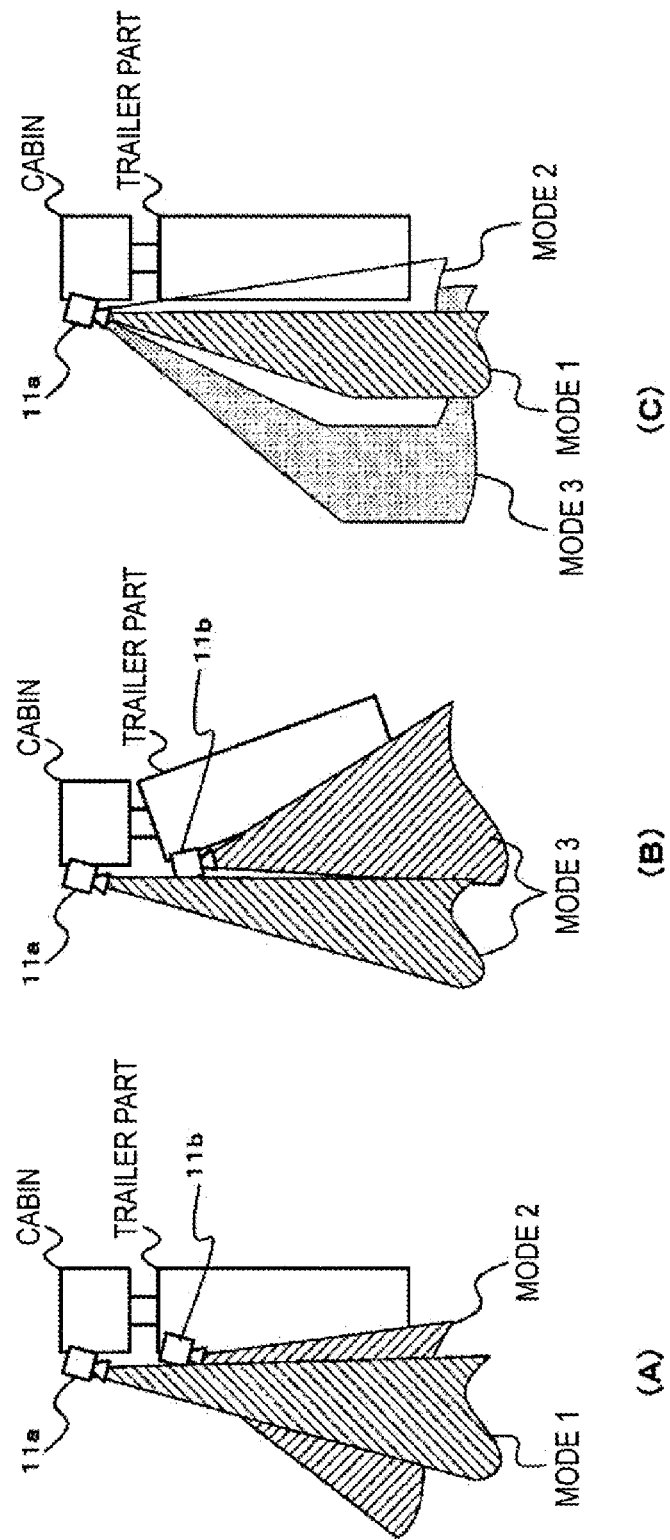
FIG. 20 is a diagram illustrating an example of visible range modes.

FIG. 20 illustrates an example of visible range modes. Mode 1 is a mirror visibility base range during normal travel, for example. Mode 2 is a range enabling wider visibility both inward and outward from the mirror visibility base range during normal travel, for example. Mode 3 is configured as a range enabling the driver to view the area outward from the vehicle with no blind spots when backing up or the like, for example. Herein, suppose that the image capture range of the surrounding area image capture unit 11*a* is the mirror visibility base range during normal travel, while the image capture range of the surrounding area image capture unit 11*b* is a wider range than the image capture range of the surrounding area image capture unit 11*a*, for example. In addition, as illustrated in FIG. 20(A), suppose that Mode 1 treats the image capture range of the surrounding area image capture unit 11*a* as the visible range, while Mode 2 treats the image capture range of the surrounding area image capture unit 11*b* as the visible range. Furthermore, as illustrated in FIG. 20(B), suppose that Mode 3 treats the range included in the image capture ranges of the surrounding area image capture unit 11*a* and the surrounding area image capture unit 11*b* as the visible range. Note that the image capture range of the surrounding area image capture unit 11*a* may also be switchable, and the image capture range of the surrounding area image capture unit 11*b* may be treated as the visible range depending on the driving conditions or a driver instruction. For example, as illustrated in FIG. 20(C), the image range of the surrounding area image capture unit 11*a* may also be switchable to the ranges of Mode 1 to Mode 3.

FIG. 21 illustrates an example of a relationship between driving conditions determination results and visible range modes. When the display controller 20 determines on the basis of detected information that the vehicle is being driven straight ahead, for example, the range of Mode 1 is treated as the visible range, as indicated by the circle symbol. When the display controller 20 determines on the basis of detected information that the vehicle is at the location of a roundabout, for example, the range of Mode 1 is treated as the visible range, as indicated by the circle symbol. When the display controller 20 determines on the basis of detected information that the vehicle is making a gentle right turn or left turn, for example, the range of Mode 1 is treated as the visible range, as indicated by the circle symbol. When the display controller 20 determines on the basis of detected information that the vehicle is making a sharp right turn or left turn, for example, the range of Mode 2 is treated as the visible range and the checkable range is widened outward, as indicated by the circle symbol. When the display controller 20 determines on the basis of detected information that the vehicle is backing up straight, for example, the range of Mode 1 is treated as the visible range, as indicated by the circle symbol. When the display controller 20 determines on the basis of detected information that the vehicle is backing up at a sharp angle, for example, the range of Mode 2 indicated by the circle symbol, or in other words, the image capture range of the surrounding area image capture unit 11*b*, is treated as the visible range so that the blind spot illustrated in FIG. 17(C) does not occur.

In step ST14, the display controller 20 conducts an image display control process. The display controller 20 configures the area width of the monitor image area according to the visible range mode, and displays an image of the visible range on the display unit 50 as an image in the monitor image area. In addition, the display controller 20 controls the backlight or the brightness level, for example, so that an image in the non-monitor image area is not visible. In addition, when treating a predetermined area of the display unit 50 as a monitor image area, the display controller 20 conducts a process such as compressing the image of the surrounding area corresponding to the non-monitor image area, so that an image of the visible range may be displayed in the monitor image area, and also so that the visible range corresponding to the monitor image area may be moved. The display controller 20 conducts an image display control process, and proceeds to step ST15.

In step ST15, the display controller 20 determines whether or not an instruction to change the visible range has been given. The display controller 20, on the basis of an image signal supplied from the driver image capture unit 12, determines the driver's head position, for example, and determines whether or not an instruction operation has been performed to change the visible range of the surrounding area. If the driver's head position produced a motion with movement of the visible range, the display controller 20 determines that an instruction to change the visible range has been given, and proceeds to step ST16. Meanwhile, if the driver's head position does produce a motion with movement of the visible range, the display controller 20 determines that an instruction to change the visible range has not been given, and proceeds to step ST17.

In step ST16, the display controller 20 conducts a mode change process. The display controller 20 switches to a mode with a wide visible range when the instruction to change the visible range is an instruction to widen the visible range. For example, when set to a mode indicated by a circle symbol in FIG. 21, the display controller 20 switches to a mode indicated by a square symbol, and when set to a mode indicated by a square symbol, the display controller 20 switches to a mode indicated by a star symbol. Also, the display controller 20 switches to a mode with a narrow visible range when the instruction to change the visible range is an instruction to narrow the visible range. For example, when set to a mode indicated by a square symbol in FIG. 21, the display controller 20 switches to a mode indicated by a cycle symbol, and when set to a mode indicated by a star symbol, the display controller 20 switches to a mode indicated by a square symbol. The display controller 20 switches the mode on the basis of the instruction to change the visible range, and proceeds to step ST17.

In step ST17, the display controller 20 determines whether or not an operation of checking the surrounding area has ended. The display controller 20, on the basis of an image signal supplied from the driver image capture unit 12, determines whether or not the driver's head orientation and line of sight direction are no longer in the direction of the mirror unit 55, for example. If the driver's head orientation and line of sight direction continue to be in the direction of the mirror unit 55, the display controller 20 determines that an operation of checking the surrounding area has not ended, and returns to step ST15. Meanwhile, if the driver's head orientation and line of sight direction are no longer in the direction of the mirror unit 55, the display controller 20 determines that an operation of checking the surrounding area has ended, and proceeds to step ST18.

In step ST18, the display controller 20 ends the display. The display controller 20 ends the image display of the surrounding area on the display unit 50 to allow the driver to concentrate on driving, and returns to step ST11.

By conducting such display control, the configuration and switching of the visible range may be conducted automatically according to the driving conditions, enabling the driver to check a desired visible range of the surrounding area more easily than in the case of using a rearview mirror of the past. For example, when the travel direction of the vehicle is straight ahead on the basis of sensor information supplied from the driving conditions detection sensor 13, the mode is switched from Mode 1 to Mode 2, and the visible range is extended in the outward direction of the vehicle. Also, in the case of a sharp left/right turn or backing up at a sharp angle in which the orientation of the cabin and the orientation of the trailer part are different on the basis of sensor information supplied from the driving conditions detection sensor 13, the mode is switched from Mode 2 to Mode 3, and the visible range is extended so that the outward side of the trailer part is included in the visible range. Consequently, the desired visible range may be checked. In addition, since the display unit 50 and the mirror unit 55 are provided in the cabin of the vehicle, the surrounding area may be checked well, without being adversely affected by the side windows as in the case of using a rearview mirror.

Figure 22:
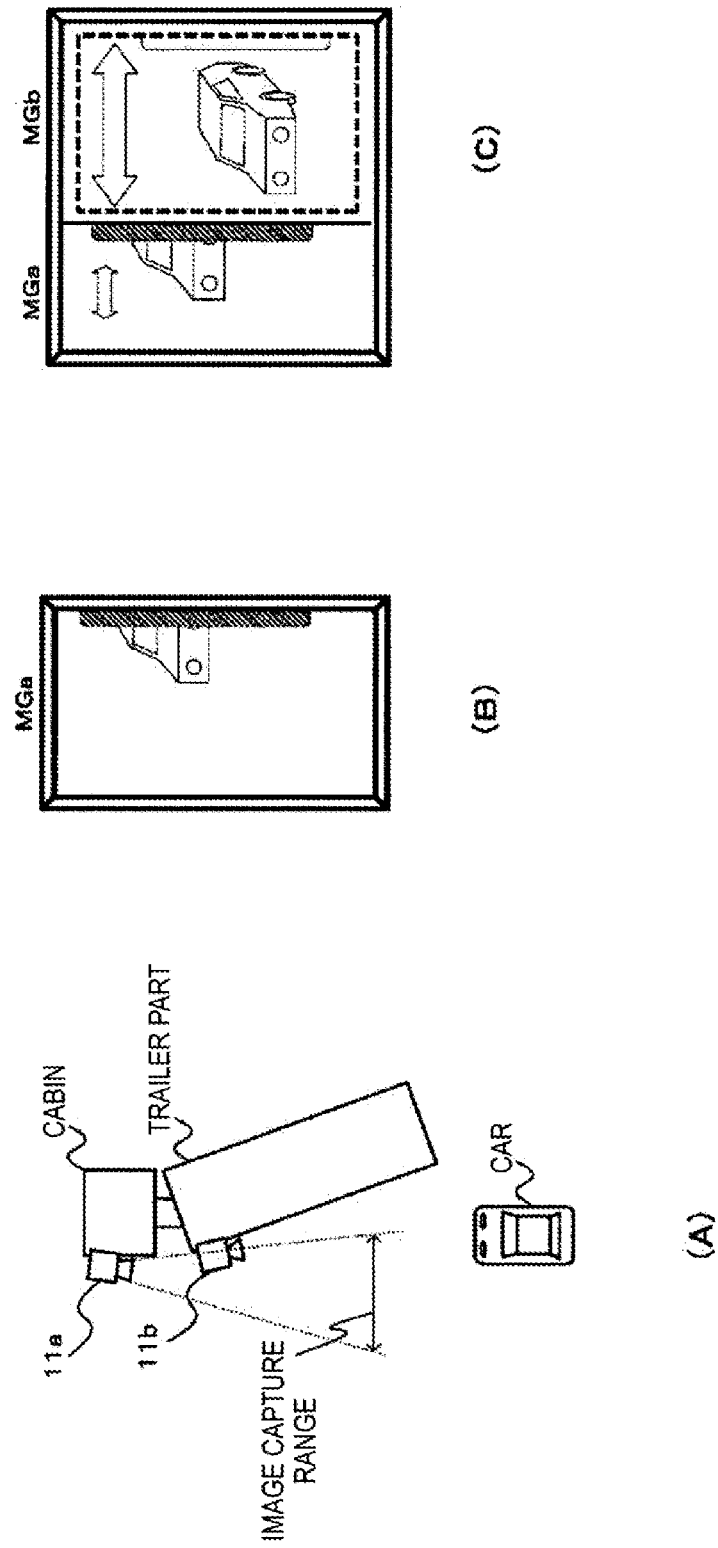
FIG. 22 is a diagram illustrating an example of a display image displayed on a display unit.

FIG. 22 illustrates an example of a display image displayed on the display unit 50 using surrounding images acquired by the surrounding area image capture unit 11*a* and the surrounding area image capture unit 11*b*. FIG. 22(A) illustrates an example of a case in which a car is positioned in the blind spot of the surrounding area image capture unit 11*a*. FIG. 22(B) illustrates an example of a case in which a surrounding image MGa acquired by the surrounding area image capture unit 11*a* is displayed, in which the entire vehicle behind may not be checked with only the display image of an image captured by the surrounding area image capture unit 11*a*. For this reason, as illustrated in FIG. 22(C), the display controller 20 displays not only the surrounding image MGa acquired by the surrounding area image capture unit 11*a*, but also displays a surrounding image MGb acquired by the surrounding area image capture unit 11*b*, thereby enabling the driver to check the entire vehicle behind. Note that if the display controller 20 is configured to switch the display illustrated in FIGS. 22(B) and 22(C) or vary the area width (or insertion width) of the surrounding image MGa and the surrounding image MGb as indicated by the arrows in FIG. 22(C) according to the driving conditions or the driver's intentions, the surrounding area may be displayed in the most easily visible state.

Figure 23:
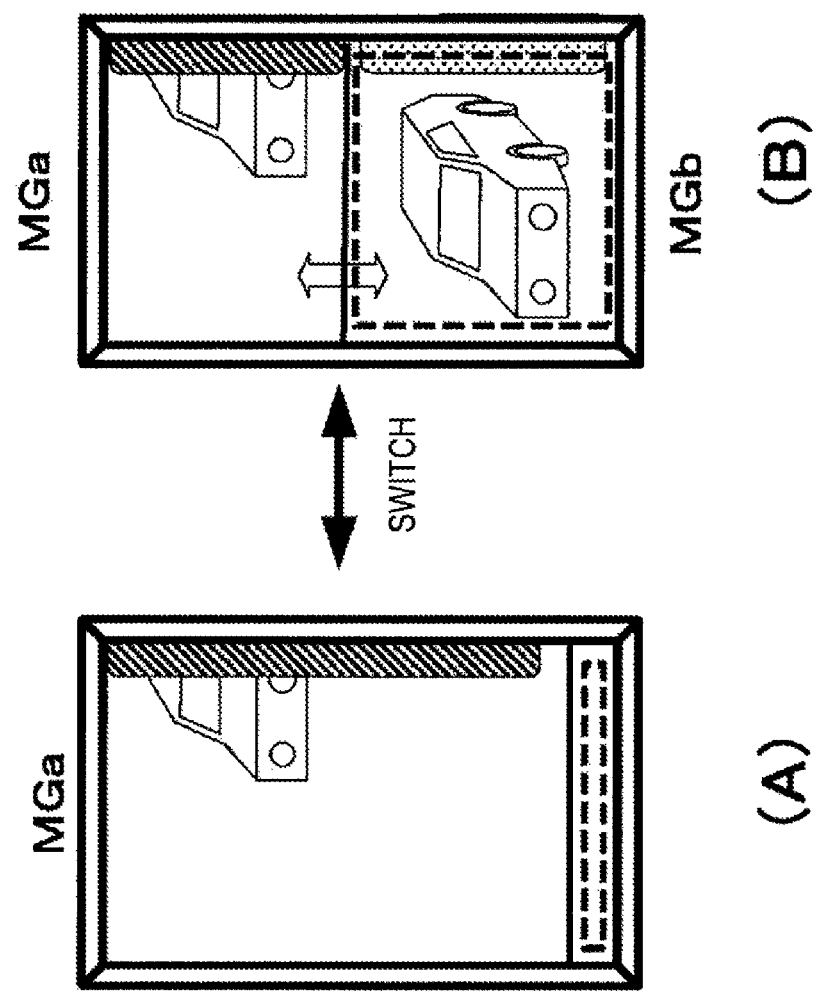
FIG. 23 is a diagram illustrating another example of a display image displayed on a display unit.

FIG. 23 illustrates another example of a display image displayed on the display unit 50 using surrounding images acquired by the surrounding area image capture unit 11*a* and the surrounding area image capture unit 11*b*. FIG. 23(A)

illustrates an example of a case in which a surrounding image MGa acquired by the surrounding area image capture unit 11a is displayed. FIG. 23(B) illustrates an example of a case in which a surrounding image MGa acquired by the surrounding area image capture unit 11a and a surrounding image MGb acquired by the surrounding area image capture unit 11b are displayed by being arranged vertically. The display controller 20 switches between the display illustrated in FIG. 23(A) and the display illustrated in FIG. 23(B) according to the driving conditions and the driver's intentions. In addition, a configuration able to vary the area width (or insertion width) between the surrounding image MGa and the surrounding image MGb as indicated by the arrows in FIG. 23(B) may also be used. At this point, when presenting a display on the display unit with adjacent image displays captured by plural image capture, captured images arranged farther to the front with respect to the travel direction of the vehicle body may be arranged higher on the display screen, whereas captured images installed farther to the rear with respect to the travel direction may be arranged lower on the display screen. Such an arrangement has the merit of enabling the driver to intuitively and instantaneously determine the front/rear relationship of the vehicle body on the visible screen. In other words, when at least two or more image capture devices are attached on the vehicle exterior and facing to the rear with respect to the vehicle travel direction, and a display unit provided with at least two or more adjacently arranged screen display areas is included in the cabin of the vehicle, such as in the dashboard center, for example, in the displayed content of the captured images to display in the screen display areas, the image from a first image capture device (the surrounding area image capture unit 11a, for example) installed on the front side in the vehicle travel direction is arranged above the image from an image capture device (the surrounding area image capture unit 11b, for example) installed farther to the rear in the vehicle travel direction than the first image capture device (for example, FIG. 23(B)). Such a configuration has a merit of enabling the driver to intuitively and instantaneously determine the front/rear relationship of the vehicle body on the visible screen.

In addition, even with a layout in which the screens are large and a vertical arrangement is unavailable, the rear vanishing point of the screen of the image capture unit installed to the front in the travel direction is arranged on top. In other words, when at least two or more image capture devices are attached on the vehicle exterior and facing to the rear with respect to the vehicle travel direction, and a display unit provided with at least two or more adjacently arranged screen display areas is included in the cabin of the vehicle, in the displayed content of the captured images to display in the screen display areas, the vanishing point at infinity included in the image from the first image capture device installed on the front side in the vehicle travel direction is arranged above the vanishing point at infinity included in the image from the image capture device installed farther to the rear in the vehicle travel direction than the first image capture device. According to such a configuration, similar advantageous effects are obtained. In this case, a shift in the vertical direction of at least 20% or more of the display screens is desirable to more rapidly distinguish the difference.

Figure 24:
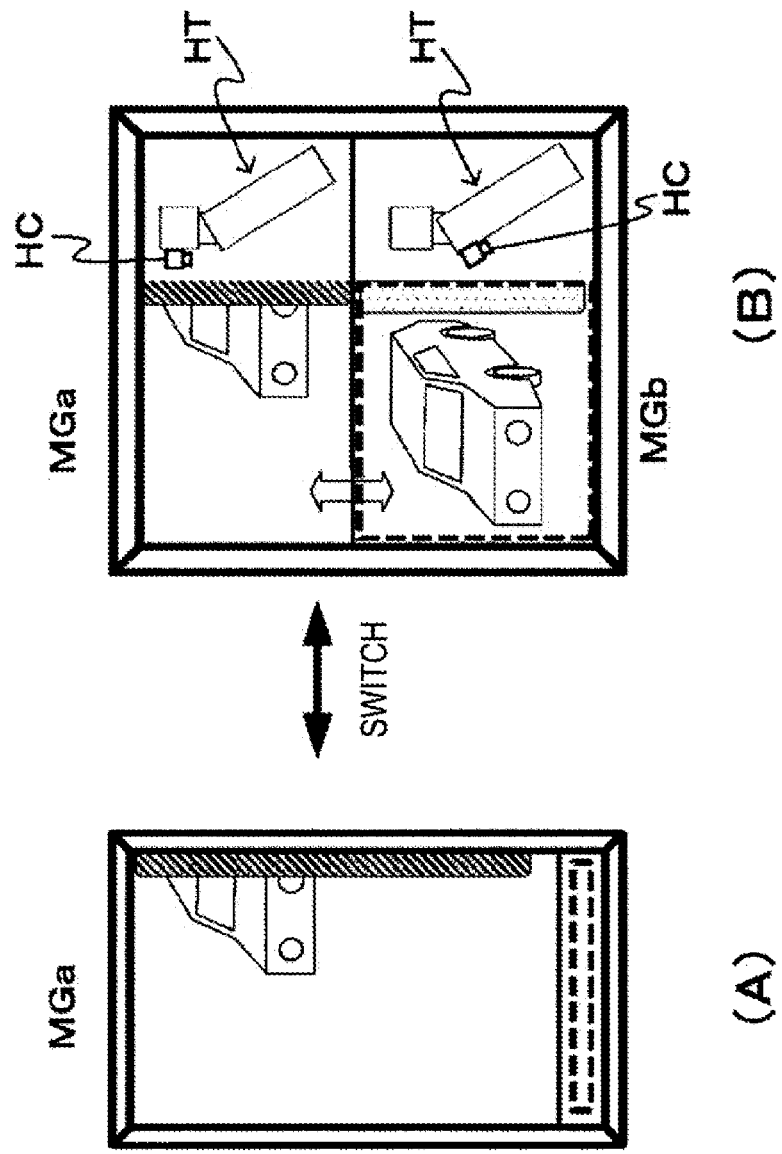
FIG. 24 is a diagram illustrating another example of a display image displayed on a display unit.

FIG. 24 illustrates another example of a display image displayed on the display unit 50 using surrounding images acquired by the surrounding area image capture unit 11a and the surrounding area image capture unit 11b. FIG. 24(A) illustrates an example of a case in which a surrounding image MGa acquired by the surrounding area image capture unit 11a is displayed. FIG. 24(B) illustrates an example of a case in which a surrounding image MGa acquired by the surrounding area image capture unit 11a and a surrounding image MGb acquired by the surrounding area image capture unit 11b are displayed by being arranged vertically, and in which is provided a display that enables the driver to identify which surrounding area image capture unit acquired each surrounding image, such as an icon display HT that diagrammatically illustrates the cabin and the trailer part, for example. Furthermore, on the icon display HT, a camera-shaped mark HC indicating the surrounding area image capture unit that acquired the surrounding image displayed adjacently is provided, for example. In this way, by arranging a display image captured by the surrounding area image capture unit 11a disposed at the front of the vehicle on top, and arranging a display image captured by the surrounding area image capture unit 11b disposed at the rear of the vehicle on the bottom, the driver becomes able to easily grasp the correspondence relationship between the displayed surrounding images and the surrounding area image capture units, and becomes able to reference the display images and perform appropriate driving operations. The display controller 20 switches between the display illustrated in FIG. 24(A) and the display illustrated in FIG. 24(B) according to the driving conditions and the driver's intentions. In addition, a configuration able to vary the area width (or insertion width) between the surrounding image MGa and the surrounding image MGb as indicated by the arrows in FIG. 24(B) may also be used.

Also, in cases such as normal travel, only the surrounding image acquired by the surrounding area image capture unit 11a is displayed, for example, and thus the obstruction of the visual field of the frontal peripheral area by displaying an arrangement of a plurality of surrounding images may be avoided.

In addition, the switching of the surrounding area image capture unit and the control of the surrounding image to display varies the display content according to the driving state of the vehicle, while also enabling appropriate switching based on the driver's intentions. Consequently, the driver is able to intuitively and naturally grasp the visible area in each area without carefully observing the screen. In the case of a tow vehicle such as a tractor-trailer, a display that enables instantaneous per-section screen recognition with boundaries, rather than a combined screen display on a single screen, is desirable from an ergonomic perspective, and thus the display controller 20 presents an ergonomically suitable display.

In addition, a condition in which the blind spot becomes important in a tow vehicle such as a tractor-trailer is during small-curvature travel, such as when changing lanes to the outer lane in a roundabout with two or more lanes, or when checking for rear obstacles while backing up, for example. Accordingly, by conducting a screen transition display that reflects the intended display of the driver's screen operations in conjunction with the driving state of the vehicle, the grasp of conditions in the blind spot may be improved. In such conditions, rather than changing the visual field area of a single camera, an operation that switches or varies the display area after switching to the camera of the surrounding area image capture unit 11b on the trailer part is effective.

In addition, for display extension, a display area extension function that is not limited to methods via the mirror unit 55 is effective.

Note that although the third embodiment describes the case of switching modes, the third embodiment may also be combined with the processing operations of the second embodiment.

In addition, although the foregoing embodiments described the case of conducting head orientation and point of view recognition, touch button control, voice command recognition, non-head-based gesture recognition, and the like may also be conducted as an auxiliary system configuration. Particularly, when restoring a normal state, correcting misdetections of instruction content recognition during learning as discussed later, and also when the driver performs a complex change of posture during a low-speed parking operation, it is effective to conduct control in combination with an interface that gives direct instructions, such as by button operations.

4. Fourth Embodiment

When viewing a surrounding area using a display device, a fixed screen scale is ensured during normal travel, in accordance with a minimum display scale determined by law. In other words, there is a display screen for a steady-state head orientation while driving, and when the head orientation changes from the steady-state position to a different position, a display change instruction is received via a human-machine interface for a declaration of intent that the driver treats as non-steady-state, and a screen display change is conducted. For example, a screen display change is conducted after receiving an instruction such as an instruction to change the display content to a lower scale, or an instruction to change to a special field of view for non-steady-state travel, such as when parking. Accordingly, the fourth embodiment describes the mechanism of the human-machine interface related to changing the display content.

Figure 25:
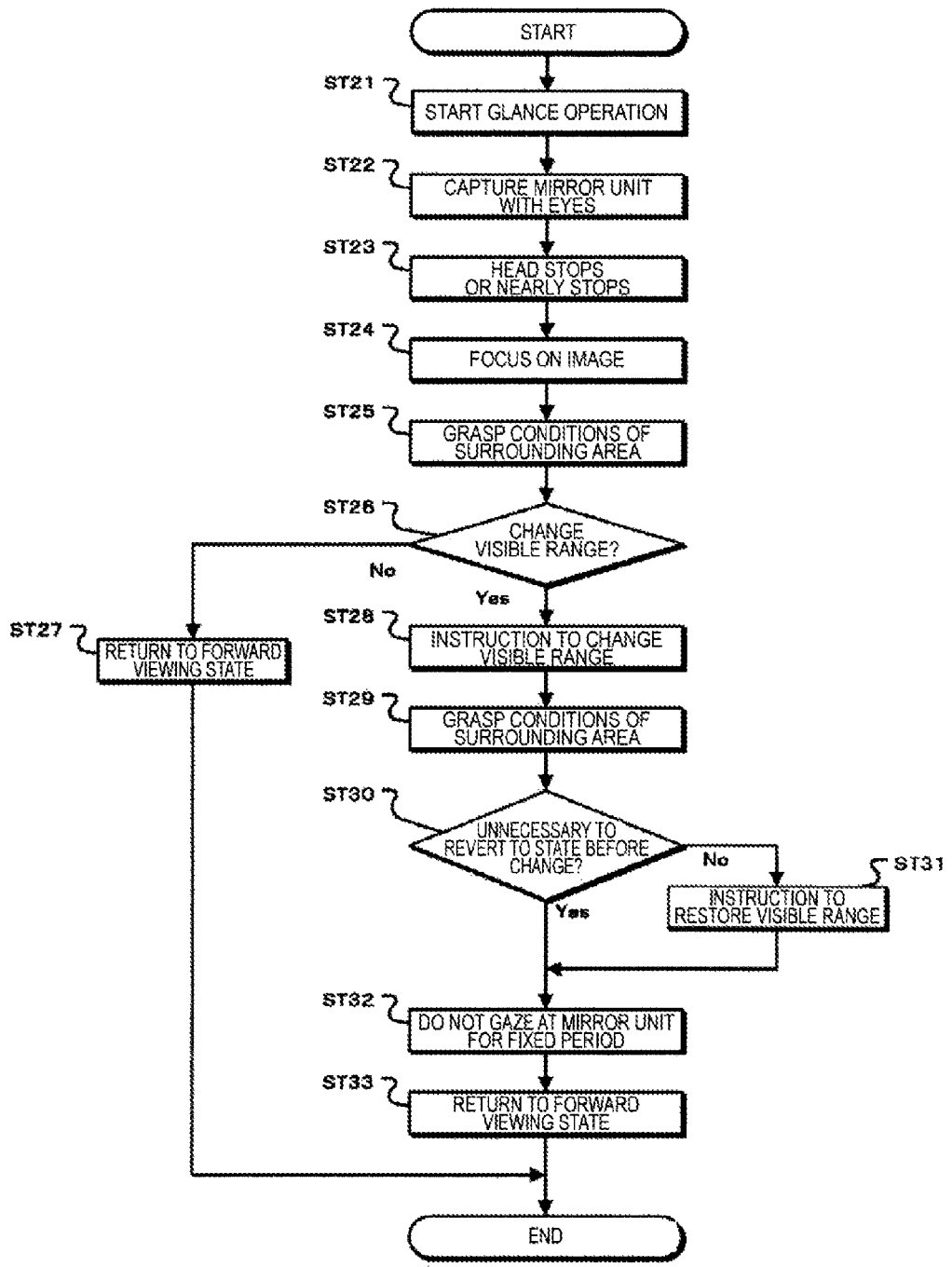
FIG. 25 is a flowchart illustrating an example of operation in a case in which the driver grasps the conditions of the surrounding area.

FIG. 25 is a flowchart illustrating an example of operation in a case in which the driver grasps the conditions of the surrounding area. In step ST21, the driver starts a glance operation, and proceeds to step ST22. In step ST22, the driver captures the mirror unit with his or her eyes, and proceeds to step ST23. In step ST23, the driver temporarily stops or nearly stops his or her head, and proceeds to step ST24. Note that "nearly stops" refers to a state of little head motion that may be interpreted as a stopped state.

In step ST24, the driver focuses on an image via the mirror unit and proceeds to step ST25. In step ST25, the driver grasps the conditions of the surrounding area by checking the image of the visible range, and proceeds to step ST26.

In step ST26, the driver judges whether or not to change the visible range. If the driver has grasped the conditions of the desired range of the surrounding area by viewing the image in the monitor image area in step ST25, the driver decides to not change the visible range, and proceeds to step ST27. On the other hand, if the driver was unable to grasp the conditions of the desired range of the surrounding area, the driver decides to change the visible range, and proceeds to step ST28.

In step ST27, the driver returns to the forward viewing state. Since the driver was able to grasp the conditions of the desired surrounding area, the driver ends the glance and points his or her face forward, ending the process in a state enabling the driver to look ahead.

If the process proceeds from step ST26 to step ST28, the driver gives an instruction to change the visible range. The driver performs a predefined motion, such as a motion of repeatedly moving his or her torso, for example, and proceeds to step ST29. Meanwhile, on the display device, the driver's instruction to change the visible range is detected, and a process of changing the visible range displayed by an image in the monitor image area is conducted. In the change of the visible range, the range of the surrounding area visible to the driver is moved or extended.

In step ST29, the driver grasps the conditions of the surrounding area by checking the image with the changed visible range, and proceeds to step ST30.

In step ST30, the driver decides whether or not it is unnecessary to revert to the state before the change instruction. If the driver wants to check the visible range from before the change instruction, the driver decides to revert to the state before the change instruction, and proceeds to step ST31. On the other hand, if the driver decides to not revert to the state before the change instruction, the driver proceeds to step ST32.

In step ST31, the driver gives an instruction to restore the visible range. The driver performs a predefined motion, such as a motion of moving his or her head back, for example, and proceeds to step ST32. Meanwhile, on the display device, the driver's instruction to restore the visible range is detected, and a process of reverting the visible range displayed by an image in the monitor image area to the range before the change is conducted.

In step ST32, the driver does not gaze at the mirror unit for a fixed period, and proceeds to step ST33.

In step ST33, the driver returns to the forward viewing state. The driver ends the grasping of the conditions of the surrounding area. In other words, the driver ends the glance and points his or her face forward, resulting in a state enabling the driver to look ahead.

The display device uses such a human-machine interface responsive to driver operations to change the visible range of the surrounding area on the basis of a display change instruction from the driver. Note that a display device that uses such a human-machine interface is not limited to a display device configured according to the first to third embodiments, and may also be applied to cases such as when the driver directly views the display on the display unit 50 to grasp the conditions of the surrounding area.

For the sake of simplicity, the flowchart illustrated in FIG. 25 describes a series of operations being performed until returning to looking ahead, in which the process simply returns directly. In actual practice, more complex operations may be performed before returning to looking ahead, and the phenomenon of the repeatedly checking by direct viewing and viewing of the display unit before returning to looking ahead may occur many times. However, since the goal is not to describe every possible phenomenon, description of examples other than the above will be omitted.

Next, configuration and operation according to the fourth embodiment will be described for the case of the driver viewing an image on a display unit indirectly via a mirror unit, similarly to the first to the third embodiments.

(4-1. Configuration of Fourth Embodiment)

Figure 26:
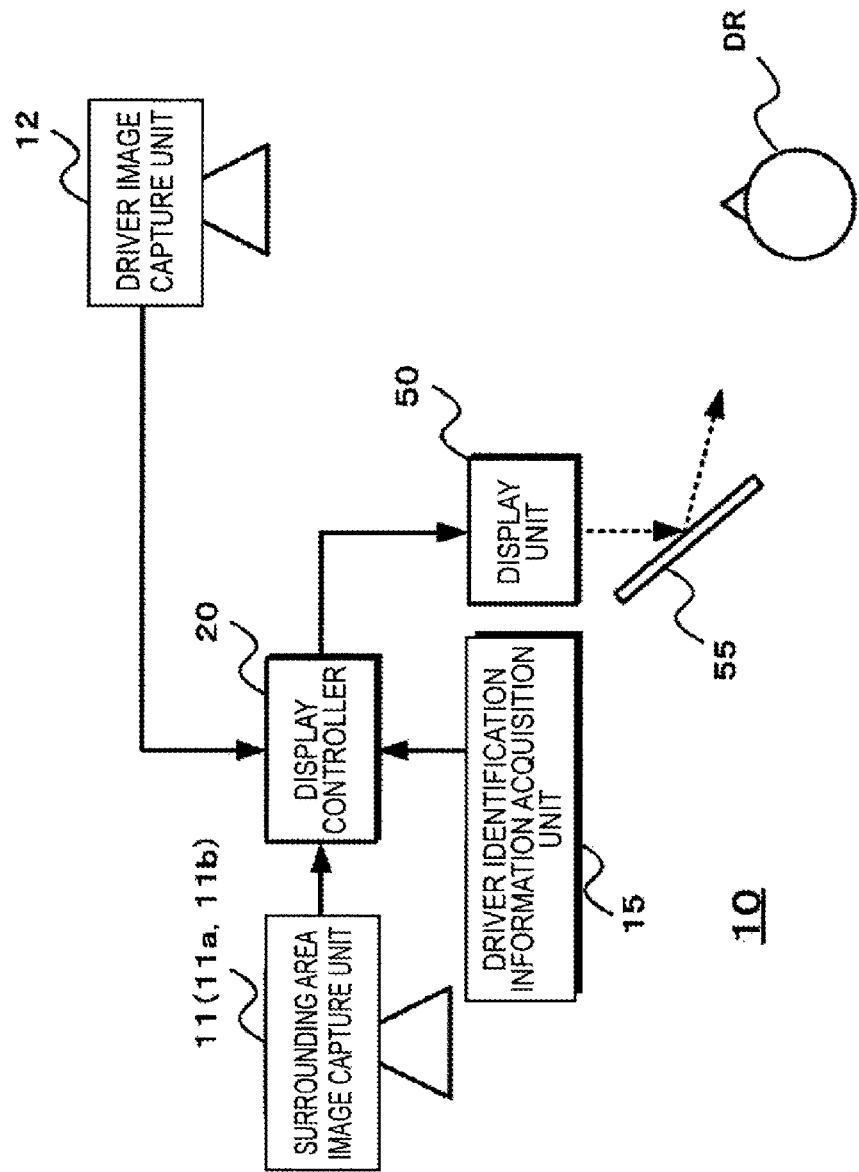
FIG. 26 is a diagram illustrating an example of a configuration of a fourth embodiment.

FIG. 26 is a diagram illustrating an example of a configuration according to the fourth embodiment. A display device 10 is equipped with a surrounding area image capture unit 11, a driver image capture unit 12, a driver identification information acquisition unit 15, a display controller 20, a display unit 50, and a mirror unit 55. In addition, the driver, the display unit, the mirror unit, and the driver image capture unit are provided as illustrated in FIG. 9 discussed previously.

The surrounding area image capture unit 11 captures an image of the surrounding area around a vehicle, and output an image signal to the display controller 20. Herein, the area captured by the surrounding area image capture unit 11 will be designated the captured surrounding area.

The driver image capture unit 12 is provided in front of the driver DR or in the direction in which the mirror unit 55 is installed, for example, to enable determination of properties such as the head position, head orientation, and line of sight orientation of the driver DR. The driver image capture unit 12 captures an image of the driver DR, and outputs an image signal to the display controller 20.

The driver identification information acquisition unit 15 acquires driver identification information, which is identification information unique to the driver, and outputs to the display controller 20. The driver identification information acquisition unit 15 may use a driver face recognition obtained by the driver image capture unit 12, use identification information assigned to a vehicle ignition key possessed by the driver, or implement various methods such as having the driver input an instruction directly via button operations or the like.

The display controller 20 causes the display unit 50 to display a captured image of the surrounding area that has been captured by the surrounding area image capture unit 11. In addition, the display controller 20 determines a glance in the direction of the mirror unit 55, an operation of moving the area to check, and various instruction operations, on the basis of properties such as the head position, head orientation, and line of sight orientation of the driver, movement of the position and orientation, and information supplied from the driver identification information acquisition unit 15. Furthermore, the display controller 20, on the basis of a determination result, controls the display of a captured image of the surrounding area to be displayed on the display unit 50. The display controller 20 displays a captured image of the surrounding area on the display unit 50 when the driver glances in the direction of the mirror unit, for example. In addition, the display controller 20 extends the area of the visible range in the case of determining that the driver has performed a predefined motion after a glance is detected, for example.

The display unit 50 is arranged so that the display face of the display unit 50 is indirectly visible to the driver via the mirror unit 55. Also, the display face of the display unit 50 is configured to a size larger than the mirror face of the mirror unit 55, so that a display image of the display unit 50 is visible via the mirror unit 55, even if the driver DR moves his or her head position to check an area over a wide range with a rearview mirror while driving. Note that in a display image of the display unit 50, the area that corresponds to the visible range of the image area that the driver checks via the mirror unit 55 will be referred to as the monitor image area.

The mirror unit 55 is provided so that the display face of the display unit 50 is indirectly visible to the driver DR. The mirror unit 55 is placed inside the vehicle, so that an image reflected in the mirror unit 55 is visible when the driver DR performs an operation of looking at a rearview mirror of the past, for example. In addition, the positional relationship of the mirror unit 55 with the display unit 50 and the size of the mirror unit 55 are configured so that when the driver DR indirectly views a captured image of the surrounding area via the mirror unit 55, the entire display area of the display unit 50 is reflected in the mirror unit 55. Furthermore, in the display unit 50 and the mirror unit 55, the visible range of the surrounding area that is visible to the driver from the image of the display unit 50 reflected in the mirror unit 55 is changed by display control of the display controller 20, according to movement of the viewing position of the driver with respect to the mirror unit 55. Note that the size of the mirror unit 55 is preferably configured to make the size of the area depicting the visible range similar to the size of a rearview mirror of the past, so that operational advantages similar to a rearview mirror of the past are obtained.

For the display device 10, in order for a captured image of the surrounding area to be indirectly visible to the driver DR via the mirror unit 55, the distance from the driver DR to the display face of the display unit 50 is increased compared to the case of the driver DR directly viewing the display face on the display unit 50.

In addition, in the display device 10, since a captured image of the surrounding area is indirectly visible to the driver DR via the mirror unit 55, the display unit 50 is arranged so that the display face and illuminating light from the display face are not visible to the driver DR. In addition, a configuration provided with a shield that blocks view of the display face of the display unit 50 and illumination light from the driver DR may also be used.

Figure 27:
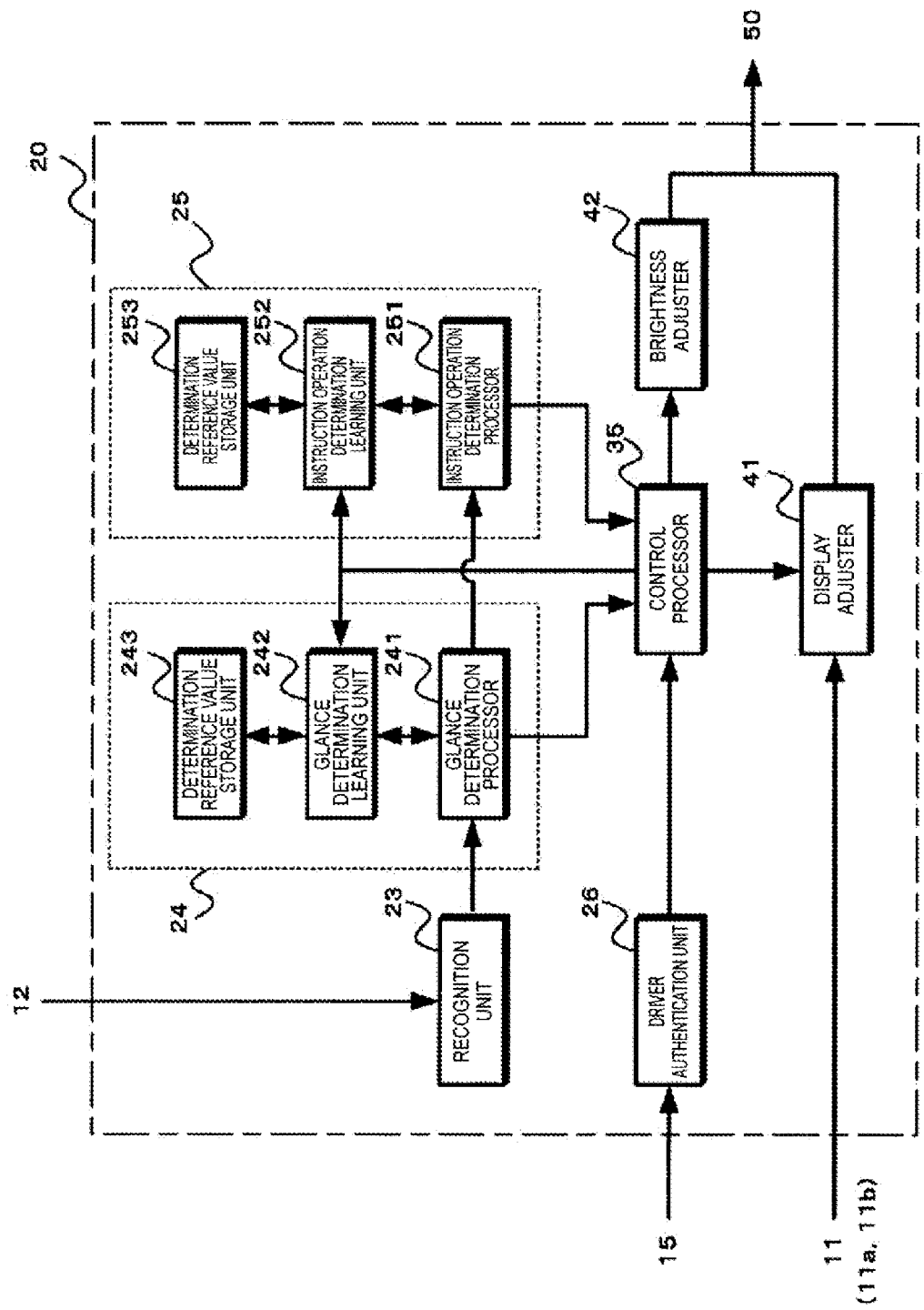
FIG. 27 is a diagram illustrating a configuration of a display controller.

FIG. 27 is a diagram illustrating a configuration of a display controller. The display controller 20 is equipped with a recognition unit 23, a glance determination unit 24, an instruction operation determination unit 25, a driver authentication unit 26, a control processor 35, a display adjuster 41, and a brightness adjuster 42.

The recognition unit 23 conducts face recognition on the basis of an image signal supplied from the driver image capture unit 12. In addition, the recognition unit 23 recognizes the orientation of the recognized head or the line of sight direction in the recognized face, and outputs a recognition result to the glance determination unit 24.

The glance determination unit 24 includes a glance determination processor 241, a glance determination learning unit 242, and a determination reference value storage unit 243.

The glance determination processor 241 compares a recognition result from the recognition unit 23 to a glance determination reference value supplied from the glance determination learning unit 242, determines whether or not the driver is facing in the direction of the mirror unit 55, and outputs a determination result to the instruction operation determination unit 25 and the control processor 35.

The glance determination learning unit 242 reads out a glance determination reference value from the determination reference value storage unit 243, and outputs to the glance determination processor 241. In addition, the glance determination learning unit 242 reads out from the determination reference value storage unit 243 a glance determination reference value corresponding to factors such as driver information from the control processor 35, determination parameter settings for driving optimized for high-speed forward travel, and determination parameter settings for driving suited to low speed, backing up, or parking, and outputs to the glance determination processor 241. Furthermore, the glance determination learning unit 242 updates the glance determination reference value on the basis of the recognition result of the head orientation and the line of sight direction, thereby enabling the glance determination processor 241 to make a precise glance determination for each driver. In addition, since an intended operation may differ even for similar head operations depending on the speed range of the vehicle, the glance determination processor 241 is configured to make a determination dependent on the speed range for each driver. For example, for high-speed travel or high-speed merging, the determination threshold time until confirming a line-of-sight glance may be set to less than one second to enable the driver to pay primary attention ahead, and extend the visible range while momentarily looking at the monitor with a fast operation. Meanwhile, since the respective actions for a large-sized trailer or the like during cases such as parking are conducted by extension or other operations after first focusing one's line of sight on each state and grasping the rear situation over a time that allows a full grasp, the determination threshold time is set to at least 0.5 seconds or more for speeds of less than 15 km/h which are determined to correspond to parking. The glance determination learning unit 242 outputs an updated glance determination reference value to the determination reference value storage unit 243, and updates the glance determination reference value being stored in the determination reference value storage unit 243. Note that if a glance determination reference value corresponding to the reported driver is not stored in the determination reference value storage unit 243, the glance determination learning unit 242 outputs a preconfigured glance determination reference value to the glance determination processor 241. In addition, the glance determination learning unit 242 causes the subsequently updated glance determination reference value to be stored in the determination reference value storage unit 243 in association with the driver information. At this point, the determination trend of the head orientation recognition may be provided to the driver DR as visual or audible feedback via a notification unit, such as an overlay display on the display of the display unit 50, an LED display, or a speaker in the vehicle, for example. In so doing, it is possible to realize confirmation of an instruction operation more accurately and with a minimum level of operation. It is desirable for the feedback to the driver DR to be not a digital 0/1, true or false determination, but rather analog feedback by the notification unit of a status indicating the degree of determination of the driver's motion, for example.

The determination reference value storage unit 243 stores a glance determination reference value used for glance determination. In addition, when driver authentication is conducted, the determination reference value storage unit 243 stores a glance determination reference value for each driver. The glance determination reference value stored in the determination reference value storage unit 243 is updated according to a learning result from the glance determination learning unit 242.

The instruction operation determination unit 25 includes an instruction operation determination processor 251, an instruction operation determination learning unit 252, and a determination reference value storage unit 253.

The instruction operation determination processor 251 uses a recognition result from the recognition unit 23, a glance determination result from the glance determination unit 24, and a determination reference value supplied from the instruction operation determination learning unit 252 to determine whether or not the driver performed a predetermined operation, and outputs to the control processor 35. The instruction operation determination processor 251 determines an instruction by the driver from the driver's motion, on the basis of a detection result of a combination of two or more acceleration or deceleration operations of the driver's head, for example.

The instruction operation determination learning unit 252 reads out an instruction operation determination reference value from the determination reference value storage unit 253, and outputs to the instruction operation determination processor 251. In addition, when a driver is reported from the control processor 35, the instruction operation determination learning unit 252 reads out from the determination reference value storage unit 253 an instruction operation determination reference value corresponding to the reported driver, and outputs to the instruction operation determination processor 251. Furthermore, the instruction operation determination learning unit 252 updates the instruction operation determination reference value on the basis of the recognition result of the head orientation and the line of sight direction, thereby enabling the instruction operation determination processor 251 to make a precise instruction operation determination. The instruction operation determination learning unit 252 outputs an updated instruction operation determination reference value to the determination reference value storage unit 253, and updates the instruction operation determination reference value being stored in the determination reference value storage unit 253. Note that if an instruction operation determination reference value corresponding to the reported driver is not stored in the determination reference value storage unit 253, the instruction operation determination learning unit 252 outputs a preconfigured instruction operation determination reference value to the instruction operation determination processor 251. In addition, the instruction operation determination learning unit 252 causes the subsequently updated instruction operation determination reference value to be stored in the determination reference value storage unit 253 in association with the driver information.

The determination reference value storage unit 253 stores an instruction operation determination reference value used for instruction operation determination. In addition, when driver authentication is conducted, the determination reference value storage unit 253 stores an instruction operation determination reference value for each driver. The instruction operation determination reference value stored in the determination reference value storage unit 253 is updated according to a learning result from the instruction operation determination learning unit 252.

At this point, a function may be provided so that if an operation performed with a gesture produces an unintended determination result in the instruction operation determination learning unit 252 and leads to incorrect operation, a specification of an excluded category or the like may be conducted in a feedback format other than gesture detection, such as by a button operation or a speech operation, for example.

The driver authentication unit 26 determines the current driver of the vehicle on the basis of identification information unique to the driver that is acquired by the driver identification information acquisition unit 15, and outputs a determination result to the control processor 35.

The control processor 35 determines the driver of the vehicle on the basis of a determination result from the driver authentication unit 26, and reports the determined driver to the glance determination learning unit 242 and the instruction operation determination learning unit 252. In addition, the control processor 35 generates a control signal that controls the display differently for the monitor image area and the non-monitor image area of the display unit 50, on the basis of determination results from the glance determination unit 24 and the instruction operation determination unit 25. The control processor 35 outputs the generated control signal to the display adjuster 41 and the brightness adjuster 42.

The display adjuster 41, on the basis of a control signal from the control processor 35, conducts a scale adjustment of the captured image of the surrounding area, changes or combines images of the surrounding area, and the like with respect to an image signal supplied from the surrounding area image capture unit 11.

The brightness adjuster 42, on the basis of a control signal from the control processor 35, lowers the brightness of the non-monitor image area on the display unit 50 to less than the monitor image area. If the display unit 50 is configured using display elements that may require illumination, such as liquid crystal elements, for example, the brightness adjuster 42 controls the illumination, such as the backlight, for example, to lower the brightness of the non-monitor image area to less than the monitor image area. Meanwhile, if the display unit 50 is configured using display elements that do not require illumination or using light-emitting elements, such as organic EL display elements, for example, a process may be conducted to lower the signal level of a luma signal corresponding to the non-monitor image area.

According to the above configuration, the detection of a state of starting to view a display unit is conducted rapidly as a sequence of detecting a driver operation predicted in advance.

The steps of an ergonomic operation by an ordinary driver are anticipated as follows. When an animal grasps the outside world overall via visual perception, eye movement grasps the direction and changes orientation the most rapidly, and when there is a desired object to view in a range that is outside the rotation range of eye movement alone, the posture of the neck and head additionally changes to track the object and compensate for the insufficient range.

As a result, in the series of steps by which the driver looks ahead and focuses his or her line of sight in the installation direction of the mirror unit which is installed in a significantly different direction, the driver grasps the approximate direction in which the image in the mirror unit is visible, and starts eye rotation and neck rotation. After the driver brings the mirror unit into the line of sight, as the neck turns, the eye rotation aligns with the line of sight direction so as to cancel out the neck rotation, and at the time when the line of sight becomes aligned with the mirror unit, the neck-turning movement also stops and becomes approximately still. The head rotation state that is characteristic of this series of operations is continuously analyzed over time to learn the change from the state of motion acceleration and deceleration to the state of starting to view the mirror unit. By conducting learning in this way and analyzing the features of the operation sequences of individual drivers, it becomes possible to determine the start of a driver focusing on the mirror unit starting from before that driver's head rotation is perfectly still. Additionally, by rapidly proceeding to instruction operation next, a low-lag human-machine interface (HMI) for screen operations is realized. At this point, the determination trend of the head orientation recognition may be provided to the driver DR as visual or audible feedback via a notification unit, such as an overlay display on the display of the display unit 50, an LED display, or a speaker in the vehicle, for example. In so doing, it is possible to realize confirmation of an instruction operation more accurately and with the minimum level of operation. It is desirable for the feedback to the driver DR to be not a digital 0/1, true or false determination, but rather analog feedback by the notification unit of a status indicating the degree of determination of the driver's motion, for example. However, since the display of too much feedback may also impede the visual field, and if such a display becomes unwanted after learning the characteristics unique to the driver, the display function may also be stopped, and the display may not be displayed all the time.

In addition, when the driving is ordinary high-speed forward travel, there is little bodily motion and a narrow range becomes the target range of vision, whereas during low-speed parking, the driver makes large movements of the head and body as part of the work to grasp the entire surroundings. For this reason, it is desirable for the determination reference used to detect each instruction to differ between high speed and low speed. Consequently, operability is improved by having the mode change determination perform a correlation determination of the driving state of the vehicle.

(4-2. Operation of Fourth Embodiment)

Figure 28:
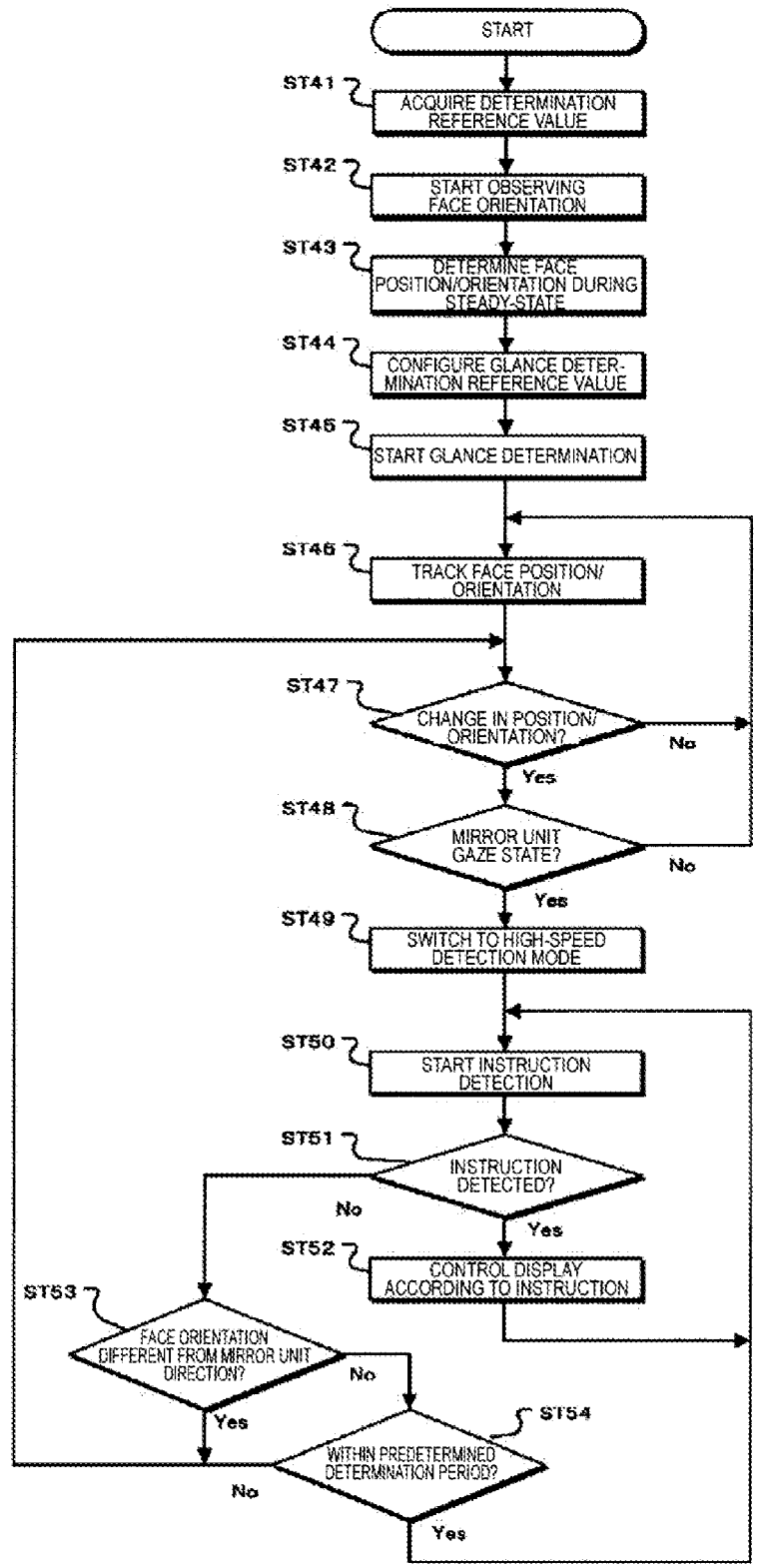
FIG. 28 is a flowchart illustrating operation of a display controller.

FIG. 28 is a flowchart illustrating operation of a display controller. In step ST41, the display controller 20 acquires a determination reference value. The display controller 20 acquires a determination reference value to use for the determination of a glance operation, an instruction to change the visible range, and an instruction to restore the visible range. Also, a determination reference value may be provided for each driver, and a determination reference value corresponding to the current driver may also be acquired. In addition, the determination reference value may be updated according to driver operations, and the latest determination reference value may also be acquired. The display controller 20 acquires a determination reference value, and proceeds to step ST42.

In step ST42, the display controller 20 starts observation of the head orientation. The display controller 20 uses an image signal supplied from the driver image capture unit 12 to conduct face recognition, starts a process of determining the driver's face and a process of detecting the orientation of the determined head, and proceeds to step ST43.

In step ST43, the display controller 20 determines the position and orientation of the face during steady-state. The display controller 20 determines the position and orientation of the face during steady-state on the basis of the observation result of the face orientation (head orientation). When the face position or orientation during steady-state changes from the previous determination, the display controller 20 computes a correction value according to the magnitude of the change. Also, if there is no information corresponding to the driver, the difference from a default value is treated as the correction value. The display controller 20 computes a correction value and proceeds to step ST44.

In step ST44, the display controller 20 configures a glance determination reference value. The display controller 20 uses a determination reference value and the computed correction value to configure a glance determination reference value, and proceeds to step ST45.

In step ST45, the display controller 20 starts a glance determination. The display controller 20 starts a process of determining a glance operation of the driver using an observation result of the head orientation and the glance determination reference value, and proceeds to step ST46.

In step ST46, the display controller 20 tracks the face position and orientation. The display controller 20 tracks the face position and orientation on the basis of an observation result of the face position and orientation, and proceeds to step ST47.

In step ST47, the display controller 20 determines whether or not a change has occurred in the face position or orientation. The display controller 20 returns to step ST46 in the case of determining no change in the face position or orientation, and proceeds to step ST48 in the case of determining that a change has occurred.

In step ST48, the display controller 20 determines whether or not a mirror unit gaze state exists. The display controller 20 uses the face position and orientation and a determination reference value to determine whether or not the driver is in a state of gazing at the mirror unit. The display controller 20 proceeds to step ST49 in the case of determining a gaze state, and returns to step ST46 in the case of determining no gaze state. Note that the gaze state herein refers to a point at which there is a moment of the eyes focusing and proceeding to grasp the situation as a physiological operation, and is not limited to being a state in which the driver is intently watching an image in the mirror unit.

In step ST49, the display controller 20 switches to a high-speed detection mode. The display controller 20 conducts high-speed observation of the face position and orientation in order to precisely detect an instruction to change the visible range and an instruction to restore the visible range by the driver, thereby enabling fine motion of the driver to be detected. In the case of high-speed detection mode, the display controller 20 periodically conducts observation of the face position and orientation of the driver at a frequency of 100 ms or less, for example. Note that glance detection is conducted in an ordinary detection mode, in which observation of the face position and orientation of the driver is periodically conducted over a wider interval than the high-speed detection mode. The display controller 20 switches to high-speed detection mode, and proceeds to step ST50.

In step ST50, the display controller 20 starts instruction detection. The display controller 20 starts the detection of an instruction to change the visible range and an instruction to restore the visible range using an observation result of the face position and orientation as well as a determination reference value, and proceeds to step ST51.

In step ST51, the display controller 20 determines whether or not an instruction is detected. If driver motion indicating an instruction to change the visible range or an instruction to restore the visible range is detected by instruction detection, the display controller 20 proceeds to step ST52. Meanwhile, if an instruction is not detected, the display controller 20 proceeds to step ST53.

In step ST52, the display controller 20 controls the display according to an instruction. If an instruction to change the visible range is detected, for example, the display controller 20 changes the visible range displayed by an image in the monitor image area according to a change in the face position and orientation. In addition, if an instruction to restore the visible range is detected, for example, the display controller 20 reverts the visible range displayed by an image in the monitor image area to the area before being changed. The display controller 20 controls the display in this way, and returns to step ST50.

In step ST53, the display controller 20 determines whether or not the head orientation is in a direction different from the mirror unit direction. The display controller 20 uses an observation result of the head orientation and a determination reference value to determine whether or not the head orientation is in a direction different from an image viewing direction. If the head orientation is determined to be in a direction different from the image viewing direction, the display controller 20 switches from high-speed detection mode to ordinary detection mode, and returns to step ST47. Meanwhile, if the head orientation is determined to be in the direction of the mirror unit, the display controller 20 proceeds to step ST54.

In step ST54, the display controller 20 determines whether or not the time is within a predetermined determination period. If the time is within the predetermined determination period, the display controller 20 returns to step ST50, whereas if the predetermined determination period has elapsed, the display controller 20 switches the high-speed detection mode to ordinary detection mode, and returns to step ST47.

Figure 29:
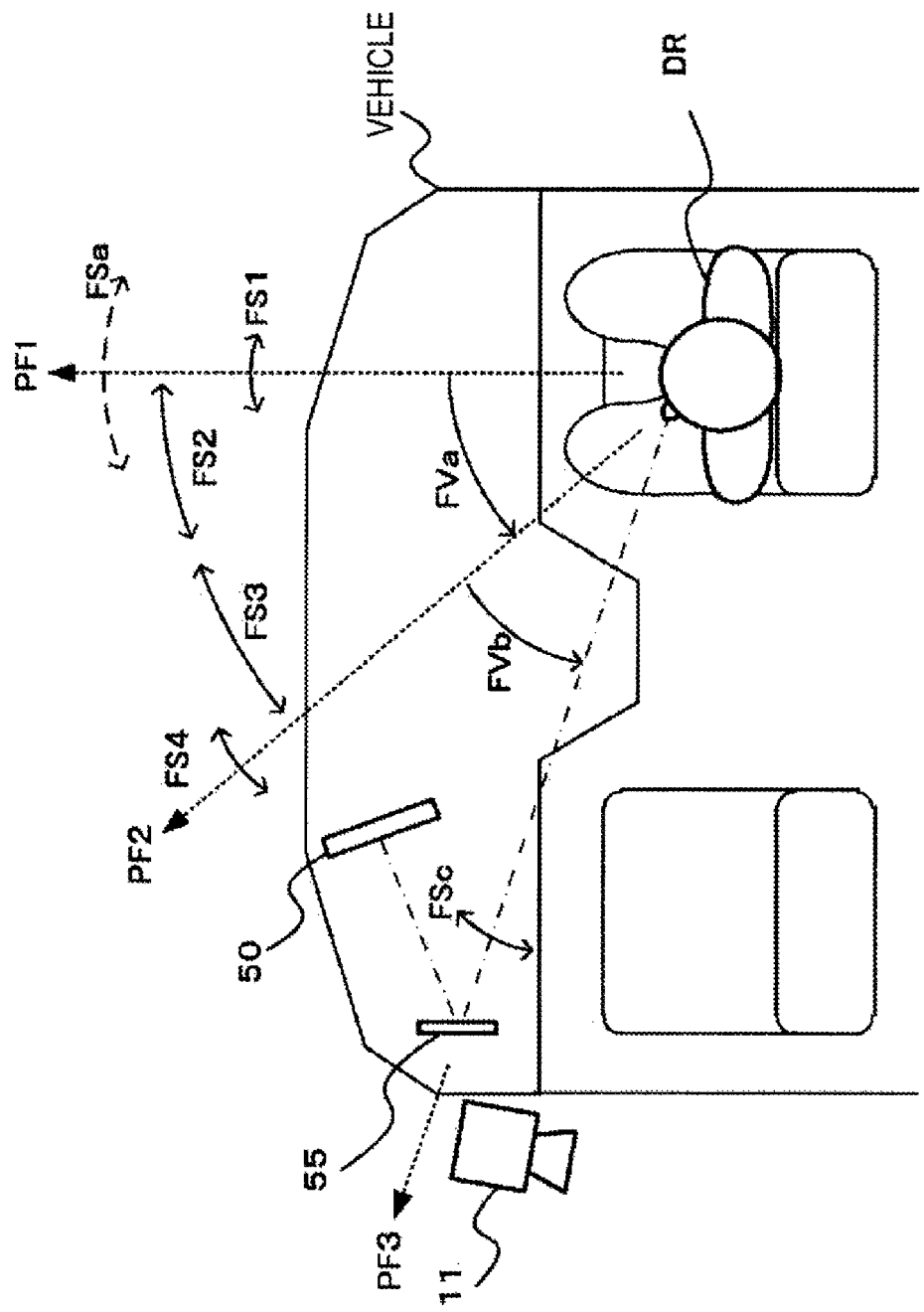
FIG. 29 is a diagram illustrating an example of the operation of a glance and an instruction to change the visible range.
Figure 30:
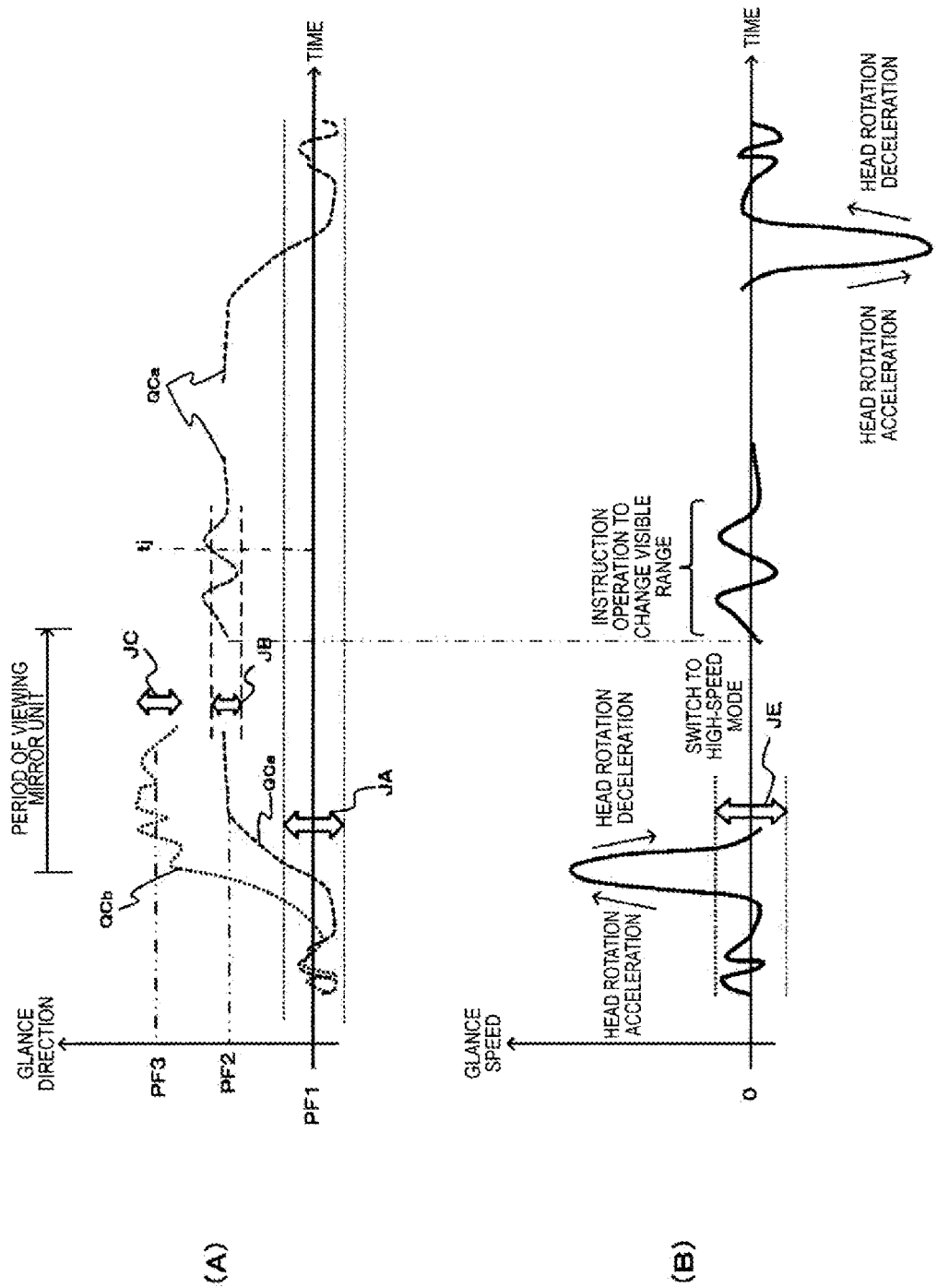
FIG. 30 is a diagram illustrating an example of the operation of glance determination and determination of an instruction to change the visible range.

FIG. 29 is a diagram illustrating an example of the operation of a glance and an instruction to change the visible range. Also, FIG. 30 is a diagram illustrating an example of the operation of glance determination and determination of an instruction to change the visible range. Note that FIG. 30(A) illustrates an example of the relationship between the glance direction (angle) and time, while FIG. 30(B) illustrates an example of the relationship between the glance speed and time.

In FIG. 29, the direction PF1 indicates the front direction that the driver's head faces normally, while the direction PF2 indicates an example of the head orientation when the driver views an image in the mirror unit 55. The direction PF3 indicates the direction of the mirror unit 55.

The range FS1 indicates an example of the movement range of the driver's head orientation normally, while the range FSa indicates an example of the search range by the driver's eye movement. The range FS2 is a head rotation acceleration zone when the head orientation moves from the direction PF1 to the direction PF2, and a head rotation deceleration zone when the head orientation moves from the direction PF2 to the direction PF1. The range FS3 is a head rotation deceleration zone when the head orientation moves from the direction PF1 to the direction PF2, and a head rotation acceleration zone when the head orientation moves from the direction PF2 to the direction PF1. The angle FVa illustrates an example of the glance angle of the head when the driver views an image in the mirror unit 55. The angle FVb illustrates an example of the glance angle covered by eye movement when the driver views an image in the mirror unit 55. The range FSc illustrates an example of the search range by eye movement when the driver views an image in the mirror unit 55.

In FIG. 30(A), the range JA is the range of the glance angle interpreted as the driver facing ahead. The range JB is the range of the glance angle interpreted as the driver gazing at the mirror unit 55 when the driver rotates his or her head in the direction PF2. The range JC is the range of the glance angle interpreted as gazing at the mirror unit 55 by eye movement. The curve QCa indicates the head orientation, while the curve QCb indicates a line of sight direction based on the head orientation and eye movement. Also, in FIG. 30(B), the range JE is the determination range during a forward glance.

The display controller 20 detects that the glance speed (corresponding to the change in the head orientation) exceeded the range JE indicated by the determination reference value and returned to within the range JE, while the glance direction (angle) is within the range JB (a range configured with reference to the mirror direction) of the glance direction indicated by the determination reference value. In this case, the display controller 20 estimates that the driver has glanced and is gazing in the direction of the mirror unit 55, and determines that a glance operation is conducted. Note that if eye movement detection is conducted and the line of sight direction is estimated on the basis of the head orientation and the eye movement, a glance operation may be determined more precisely by comparing the estimated line of sight direction to the range JC. In the case of determining that a glance operation is conducted, the display controller 20 changes to the high-speed detection mode to enable the detection of an instruction to change the visible range with a high time resolution.

Note that in a rearview monitoring system on the driver side and the passenger side, it is anticipated that the position and direction of the display unit 50 and the mirror unit 55 may differ, and instruction operation determination, glance angle determination, and the like may all differ. For this reason, it is desirable to configure the bases of determination individually.

The display controller 20 compares the range JB for determining whether or not the glance direction (angle) is in a gaze state to the glance direction (angle), and detects that the glance direction (angle) exceeded the range JB in a predetermined direction a predetermined number of times, such as two times, for example. Herein, in the case of detecting a combination of two or more acceleration/deceleration operations of the driver's head at the time tj as illustrated in FIG. 30(A), or in other words, in the case of determining that the glance direction (angle) exceeded the range JB two times, the display controller 20 estimates that the driver is performing an instruction in the gaze state with respect to the mirror unit, and determines that an instruction to change the visible range is conducted. After that, the display controller 20 controls the display to change the visible range according to the instruction to change the visible range.

Note that the display controller 20 detects that the head orientation is within the range JA indicated by the determination reference value. In this case, the display controller 20 determines that the driver changed orientation from the mirror unit direction to the forward direction, and returns to the state before the glance operation determination.

In addition, the operating instruction magnitude used to perform the instruction to change the visible range may also differ depending on the driving state. Typically, the driver is used to making large movements with his or her head and body during low-speed driving operations such as parking. On the other hand, during high-speed travel, there is little movement of the head primarily, and eye movement dominates the major line of sight movement. For this reason, it is preferable to provide a basis of determination with less head movement. Furthermore, although FIG. 30 illustrates an example of two or more repeated movements, the driver's head operation may also be a series of one-way, two-stage acceleration motions with no substantial reverse motion.

Figure 31:
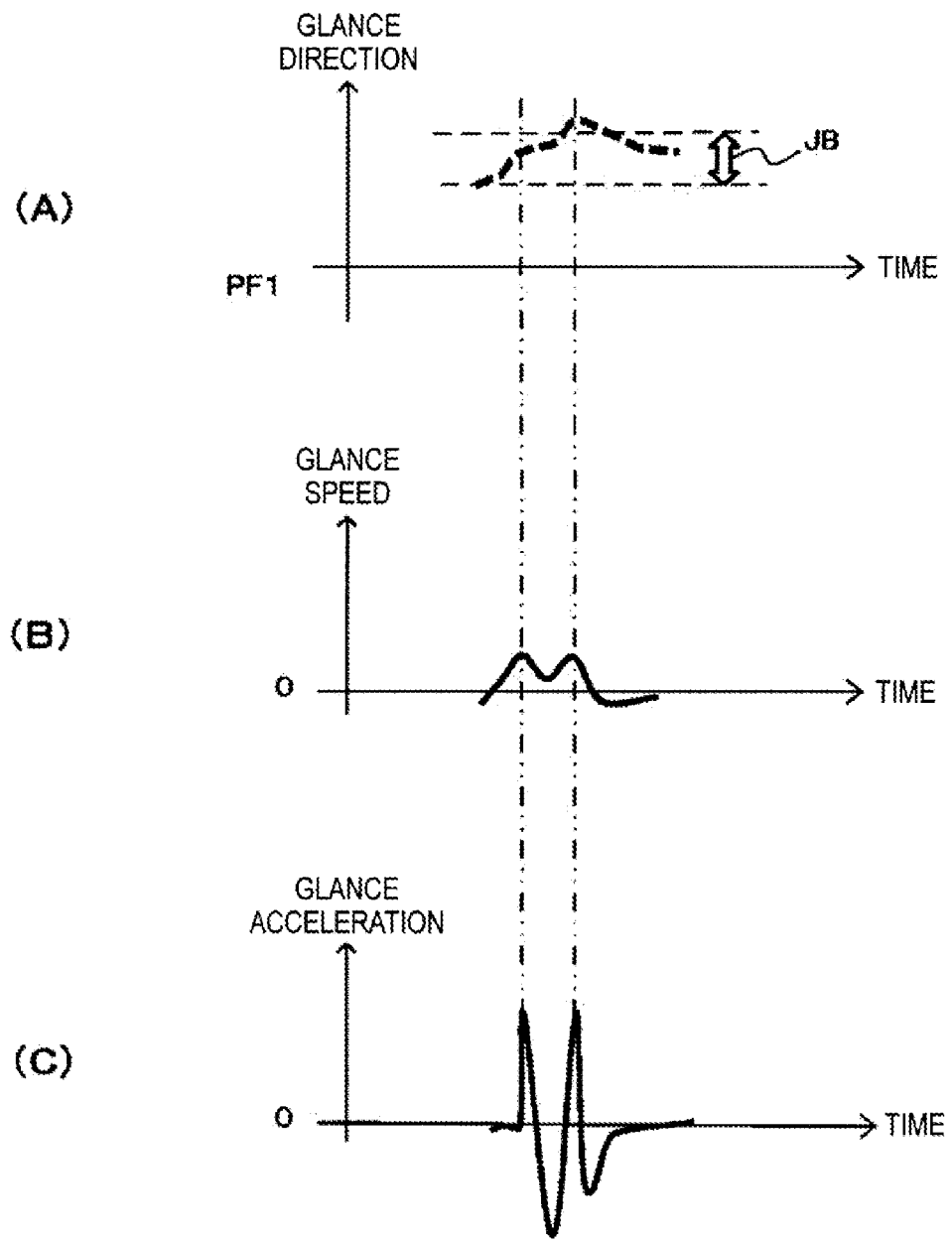
FIG. 31 is a diagram illustrating an example of a case of using the acceleration of a head rotation operation as an operating instruction magnitude.

FIG. 31 illustrates an example of a case of using the acceleration of a head rotation operation as an operating instruction magnitude. FIG. 31(A) illustrates the glance direction (angle), while FIG. 31(B) illustrates the glance speed, and FIG. 31(C) illustrates the glance acceleration.

When a driver performs a glance multiple times, the reverse operation of the glance and the reverse operation of the next glance may not be strictly aligned at the same start position. For example, the next glance operation may be conducted before the reverse operation of the previous glance returns to the original position. In this case, the curve QCa indicating the head orientation varies as illustrated in FIG. 31(A). Consequently, determining an instruction to change the visible range on the basis of the glance direction (angle) may be difficult. However, if the reverse operation of the glance is repeated, the glance acceleration becomes a waveform producing one cycle of oscillation per glance operation, as illustrated in FIG. 31(C). Consequently, the display controller 20 may utilize the glance acceleration to detect the repetition of a glance precisely.

Furthermore, the display controller 20 learns an operation feature history of a driver's glance speed and glance direction, and changes the determination reference value for each driver according to the features unique to that driver. By updating the determination reference value in this way, a self-learning function is provided that improves the precision of determining a glance operation or an instruction to change the visible range, and additionally enables accurate instruction detection with fewer instruction operations. Also, with the learning function, operation features, including the operating instruction magnitude, are self-learned to produce work optimized for the features of the driver.

By conducting such processing, it is possible to conduct precise display control corresponding to operations performed when the driver grasps the conditions of the surrounding area.

In addition, the detection of the movement of the head orientation is conducted after a time for the glance operation to stabilize has elapsed. In so doing, when head movement in a direction orthogonal to the head orientation is repeated two or more times, or when a face-turning operation that rotates the orientation of the face about the axis of the neck is repeated two or more times, for example, it is determined that an instruction to change the visible range or an instruction to restore the visible range has been conducted. Consequently, the determination of an instruction may be accurately conducted even more precisely.

The present technology, on the basis of an ergonomic procedure when a person glances in a different direction from a line of sight direction of primary attention, accounts for the motion to stabilize head movement as a target object is rapidly grasped by eye movement and the eyes start to focus while at the same time the person finally starts paying visual attention. In other words, in the moment at which the driver visually perceives the display content and starts to grasp the situation, the movement of the head position stabilizes and beings to stop. The driver additionally judges, by perceiving the screen, whether or not to change the visible range, thereby reflecting that an instruction operation is conducted after the stabilization procedure is experienced.

Also, in the display control, the display controller 20 controls the display in response to detecting that the driver's head orientation has moved in the direction of the mirror unit. For example, if the head orientation is not in the direction of the mirror unit, the backlight is turned off or the signal level of the luma signal is lowered so that the image is not visible or less visible. Meanwhile, if the head orientation is in the direction of the mirror unit, the backlight is turned on and the brightness control or the signal level of the luma signal is adjusted to enable the driver to check an image of the visible range. Consequently, when the driver is facing ahead, the display of a needlessly bright image of the surrounding area may be avoided. In addition, an image of the surrounding area may be displayed only when the driver is facing in the direction of the mirror unit.

In addition, after changing the visible range, the display controller 20 may also gradually and automatically revert the visible range back to the original position. In this case, the driver is not required to perform an operation to revert the visible range back to the original range. Furthermore, in order to avoid a state in which the driver momentarily becomes unable to check the situation, the display controller 20 controls the display so that changes in the display scale and changes in the display format do not occur suddenly.

For the sake of convenience, the description in this specification describes a practical example of a procedure of recognizing the head direction and line of sight, and detecting an instruction. However, since the actual aim is not to compute a specific head direction and line of sight accurately, it is sufficient to obtain a correlation with the state of the driver viewing the display unit 50, and the role of the display controller 20 does not necessarily require the provision of a function enabling line of sight recognition or an accurate grasping of the head orientation. For this reason, the display controller 20 is not limited to the configuration of FIG. 27, and may be configured differently insofar as the display is responsive to the vehicle state and operating instruction gestures by the driver.

5. Other Embodiments

In addition, as another embodiment, when displaying an image on the display unit 50, if the image is compressed for display, there is a risk that the apparent distance perceived from the display image may differ greatly from the distance to a subject included in the surrounding area. Accordingly, a warning display may also be provided on the screen or on a border of the display unit, according to the degree of image compression.

Figure 32:
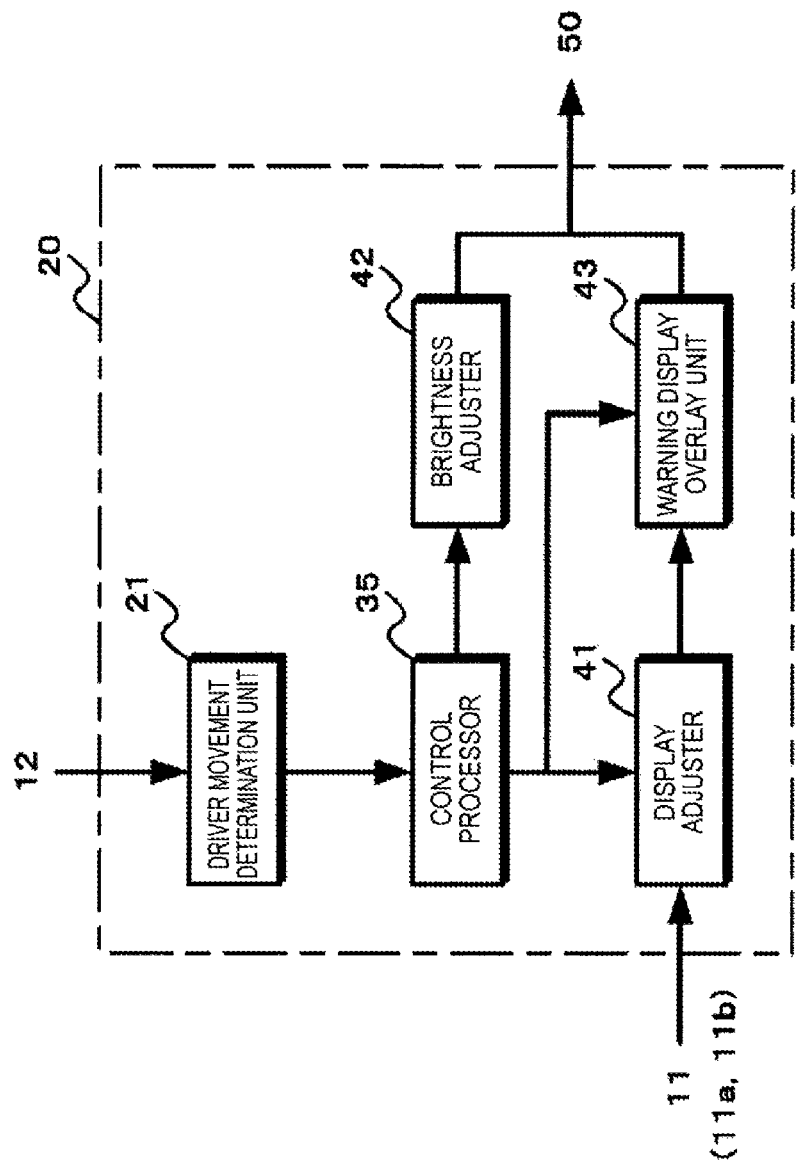
FIG. 32 illustrates an example of a configuration of a display controller in the case of presenting a warning display.

FIG. 32 illustrates an example of a configuration of a display controller in the case of presenting a warning display. The display controller 20 is equipped with a driver movement determination unit 21, a control processor 35, a display adjuster 41, a brightness adjuster 42, and a warning display overlay unit 43.

The driver movement determination unit 21, on the basis of an image signal supplied from the driver image capture unit 12, detects the head position of the driver, and determines the movement direction and movement magnitude of the head position of the driver. For example, the driver movement determination unit 21 conducts facial recognition of the driver on the basis of an image signal supplied from the driver image capture unit 12, for example, and determines the position of the recognized face, the orientation of the face or the orientation of the head. Furthermore, the driver movement determination unit 21 tracks the recognized face, and determines the movement direction and movement magnitude of the head position. The driver movement determination unit 21 outputs a determination result to the control processor 35.

The control processor 35, on the basis of a determination result from the driver movement determination unit 21, generates a control signal to control the display differently for the monitor image area and the non-monitor image area of the display unit 50, and outputs to the display adjuster 41, the brightness adjuster 42, and the warning display overlay unit 43.

The display adjuster 41, on the basis of a control signal from the control processor 35, conducts a scale adjustment of the captured image of the surrounding area, changes or combines images of the surrounding area, and the like with respect to an image signal supplied from the surrounding area image capture unit 11.

The brightness adjuster 42, on the basis of a control signal from the control processor 35, lowers the brightness of the non-monitor image area on the display unit 50 to less than the monitor image area. If the display unit 50 is configured using display elements that may require illumination, such as liquid crystal elements, for example, the brightness adjuster 42 controls the illumination, such as the backlight, for example, to lower the brightness of the non-monitor image area to less than the monitor image area. Meanwhile, if the display unit 50 is configured using display elements that do not require illumination or using light-emitting elements, such as organic EL display elements, for example, a process may be conducted to lower the signal level of a luma signal corresponding to the non-monitor image area.

The warning display overlay unit 43, on the basis of a control signal from the control processor 35, causes information indicating the degree of image compression, for example, to be overlaid onto an image after display-variable processing. For example, an image of the visible range is displayed to match left and right motion of the face, the visible range is enlarged by a repeated operation of the head or face two or more times, and the display before enlargement is restored by an operation in the opposite direction. In addition, when displaying an image with a changed scale, a dynamic warning display is provided to warn that the display has a changed scale. To intuitively understand the warning content, the dynamic warning display adjusts a frame size according to the operation of changing the scale, displaying a zebra-striped frame in which the zebra stripes flow according to the change of scale. Regarding the flow of the zebra display, when taking human physiological mechanisms into account, it is desirable to include motion in an approaching direction, since humans are sensitive to approaching objects, which are perceived as a threat when a moving object enters the visual field from outside the line of sight.

By controlling the display in this way, when an image is compressed for display, a loss of the driver's sense of distance and the like may be avoided. For example, it is possible to avoid the misrecognition of an approaching subject as a subject at a distant position due to the image being compressed.

In addition, the display controller 20 may also control the display in conjunction with a navigation system, and display an image with a wider angle of view than the ordinary rearview visual field when merging on an expressway or traveling in a roundabout.

In addition, the determination of driver motion is not limited to using movement of the head orientation, or in other words, head rotation about the axis of the neck, and the display may also be controlled by using at least one of a head tilt operation (nodding) or movement in the front, back, left, or right direction of the driver's upper body, for example. Furthermore, an operation of moving the head or a posture change in the direction of the mirror unit may also be used to conduct a zoom-in or zoom-out operation on the display image.

Figure 34:
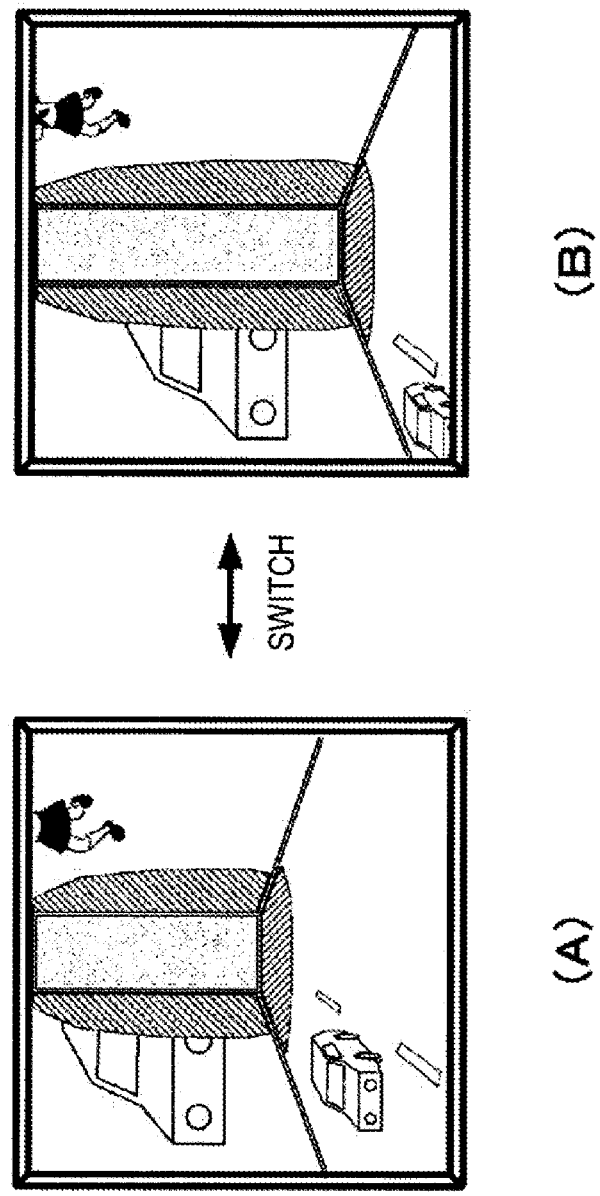
FIG. 34 is a diagram for explaining the changing of a surrounding area image when the head moves in a front-back direction.

FIGS. 33 to 35 illustrate examples of display control based on other driver motions. FIG. 33 illustrates an example of the placement of a surrounding area image capture unit and a surrounding image displayed on a display unit. As illustrated in FIG. 33(A), surrounding area image capture units 11*c* and 11*d* are provided on the sides of the vehicle, while a surrounding area image capture unit 11*e* is provided on the rear face of the vehicle. As illustrated in FIG. 33(B), the display controller 20 displays an image of three surrounding areas acquired by the surrounding area image capture units 11*c*, 11*d*, and 11*e* on the display unit 50.

FIG. 34 is a diagram for explaining the changing of a surrounding area image when the head moves in a front-back direction. As illustrated in FIG. 34(A), before the head movement is conducted, the display controller displays an image of three surrounding areas acquired by the surrounding area image capture units 11*c*, 11*d*, and 11*e* on the display unit 50. In addition, in the case of determining head movement in the forward direction, for example, as illustrated in FIG. 34(B), the display controller changes to an image in which the display areas displaying images of the surrounding area acquired by the surrounding area image capture units 11c and 11d provided on the vehicle sides are extended in the advancing direction. After that, when the head moves back to the original position, the display controller controls the display to revert to the image before the change.

FIG. 35 is a diagram for explaining the changing of a surrounding area image when the head moves in a leftward direction. As illustrated in FIG. 35(A), before the head movement is conducted, the display controller displays an image of three surrounding areas acquired by the surrounding area image capture units 11c, 11d, and 11e on the display unit 50. In addition, in the case of determining head movement in the leftward direction, for example, as illustrated in FIG. 35(B), the display controller changes to an image with an extended display area displaying an image of the surrounding area on the left side. After that, when the head moves back to the original position, the display controller controls the display to revert to the image before the change.

In this way, by controlling the display by using not only movement of the head orientation but also factors such as head tilt operations, images of the surrounding area may be displayed in a variety of formats.

Furthermore, although the foregoing embodiment describes the case of changing the visible range by controlling the display on the basis of a driver motion determination result, the orientation of the mirror unit may also be changed on the basis of a driver motion determination result, thereby depicting, in the mirror unit, an image of a desired visible range of the display image on the display unit.

In addition, as a configuration using a semi-transmissive mirror, the mirror unit may also be provided with a display device behind the mirror unit, such as liquid crystal display elements, organic EL display elements, or display elements using light-emitting diodes, for example. In this case, in the mirror unit, an image of the surrounding area displayed on the display unit may be viewed at the same time as an image displayed on the back display device. Consequently, if various information is displayed on the back display device, the driver would be able to read information while also checking the surrounding area at the same time. The information to displayed with the back display device may be information related to an image of the surrounding area displayed on the display unit (such as a determined instruction from the driver or a determined mode of the visible range, for example), or information related to the driving conditions or the like (such as navigation instruction information).

Furthermore, the mirror unit may be configured so that the semi-transmissive mirror includes a semi-transmissive light dimming function, or so that a light dimming device that adjusts the amount of transmitted light is additionally disposed behind the semi-transmissive mirror. According to such a configuration, it becomes possible to use the semi-transmissive light dimming function or the light dimming device to adjust the visibility of a display image on the display device provided behind the mirror unit. Consequently, information may be displayed so that the driver is able to read various information easily while also checking the surrounding area.

In addition, the foregoing embodiment illustrates an example of a case that realizes a function corresponding to a rearview mirror. However, since the viewing of the surrounding area is conducted with not only outer rearview mirrors but also an inner rearview mirror, a function corresponding to an inner rearview mirror may also be realized. Next, the case of realizing a function corresponding to an inner rearview mirror will be described as another embodiment. Note that in this case, the display unit, mirror unit, and the like are not strictly limited to an arrangement corresponding to mirrors of the past, and may also be arranged at positions such as near the instrument panel or console panel on the dashboard, for example.

Figure 36:
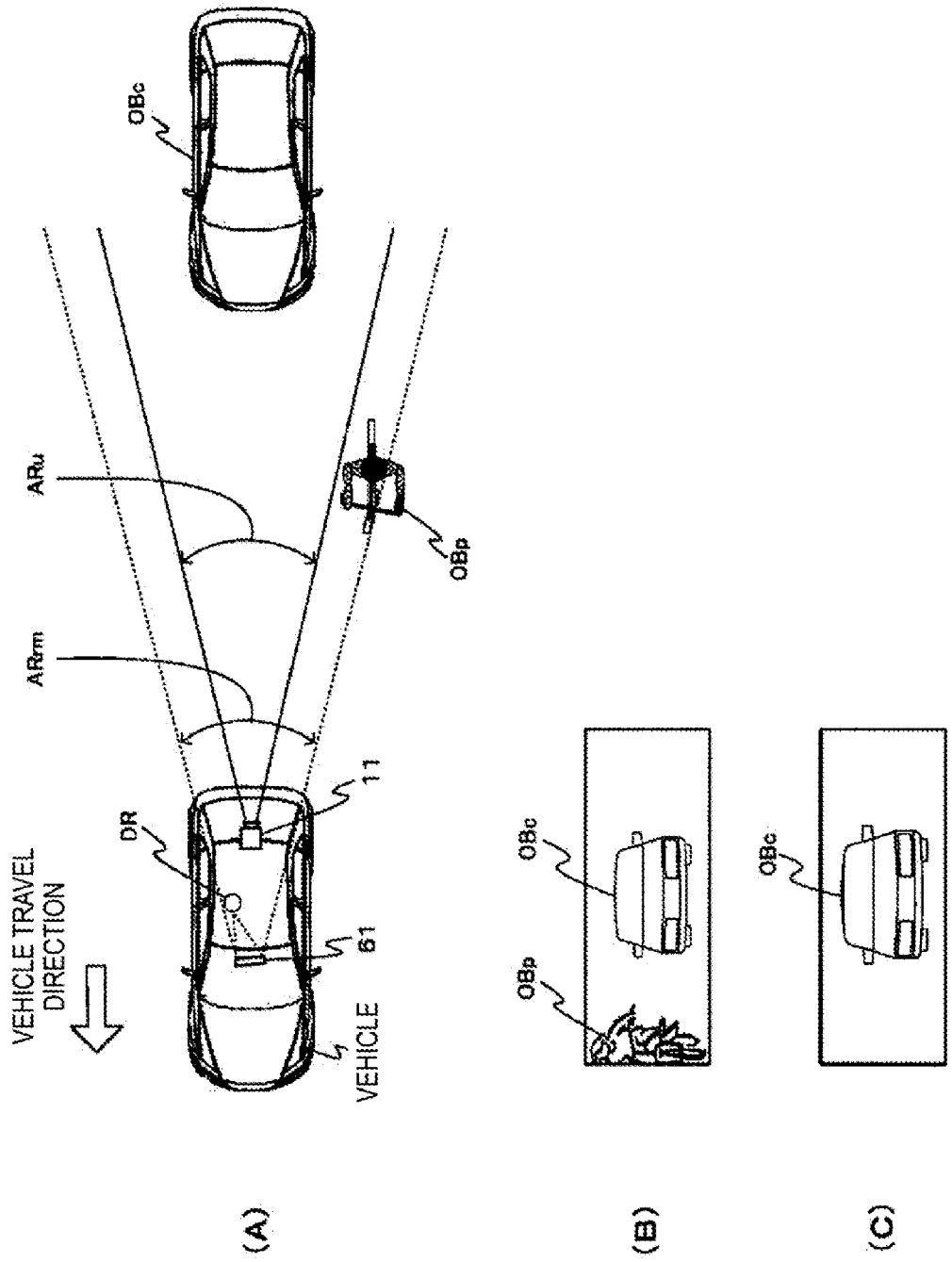
FIG. 36 is a diagram illustrating an example of a configuration in the case of using a single surrounding area image capture unit to realize a function corresponding to an inner rearview mirror.

First, the case of using a single surrounding area image capture unit to realize a function corresponding to an inner rearview mirror will be described. FIG. 36 illustrates an example of a configuration in the case of using a single surrounding area image capture unit to realize a function corresponding to an inner rearview mirror. For example, as illustrated in FIG. 36(A), a single surrounding area image capture unit is provided at the rear of the vehicle to capture an image behind the vehicle, enabling the driver DR to check an image of the surrounding area acquired by the surrounding area image capture unit 11. Note that in FIG. 36(A), the display unit that displays the image of the surrounding area has been omitted.

In addition, even if the driver DR views a surrounding area acquired by the surrounding area image capture unit 11, the driver DR is able to maintain a sense of distance similar to a surrounding area reflected in an inner rearview mirror 61. For example, the area ARu acquired by the surrounding area image capture unit 11 (the horizontal angle of view of a surrounding image acquired by the surrounding area image capture unit 11) is approximately equal to the horizontal visual field area ARrm of a surrounding area reflected in the inner rearview mirror 61. In so doing, a single surrounding area image capture unit may be used to realize a function corresponding to an inner rearview mirror.

Meanwhile, if a following car OBc or person OBp is positioned as illustrated in FIG. 36(A), the surrounding image reflected in the inner rearview mirror 61 is an image of the visual field area ARrm in FIG. 36(A), and thus becomes the image illustrated in FIG. 36(B), for example. In addition, the surrounding area captured by the surrounding area image capture unit 11 is the surrounding area ARu in FIG. 36(A), and thus becomes the image illustrated in FIG. 36(C), for example. In other words, in an image of the surrounding area captured by the surrounding area image capture unit 11, the area of the blind spot near the vehicle is large compared to the surrounding image reflected in the inner rearview mirror 61, and thus the driver may be unable to check the person OBp as illustrated in FIG. 36(C).

Figure 37:
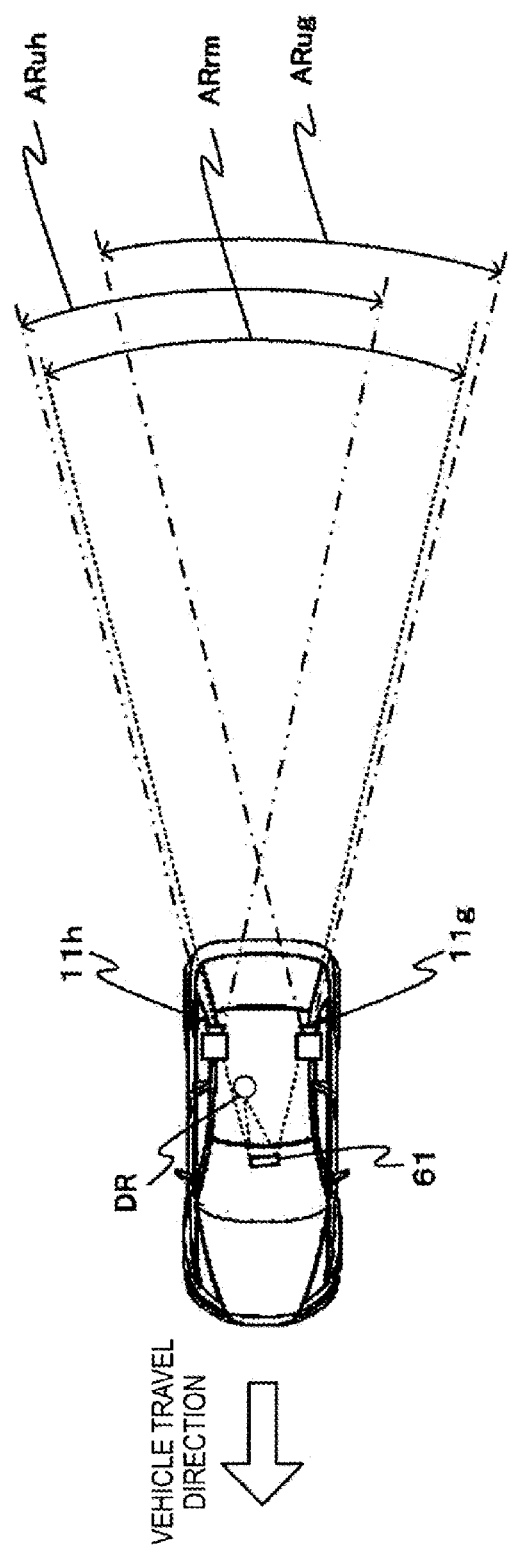
FIG. 37 is a diagram illustrating an example of a configuration in the case of using multiple surrounding area image capture units to realize a function corresponding to an inner rearview mirror.

Accordingly, as illustrated in FIG. 37, a plurality of surrounding area image capture units are used to realize a function corresponding to an inner rearview mirror. For example, if a surrounding area image capture unit 11g is provided on the left side of the vehicle while a surrounding area image capture unit 11h is provided on the right side of the vehicle, and each surrounding area image capture unit 11 captures an image of the rear to realize a function corresponding to an inner rearview mirror, the blind spot is reduced compared to the case of FIG. 36. Note that the area ARrm is the horizontal visual field area of the surrounding image reflected in the inner rearview mirror 61, while the area ARug is the horizontal visual field area of the surrounding image acquired by the surrounding area image capture unit 11g on the left side, and the area ARuh is the horizontal visual field area of the surrounding image acquired by the surrounding area image capture unit 11h on the right side. In so doing, when a surrounding area image capture unit is used to realize a function corresponding to an inner rearview mirror, by combining images of the surrounding area acquired by the surrounding area image capture unit 11g and the surrounding area image capture unit 11h, it is possible to avoid a larger blind spot area near the vehicle.

In addition, since parallax occurs between the images of the surrounding area acquired by the surrounding area image capture unit 11g and the surrounding area image capture unit 11h, it is difficult to cancel the parallax differences to combine and display the surrounding images. Consequently, for the combining of images of the surrounding area, an image combining process is made to be ergonomically and easily conducted so that parallax differences are not noticeable.

Figure 38:
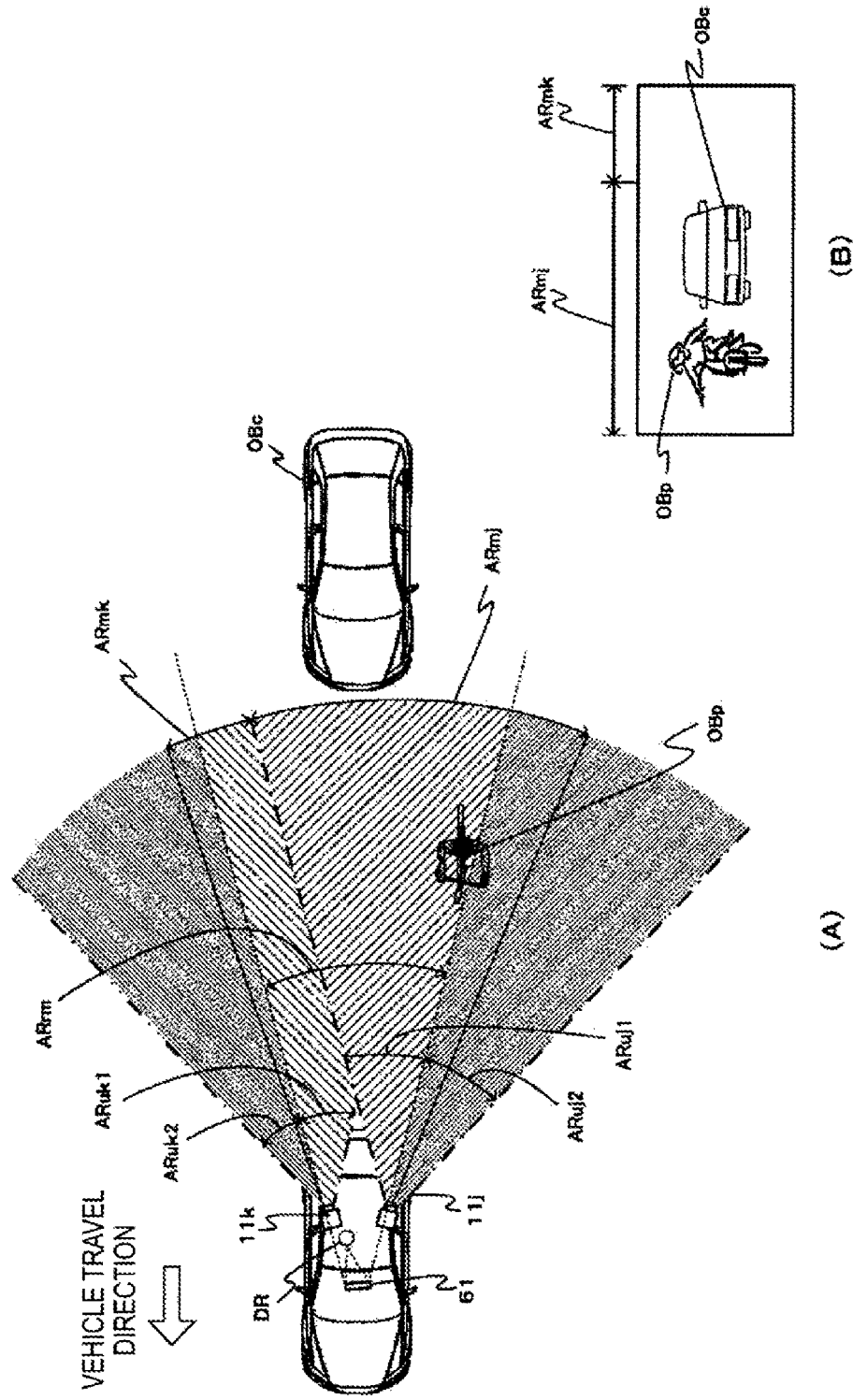
FIG. 38 is a diagram illustrating an example of a configuration in the case of reducing the blind spot compared to an inner rearview mirror.

FIG. 38 illustrates an example of a configuration in the case of reducing the blind spot compared to an inner rearview mirror. A surrounding area image capture unit 11j is provided on the left side of the vehicle, while a surrounding area image capture unit 11k is provided on the right side of the vehicle. In the surrounding area image capture unit 11j, the horizontal visual field area (angle of view) of the acquired surrounding image is configured to include the area ARuj1 included in the horizontal visual field area ARrm of the surrounding image reflected in the inner rearview mirror 61, and the area ARuj2 on the outward left side of the visual field area ARrm. In the surrounding area image capture unit 11k, the horizontal visual field area (angle of view) of the acquired surrounding image is configured to include the area ARuk1 included in the horizontal visual field area ARrm of the surrounding image reflected in the inner rearview mirror 61, and the area ARuk2 on the outward right side of the visual field area ARrm. In addition, regarding the rear position of the vehicle, the visual field area ARrm is conducted to be included in at least one of the area ARuj1 and the area ARuk1.

The display adjuster 41 of the display controller 20 discussed earlier, on the basis of a control signal from the control processor 35, trims and joins images from the surrounding images acquired by the surrounding area image capture units 11j and 11k. The control processor 35 controls the image trimming so that the surrounding area is continuous in the joined image. Furthermore, the control processor 35 moves the image trimming position and joining position according to an instruction from the driver, on the basis of a determination result by the driver movement determination unit 21.

The control processor 35, by joining an image of the area ARmj from the surrounding image acquired by the surrounding area image capture unit 11j and the area ARmk from the surrounding image acquired by the surrounding area image capture unit 11k, for example, enables the driver to check a surrounding area that includes the area ARrm, as illustrated in FIG. 38(B). In addition, since an image used to check the surrounding area may be generated by simply joining the image of the area ARmj and the image of the area ARmk, without conducting a process to cancel parallax differences to combine and display images, an image for checking the surrounding area may be generated easily.

In addition, for the image joining, a blend process is conducted over a range predetermined with reference to the image joining position, and the blend ratio of the surrounding image acquired by the surrounding area image capture unit 11j and the surrounding image acquired by the surrounding area image capture unit 11k is continuously varied. By conducting such a process, the joined portion may become less noticeable.

In addition, when the image trimming position is varied on the basis of a determination result from the driver movement determination unit 21, and the position of the driver DR moves to the left or right, for example, the control processor 35 moves the area of the image to trim similarly to the movement of the surrounding area reflected in the inner rearview mirror 61. In so doing, a function corresponding to an inner rearview mirror may be realized, even if driver motion occurs.

Meanwhile, for the joining of the surrounding image acquired by the surrounding area image capture unit 11j and the surrounding image acquired by the surrounding area image capture unit 11k, since an image of a right viewpoint and an image of a left viewpoint are joined, when a rear vehicle or person is at the joining position, there is a risk that the image of the vehicle, person, or the like may become an unnatural-looking image. Particularly, if the vehicle, person, or the like is approaching, the unnaturalness of the image becomes significant at the joined portion because the parallax is large. Accordingly, the control processor 35 is able to change the joining position according to an instruction from the driver, on the basis of a determination result from the driver movement determination unit 21.

FIG. 39 is a diagram for explaining the changing of an image joining position. As illustrated in FIG. 39(A), when the joining position of a surrounding image acquired by the surrounding area image capture unit 11j and a surrounding image acquired by the surrounding area image capture unit 11k is the position Pb1, since the position Pb1 is not included in the image area of a following car OBc or person OBp, the following car OBc or person OBp may be checked easily with the display surrounding image. However, if the joining position is fixed at the position Pb1, and the image area of the person OBp becomes the position Pb1 as illustrated in FIG. 39(B), the image of the person OBp becomes a joined image of a left viewpoint image and a right viewpoint image, and there is a risk that the person OBp may become difficult to correctly distinguish. Accordingly, the control processor 35 changes the joining position according to an instruction from the driver. For example, in the case of determining a driver instruction to move the joining position to the left, the joining position moves to the left, as illustrated in FIG. 39(C). If the joining position is moved in this way, the person OBp is displayed by only the surrounding image acquired by the surrounding area image capture unit 11k, and thus it becomes possible to easily and correctly distinguish the person OBp.

In addition, if the control processor 35 is configured to present a display indicating the joining position (for example, a display such as a marker), the driver is able to easily grasp the positional relationship between the joining position and a following car, person, or the like. For this reason, the driver becomes able to easily determine whether or not to move the joining position, and determine a preferable direction in which to move the joining position. Note that the default position of the joining position may be automatically set to a preconfigured position or a user-configured position, and may also be the position that was configured when the previous drive ended.

In addition, the instruction from the driver is detected from an operating instruction gesture performed by the driver using a human-machine interface responsive to the driver operations discussed above, for example. In so doing, the driver becomes able to easily move the joining position in a desired direction by simply moving his or her head or line of sight.

Furthermore, the processing sequence that is explained in the specification can be implemented by hardware, by software and by a configuration that combines hardware and software. In a case where the processing is implemented by software, it is possible to install in memory within a computer that is incorporated into dedicated hardware a program in which the processing sequence is encoded and to execute the program. It is also possible to install a program in a general-purpose computer that is capable of performing various types of processing and to execute the program.

For example, the program can be recorded on a hard disk, SSD (Solid State Drive), or read-only memory (ROM) that is built into a signal processing semiconductor device or provided separately as a recording medium in advance. Alternatively, the program can be temporarily or permanently stored (recorded) in (on) a removable recording medium such as a flexible disk, CD-ROM (Compact Disc Read Only Memory), MO (Magneto Optical) disk, DVD (Digital Versatile Disc), BD (Blu-Ray Disc (registered trademark)), a magnetic disk, or a semiconductor memory card. Such a removable recording medium can be provided as so-called package software.

In addition, the program can be, not only installed on a computer from a removable recording medium, but also transferred wirelessly or by wire, via a self-diagnostic function or on-board diagnostics (OBD) terminal, to the computer from a download site via a network such as a LAN (Local Area Network) or the Internet. In such a computer, a program transferred in the aforementioned manner can be received and installed or updated on a recording medium such as built-in hardware.

It should be understood by those skilled in the art that various modifications, combinations, sub-combinations and alterations may occur depending on design requirements and other factors insofar as they are within the scope of the appended claims or the equivalents thereof.

Additionally, the vehicle display device according to an embodiment of the present technology may also be configured as below.

(1)
A vehicle display device including:
a display unit, installed in a cabin of a vehicle and having a display face oriented in a different direction from a direction of a driver, configured to display an image depicting a surrounding area of the vehicle; and
a mirror unit installed in the cabin of the vehicle and configured to reflect some or all of an image area displayed on the display unit,
wherein a visible range of the surrounding area visible to the driver through an image of the display unit reflected in the mirror unit changes according to movement of a viewing position of the driver with respect to the mirror unit.

(2)
The vehicle display device according to (1), further including:
a display controller configured to determine motion of the driver, control a display of an image to display on the display unit on the basis of a motion determination result, and change the visible range according to the motion of the driver.

(3)
The vehicle display device according to (2), further including:
a notification unit configured to present a change of determination of the motion of the driver to the driver as visual or audible feedback.

(4)
The vehicle display device according to (2), wherein
the display controller lowers a brightness of some or all of another display area excluding a display area corresponding to the visible range, controls a range of a display area to be lowered in brightness on the basis of a motion determination result, and changes the visible range according to the motion of the driver.

(5)
The vehicle display device according to (4), wherein
the display controller controls a range of a display area to be lowered in brightness on the basis of the motion determination result, and extends the visible range.

(6)
The vehicle display device according to any one of (2) to (5), wherein
the display controller conducts image compression in a movement direction of the visible range with respect to an edge area in the movement direction of the visible range in an image depicting a surrounding area of the vehicle, controls a compression ratio or a compression range on the basis of a motion determination result, and changes the visible range according to the motion of the driver.

(7)
The vehicle display device according to (6), wherein
the display controller controls a compression ratio or a compression range on the basis of a motion determination result, and extends the visible range.

(8)
The vehicle display device according to any one of (2) to (7), wherein
the display controller conducts the image display on the display unit in a case of determining on the basis of a motion determination result that the driver glanced in a direction of the mirror unit.

(9)
The vehicle display device according to (8), wherein
the display controller extends an area of the visible range in a case of determining that the driver performed a predefined motion after detection of the glance.

(10)
The vehicle display device according to (8) or (9), wherein
the display controller raises a time resolution for determination of the motion of the driver after the glance is detected.

(11)
The vehicle display device according to any one of (2) to (10), wherein
the display controller includes
a learning unit configured to learn features of motion for the driver individually,
a determination processor configured to use a learning result of the learning unit to determine the motion of the driver, and
a control processor configured to change the visible range on the basis of a determination result of the determination processor.

(12)
The vehicle display device according to (11), wherein
the determination processor conducts a determination of an instruction by the driver from the motion of the driver, and in determination of the instruction, determines content of the instruction on the basis of a detection result of a combination of two or more acceleration and deceleration operations of the driver's head.

(13)
The vehicle display device according to (11) or (12), wherein
the motion of the driver is at least one of neck-turning, head rotation about a neck axis, or upper body movement forward, back, left, or right.

(14)

The vehicle display device according to any one of (2) to (13), wherein the display controller extends the visible range according to the motion of the driver, and controls an area size of the visible range to extend on the basis of driving conditions of the vehicle.

(15)

The vehicle display device according to (14), wherein the display controller extends the visible range in an outward direction of the vehicle on the basis of driving information related to a travel direction of the vehicle.

(16)

The vehicle display device according to (14) or (15), wherein the vehicle includes a trailer part coupled to the cabin, and image capture of a surrounding area of the vehicle is conducted from the cabin, and the display controller, on the basis of driving information related to driving conditions producing a situation of the cabin orientation differing from the trailer part orientation, extends the visible range in a manner that an outward side of the trailer part is still included in the visible range even if the cabin orientation and the trailer part orientation are different.

(17)

The vehicle display device according to any one of (1) to (16), wherein the display unit and the mirror unit are arranged in a manner that part of an image displayed on the display unit is reflected in the mirror unit, and an image area reflected in the mirror unit moves according to movement of a viewing position of the driver with respect to the mirror unit.

(18)

The vehicle display device according to any one of (1) to (17), wherein the display unit and the mirror unit are arranged or optically designed in a manner that an optical viewing distance from a position of the driver's eyes to a display face of the display unit via the mirror unit is at least 1.1 meters or greater.

(19)

The vehicle display device according to any one of (1) to (18), wherein the display unit is provided in a manner that a display face or illuminating light of the display face on the display unit is not visible to the driver.

(20)

The vehicle display device according to any one of (1) to (19), wherein a shape of the mirror unit in a movement direction of the visible range is a curved shape projecting out towards the driver.

(21)

The vehicle display device according to (20), wherein the mirror unit is shaped with a smaller curve in a central part than at an end in a movement direction of the visible range.

(22)

The vehicle display device according to any one of (1) to (21), further including:

a display controller configured to determine motion of the driver and change an orientation of the mirror unit on the basis of a motion determination result, and thereby change the visible range according to the motion of the driver.

(23)

The vehicle display device according to any one of (1) to (22), wherein the mirror unit is a semi-transmissive mirror.

(24)

The vehicle display device according to (23), wherein the semi-transmissive mirror includes a semi-transmissive light dimming function, or a light dimming device that adjusts an amount of transmitted light is additionally disposed behind the semi-transmissive mirror.

(25)

A display system in vehicle, comprising:

a display screen configured to display an image corresponding to a surrounding area of the vehicle; and a surface configured to reflect at least a portion of the image displayed by the display screen to a viewer.

(26)

The display system according to (25), wherein the viewer is an operator of the vehicle.

(27)

The display system according to (26), further comprising:

a control circuit configured to control display of the image of the surrounding area based on a detection result of a state of the viewer.

(28)

The display system according to (27), wherein, the detection result includes a detection result of a motion of the user.

(29)

The display system according to any one of (25) to (28), wherein the surface is non-planar.

(30)

The display system according to (27), wherein the control circuit is further configured to control display of the image of the surrounding area based on a status of the vehicle.

(31)

The display system according to (30), wherein when a trailer is attached to the vehicle, the status of the vehicle includes whether the trailer blocks a portion of the surrounding area.

(32)

The display system according to (27), wherein the control circuit is further configured to perform, on the image, image compression in a movement direction of a visible range of the surrounding area with respect to an edge area in the movement direction of the visible range, control at least one of a compression ratio and a compression range based on the motion of the viewer, and change the visible range according to the motion of the viewer.

(33)

The display system according to (32), wherein the control circuit is further configured to control at least one of the compression ratio and the compression range based on the motion of the viewer in order to extend the visible range.

(34)

The display system according to (27), wherein the control circuit is further configured to control image display on the display screen when, based on the motion of the viewer, the control circuit determines that the viewer looks in a direction of the surface.

(35)

The display system according to (34), wherein the control circuit is further configured to extend the portion of the surrounding area that is displayed when the viewer performs a predefined motion after looking in the direction of the surface.

(36)

The display system according to (34), wherein the control circuit is further configured to raise a time resolution for determining the motion of the viewer after determining that the viewer looks in the direction of the surface.

(37)

The display system according to (27), wherein the control circuit is further configured to
- learn features of motion of the viewer,
- use a learning result to determine the motion of the viewer, and
- change the portion of the surrounding area that is displayed based on a determination result of the motion of the viewer.

(38)

The display system according to (36), wherein the motion of the viewer includes at least one of neck-turning, heat rotation about a neck axis, or upper body movement forward, backward, left or right.

(39)

The display system according to (27), wherein the control circuit is further configured to
- extend the portion of the surrounding area that is displayed according to the motion of the viewer, and
- control an area size of the portion of the surrounding area that is displayed to extend based on conditions of the vehicle.

(40)

The display system according to (39), wherein the control circuit is further configured to extend the portion of the surrounding area that is displayed on an outward direction of the vehicle based on information related to a travel direction of the vehicle.

(41)

The display system according to (39), wherein the vehicle is a vehicle that includes a cabin and a trailer coupled to the cabin, and an image capture of the surrounding area is conducted from the cabin, and
- the display control circuit, based on driving information of the vehicle, is further configured to extend the portion of the surrounding area that is displayed to cause the trailer to be displayed when the cabin orientation and the trailer orientation are different.

(42)

The display system according to any one of (25) to (41), wherein the display screen and the surface are arranged such that part of the image displayed on the display screen is reflected on the surface, and an image area reflected by the surface moves according to movement of a viewing position of the viewer with respect to the surface.

(43)

The display system according to any one of (25) to (43), wherein the display screen and the surface are arranged or optically designed to cause an optical distance from a position of the viewer's eyes to a display face of the display screen via the surface to be at least 1.1 meters or greater.

(44)

The display system according to any one of (25) to (43), wherein the display screen is configured such that a display face or illuminating light of the display face of the display screen is not visible to the viewer.

(45)

The display system according to any one of (25) to (44), wherein a shape of the surface in a movement direction of the portion of the surrounding area that is displayed is a curved shape projecting out towards the viewer.

(46)

The display system according to (45), wherein the surface is shaped with a smaller curve in a central region than an end region a movement direction of the viewer.

(47)

The display system according to any one of (25) to (46), further comprising:
- a control circuit configured to determine motion of the viewer and change an orientation of the surface based on the motion of the viewer determined, the portion of the surrounding area that is displayed changing in accordance with the change in orientation of the surface.

(48)

The display system according to any one of (25) to (47), wherein the surface is a mirror.

(49)

The display system according to (49), wherein the mirror is a semi-transmissive mirror.

(50)

The display system according to (49), wherein the semi-transmissive mirror includes a semi-transmissive light dimming function, or a light dimming device that adjusts an amount of transmitted light, the light dimming device being disposed behind the semi-transmissive mirror.

(51)

The display system according to any one of (25) to (50), further comprising at least two or more image capture devices attached to an exterior of the vehicle and facing rearward with respect to a travel direction of the vehicle, wherein the image corresponding to a surrounding area of the vehicle is captured by at least one of the image capture devices.

(52)

The display system according to any one of (25) to (51), wherein the vehicle is a car or a bus.

(53)

A display control method comprising:
- displaying, with a display screen, an image corresponding to a surrounding area of a vehicle; and
- reflecting, with a surface, at least a portion of the image displayed by the display screen to a viewer.

INDUSTRIAL APPLICABILITY

In a vehicle display device, display control method, and rearview monitoring system according to an embodiment of the present technology, an image depicting the area around a vehicle is displayed on a display unit that is installed in the vehicle cabin and whose display face is oriented in a different direction from the direction of the driver. A mirror unit is installed in the cabin of the vehicle and reflects an image displayed on the display unit. The visible range of the surrounding area that is visible to the driver through the image of the display unit reflected in the mirror unit changes according to movement of the viewing position of the driver with respect to the mirror unit. For this reason, even in the case of enabling a surrounding area to be checked by capturing and displaying an image of the area surrounding a vehicle on a display unit, the area surrounding the vehicle may be viewed easily. The technology is suitable for a vehicle such as an automobile, truck, or bus.

REFERENCE SIGNS LIST 10 display device
11, 11a, 11b, 11 surrounding area image capture unit
12 driver image capture unit 13 driving conditions detection sensor
15 driver identification information acquisition unit
20 display controller
21 driver movement determination unit
22 driving conditions determination unit
23 recognition unit
24 glance determination unit
25 instruction operation determination unit
26 driver authentication unit
35 control processor
41 display adjuster
42 brightness adjuster
43 warning display overlay unit
50 display unit
55 mirror unit
61 inner rearview mirror
91 rearview mirror
241 glance determination processor
242 glance determination learning unit
243 determination reference value storage unit
251 instruction operation determination processor
252 instruction operation determination learning unit
253 determination reference value storage unit

The invention claimed is:

1. An image processing apparatus, comprising:
at least one circuit configured to
receive, from a plurality of image capturing devices, a plurality of captured images of a region around a mobility device, wherein a field of view of each of the plurality of captured images is different,
generate a display image by performing at least a trimming and combining process on the plurality of captured images,
control at least one of a trimming position and a combining position of the display image,
detect a movement of a user, the movement of the user includes at least one of a movement of a head of the user, a movement of an eye of the user, a touch button control by the user, and a voice command of the user,
control at least one of the trimming position and the combining position of the display image based on the movement of the user to simulate a mirror view of the region around the mobility vehicle that would be visible to the user in a rearview mirror arranged along a sight line of the user according to the movement of the user, and
control a scale adjustment of the display image based on the movement of the user.

2. The image processing apparatus according to claim 1, wherein the at least one circuit is further configured to display the display image on an in-vehicle display of the mobility device.

3. The image processing apparatus according to claim 1, wherein
a predetermined reference value for determination of the movement of the user is set, and
the control of the at least one of the trimming position and the combining position is performed only when the movement of the user exceeds the predetermined reference value.

4. The image processing apparatus according to claim 1, wherein the user is a driver of the mobility device.

5. The image processing apparatus according to claim 1, wherein the plurality of image capturing devices are mounted on the mobility device.

6. The image processing apparatus according to claim 1, wherein at least a portion of the field of view of each of the plurality of captured images overlaps a field of view of another one of the plurality of captured images.

7. The image processing apparatus according to claim 1, wherein the trimming and combining process includes trimming away at least a first portion of the field of view of one of the plurality of captured images so that a remaining second portion of the field of view, which remains after the trimming away, forms a continuous representation of the region around the mobility device after being joined to another one of the plurality of captured images.

8. The image processing apparatus according to claim 1, wherein the trimming and combining process includes blending one of the plurality of captured images with another one of the plurality of captured images based on the combining position.

9. The image processing apparatus according to claim 1, wherein the control of the trimming position and the combining position causes the simulated mirror view of the region around the mobility vehicle to move in a first direction when the movement of the head of the user moves in a second direction opposite to the first direction.

10. The image processing apparatus according to claim 1, further comprising:
a mirror configured to reflect the display image from a display device to the user, the display device being arranged behind a shield so that the display device is not directly visible by the user.

11. The image processing apparatus according to claim 10, wherein the mirror is a planar mirror.

12. The image processing apparatus according to claim 10, wherein the mirror includes a curved reflecting part.

13. The image processing apparatus according to claim 10, wherein the display image includes a monitor image that is visible to the user in a reflection of the mirror, and the display image includes a non-monitor image that is not visible to the user in the reflection of the mirror.

14. The image processing apparatus according to claim 13, wherein the at least one circuit is further configured to apply image compression to the non-monitor image.

15. The image processing apparatus according to claim 13, wherein the at least one circuit is further configured to adjust a brightness of the non-monitor image to be different than a brightness of the monitor image.

16. An image processing method, comprising:
receiving, from a plurality of image capturing devices, a plurality of captured images of a region around a mobility device, wherein a field of view of each of the plurality of captured images is different;
generating a display image by performing at least a trimming and combining process on the plurality of captured images;
controlling at least one of a trimming position and a combining position of the display image;
detecting a movement of a user, the movement of the user includes at least one of a movement of a head of the user, a movement of an eye of the user, a touch button control by the user, and a voice command of the user;
controlling at least one of the trimming position and the combining position of the display image based on the movement of the user to simulate a mirror view of the region around the mobility vehicle that would be visible to the user in a rearview mirror arranged along a sight line of the user according to the movement of the user; and
controlling a scale adjustment of the display image based on the movement of the user.

17. The image processing method according to claim 16, further comprising:
  displaying the display image on an in-vehicle display of the mobility device.

18. The image processing method according to claim 16, further comprising:
  setting a predetermined reference value for determination of the movement of the user; and
  the controlling of the at least one of the trimming position and the combining position is performed only when the movement of the user exceeds the predetermined reference value.

19. The image processing method according to claim 16, wherein the user is a driver of the mobility device.

20. The image processing method according to claim 16, wherein the plurality of image capturing devices are mounted on the mobility device.

21. The image processing method according to claim 16, wherein
  at least a portion of the field of view of each of the plurality of captured images overlaps a field of view of another one of the plurality of captured images.

22. The image processing method according to claim 16, wherein the trimming and combining process includes trimming away at least a first portion of the field of view of one of the plurality of captured images so that a remaining second portion of the field of view, which remains after the trimming away, forms a continuous representation of the region around the mobility device after being joined to another one of the plurality of captured images.

23. The image processing method according to claim 16, wherein the trimming and combining process includes blending one of the plurality of captured images with another one of the plurality of captured images based on the combining position.

24. A tangible and non-transitory computer readable medium storing computer instructions, which when executed by a computer, perform an image processing method, comprising:
  receiving, from a plurality of image capturing devices, a plurality of captured images of a region around a mobility device, wherein a field of view of each of the plurality of captured images is different;
  generating a display image by performing at least a trimming and combining process on the plurality of captured images;
  controlling at least one of a trimming position and a combining position of the display image;
  detecting a movement of a user, the movement of the user includes at least one of a movement of a head of the user, a movement of an eye of the user, a touch button control by the user, and a voice command of the user;
  controlling at least one of the trimming position and the combining position of the display image based on the movement of the user to simulate a mirror view of the region around the mobility vehicle that would be visible to the user in a rearview mirror arranged along a sight line of the user according to the movement of the user; and
  controlling a scale adjustment of the display image based on the movement of the user.

* * * * *